(12) United States Patent
Doyle

(10) Patent No.: US 6,253,717 B1
(45) Date of Patent: Jul. 3, 2001

(54) ROTARY ENGINE

(76) Inventor: Lonny J. Doyle, 354 Linkwood Dr., Duncanville, TX (US) 75137

( * ) Notice: Subject to any disclaimer, the term of this patent is extended or adjusted under 35 U.S.C. 154(b) by 0 days.

(21) Appl. No.: 09/518,932

(22) Filed: Mar. 3, 2000

Related U.S. Application Data

(60) Provisional application No. 60/129,632, filed on Apr. 16, 1999.

(51) Int. Cl.$^7$ .................................................. F02B 57/00
(52) U.S. Cl. ...................................... 123/44 D; 123/44 E
(58) Field of Search ........................... 123/44 R, 44 D, 123/44 E

(56) References Cited

U.S. PATENT DOCUMENTS

| | | |
|---|---|---|
| 1,300,916 | 4/1919 | Beach . |
| 1,316,346 | 9/1919 | Augustine . |
| 1,557,395 | 1/1925 | Augustine . |
| 1,587,275 | 6/1926 | Behn et al. . |
| 1,623,296 | 4/1927 | Augustine . |
| 1,732,147 | 3/1929 | Augustine . |
| 3,477,415 | 11/1969 | Wyssbrod . |
| 3,665,811 * | 5/1972 | Avermaete .................. 123/44 D X |
| 4,308,836 * | 1/1982 | Wilkinson ...................... 123/44 D |
| 4,413,486 | 11/1983 | Irwin . |
| 5,365,892 * | 11/1994 | Kienle ............................. 123/44 D |
| 5,682,843 | 11/1997 | Clifford . |

FOREIGN PATENT DOCUMENTS

| | | |
|---|---|---|
| 171726 | 5/1904 | (DE) . |
| 410946 | 7/1922 | (DE) . |
| 4228639 | 3/1994 | (DE) . |

* cited by examiner

*Primary Examiner*—Hoang Nguyen
(74) *Attorney, Agent, or Firm*—Richard C. Litman

(57) ABSTRACT

A rotary internal combustion engine which has a rotating drum supported in a stationary housing is disclosed. The rotating drum has one bank of cylinders for taking in and compressing the fuel/air mixture and another bank of cylinders for generating power and exhausting the combustion products. The compressed fuel/air mixture passes through a combustion chamber, where it is ignited, before entering the power generating cylinders. The combustion chamber is fixed to the stationary outer housing. The piston rods connecting the pistons to an eccentric shaft are pivotally articulated at both of each piston rod's ends. Because of the geometry of the drum, pistons, connecting rods, and the eccentric shaft, high pressure combustion products power the rotation of the drum. A power output shaft is rigidly fixed to the drum and allows the engine of the present invention to drive other equipment.

4 Claims, 29 Drawing Sheets

ROTARY ENGINE

CROSS-REFERENCE TO RELATED APPLICATION

This application claims the benefit of U.S. Provisional Patent Application Ser. No. 60/129,632, filed Apr. 16, 1999.

BACKGROUND OF THE INVENTION

1. Field of the Invention

The present invention relates to a rotary engine having two sets of pistons, one set for intake and compression of the air or fuel/air mixture and the other set for providing power and exhausting the combustion products.

2. Description of Related Art

The reciprocating piston internal combustion engine is perhaps the most widely used prime mover in the world today, finding application in a variety of fields such as portable power generation, power tools and equipment, and transportation. The reciprocating piston engines of today are the result of many decades of technological evolution, however, the reciprocating engines of today still suffer many drawbacks. Most current reciprocating piston engines of the two stroke type suffer from excessive pollution and inefficiency due to incomplete scavenging of the combustion products from the cylinder prior to the start of the compression stroke. Most current four stroke engines suffer from excessive mechanical complexity due to their valve trains and elaborate engine control systems. In addition, both the two stroke and the four stroke engines that are in common use today, with the exception of the diesel engine, require expensive high octane fuels for proper functioning. Furthermore, both the two stroke and the four stroke engines that are in common use today, including the diesel engine, suffer from a lack of multi-fuel capability. In other words, most engines in common use today lack the capability of using a variety of fuels, having widely different properties and characteristics, without a loss of function of the engine.

To remedy the drawbacks enumerated above, the rotary engine of the present invention, which will be described in detail below, is being proposed. For the same reasons, other alternative engine designs have continually been proposed in the art of internal combustion engine design. Examples of such alternative engine designs can be seen in the patents and other references listed below.

U.S. Pat. No. 1,300,916, issued to Bernard M. Beach on Apr. 15, 1919, shows a two-stroke, radial, piston engine having pairs of cylinders that act cooperatively, such that one piston charges the other cylinder with a fuel/air mixture during the compression stroke of each piston in each of the pairs of cylinders.

U.S. Pat. No. 1,316,346, issued to Benjamin F. Augustine on Sep. 16, 1919, shows a two-stroke engine having a rotating casing. The casing has a plurality of pairs of cylinders, each cylinder housing a piston. Of each cylinder pair, one cylinder pumps air or fuel/air mixture and has a piston that acts as an exhaust valve for the other cylinder, while the other cylinder performs compression and power generation functions. The combustion chambers in the engine of Augustine '346 rotate with the rotating casing.

U.S. Pat. No. 1,557,395, issued to Benjamin F. Augustine on October 13, 1925, and U.S. Pat. No. 1,623,296, issued to Benjamin F. Augustine on Apr. 5, 1927, show two stroke engines of the rotary radial type. The engines of Augustine '395 and '296 use pairs of cylinders that are coupled together to form one combustion chamber. Each of the pair of cylinders has a piston therein with one piston controlling the intake ports and one piston controlling the exhaust ports. The combustion chambers in the engines of Augustine '395 and '296 rotate with the rotating casing of the engines. Each pair of cylinders is provided with its own pump for supplying fuel/air mixture to the pair of cylinders.

U.S. Pat. No. 1,587,275, issued to Adolph Behn et al. on Jun. 1, 1926, shows a two-stroke engine with a rotary radial configuration. The engine of Behn et al. has two types of cylinders referred to as compression cylinders and working cylinders. The compression cylinders pump fuel/air mixture into the working cylinders where the fuel/air mixture is further compressed and then ignited. In the engine of Behn et al. the combustion chambers are the same as the working cylinders and thus the combustion chambers of the engine shown in Behn et al. rotate with the banks of cylinders.

U.S. Pat. No. 1,732,147, issued to Benjamin Franklin Augustine on Oct. 15, 1929, shows a two stroke engine of the rotary radial type. The engine of Augustine '147 uses pairs of cylinders that are coupled together to form one combustion chamber. The combustion chambers in the engine of Augustine '147 rotate with the rotating casing of the engine. Each pair of cylinders is provided with its own pump for supplying fuel/air mixture to the pair of cylinders. Each pump also has a pair of cylinders and a pair of pistons, and each pump is located intermediate adjacent pairs of combustion chambers.

U.S. Pat. No. 3,477,415, issued to Hans Wyssbrod on Nov. 11, 1969, is directed to an engine of the two or four stroke type where both the crankshaft and the engine casing are configured to rotate about a common axis. Through the use of a beveled differential gear set, the crankshaft rotates at twice the speed of the engine casing. Here again, the combustion chambers are designed to rotate with the engine casing.

U.S. Pat. No. 4,413,486, issued to Everett F. Irwin on Nov. 8, 1983, shows a rotary engine having a stationary housing with a rotary cylinder block provided within the housing. The rotary cylinder block has two banks of cylinders, one for intake and compression of air, and one for deriving power from the products of combustion and exhausting those combustion products. An eccentrically mounted shaft causes pistons to reciprocate within the cylinders as the rotary cylinder block rotates. The eccentric shaft also acts as the power output shaft of the engine. The eccentric shaft has a polygonal cross section; and base plates, to which one piston from each bank is rigidly fixed, bear against the flat sides of the eccentric shaft.

U.S. Pat. No. 5,682,843, issued to Colin A. Clifford on Nov. 4, 1997, shows a two stroke engine of the rotary type. The Clifford engine has a stationary outer housing and a cylinder assembly rotatably disposed within the outer housing. The cylinder assembly has a plurality of cylinders, each cylinder having a piston provided therein. The Clifford engine has a conventional style crankshaft which is set to rotate in a direction counter to the direction of rotation of the cylinder assembly, at a rate of rotation three times the rate of rotation of the cylinder assembly, through the use of a planetary gear set. The Clifford engine has spark plugs attached to the stationary outer housing, and ignition of the fuel/air mixture occurs within each of the cylinders.

German Patent No. 171,726, by Paul Auriol, published on Jun. 11, 1906, shows a two stroke engine having rotating cylinders. The combustion chambers of the Auriol engine are integral with the cylinders of the engine, i.e. each cylinder and its associated spark plug rotate as a unit.

German Patent No. 410,946, by Ernst Emil Freytag et al., published on Mar. 6, 1925, shows a two stroke rotating cylinder engine. In the engine of Freytag et al. each cylinder is opened to the exhaust port near the bottom of its stroke, and immediately thereafter the cylinder is opened to the intake port. The fuel/air mixture then undergoes compression in the power generating cylinders before the interior of the cylinders is exposed to a spark from a spark plug and thus before combustion is initiated. In the engine of Freytag et al. the compressed fuel/air mixture does not pass through a combustion chamber, where the fuel/air mixture is ignited, before the burning fuel/air mixture is admitted to the power generating cylinders.

German Patent Application Number 42 28 639, by Josef Gail, published on Mar. 3, 1994, shows a two stroke engine of the rotary radial type. The combustion chambers in the engine of German Document '639 rotate with the rotating casing of the engine.

None of the above inventions and patents, taken either singly or in combination, is seen to describe the instant invention as claimed. In particular, none of the above inventions and patents teach or suggest a rotary engine with a rotating drum supported in a stationary housing, wherein the rotating drum has one bank of cylinders for taking in and compressing the fuel/air mixture and another bank of cylinders for generating power and exhausting the combustion products, wherein the compressed fuel/air mixture passes through a combustion chamber before entering the power generating cylinders, and wherein both ends of each of the piston rods connecting the pistons to an eccentric shaft can pivot at their attachments.

SUMMARY OF THE INVENTION

The present invention is directed to an internal combustion engine having rotating cylinders. The present invention includes a stationary outer housing having a drum rotatably supported therein. The drum has at least two banks of cylinders provided therein. The cylinders in each bank extend radially relative to the longitudinal axis of the drum and are evenly spaced along the peripheral cylindrical wall of the drum. An eccentric shaft passes into the interior of the drum and is fixed to the outer housing. The shaft either fixedly or rotatably supports one or more crank pins for each bank of cylinders. Each cylinder that is carried by the drum has a piston provided therein that is dimensioned and configured to reciprocate within each cylinder. A respective piston rod connects each piston to a crank pin supported by the eccentric shaft. Depending on the particular embodiment, one or more piston rods may share the same crank pin.

As the drum rotates, because of the eccentric position of the eccentric shaft, the pistons reciprocate within their respective cylinders. One of the banks of cylinders acts to take in and compress the fuel/air mixture; therefore the cylinders in this bank are collectively referred to as the intake/compression cylinders and their pistons are referred to as the intake/compression pistons. The other bank of cylinders is used for generating power and exhausting the products that result from the combustion process; therefore the cylinders in this bank are collectively referred to as the power/exhaust cylinders and their pistons are referred to as the power/exhaust pistons.

The intake/compression pistons take in a fuel/air mixture and supply the mixture, after compression, to a combustion chamber which is fixed to the outer housing. The combustion chamber is provided with an ignition source such as a spark plug or a glow plug. The fuel/air mixture in the combustion chamber is continually ignited providing a source of hot, high pressure gas composed largely of combustion products. The hot, high pressure gas is conducted to the power/exhaust cylinders where the hot, high pressure gas expands against the power/exhaust pistons, forcing the power/exhaust pistons toward the bottom of their respective cylinders. Because of the geometry of the drum, the pistons, the connecting rods, and the eccentric shaft, forcing the power/exhaust pistons toward the bottom of their respective cylinders acts to power the rotation of the drum. As the drum goes through a full rotation, the power/exhaust pistons are once again pushed toward the top of their respective cylinders. An exhaust port provided in the outer casing allows the combustion products to be ejected from each of the power/exhaust cylinders as each power/exhaust piston moves toward the top of its respective cylinder. A power output shaft is rigidly fixed to the drum and passes to the exterior of the outer housing. The power output shaft rotates with the drum and allows the engine of the present invention to drive other equipment, thus allowing the engine of the present invention to serve as a useful source of power.

Accordingly, it is a principal object of the invention to provide an internal combustion engine that does not require a valve train.

It is another object of the invention to provide an engine that does not require a specially suited or formulated fuel to operate properly.

It is a further object of the invention to provide an engine which can use a variety of fuels having varying characteristics.

Still another object of the invention is to provide an engine having a large number of cylinders while occupying a relatively small space.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
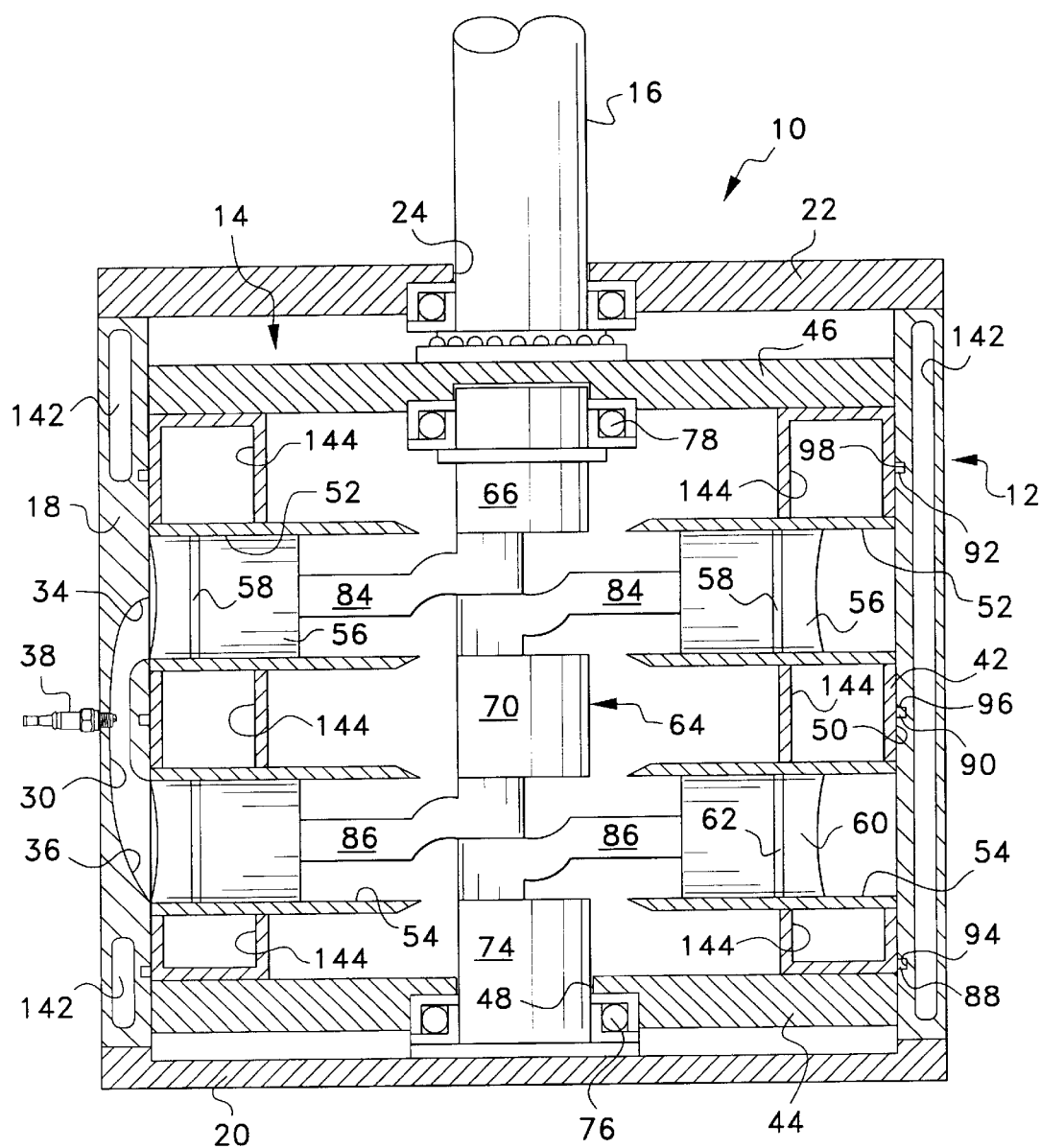
FIG. 1 is a diagrammatic cross sectional side view, taken along a plane parallel to the longitudinal axis of the engine, showing the internal arrangement of the components of the engine of the present invention having fixed crank pins.

Referring to FIGS. 1–5 and 28, a first embodiment of the present invention can be seen. The first embodiment of the present invention is the internal combustion engine 10. The internal combustion or heat engine 10 includes an outer housing 12, a rotating drum 14, and a power output shaft 16.

The outer housing 12 has a first peripheral wall 18, a first rear endcap 20, and a first front endcap 22. The first front endcap 22 has an output shaft opening 24. The first peripheral wall 18, the first rear endcap 20, and the first front endcap 22 cooperatively define a cylindrical enclosure. The outer housing 12 has a first longitudinal axis which is the same as the longitudinal axis of a cylinder defined by the first peripheral wall 18. The outer housing 12 has an intake port 26 and an exhaust port 28.

A combustion chamber 30 is fixed to the peripheral wall 18 of the outer housing 12. The combustion chamber 30 has a hollow interior and an ignition source receiving hole 32. The combustion chamber 30 also has an inlet 34 and an outlet 36. The inlet 34 is in communication with the hollow interior of the combustion chamber 30 and allows compressed air or air/fuel mixture to enter the combustion chamber 30. The outlet 36 is also in communication with the hollow interior of the combustion chamber 30 and allows hot, high pressure, gaseous combustion products to exit the combustion chamber 30.

An ignition source 38 is engaged to the ignition source receiving hole 32. In the illustrated examples, the ignition source 38 is shown as a spark plug; however, any other well known ignition source, such as a glow plug, may also be used. In addition, multiple ignition sources may also be used if necessary.

The engine 10 must also be provided with means for supplying fuel to the engine, for the engine to become operational. This means may be any well known means for supplying fuel to an engine, such as a carburetor 40 provided at the intake port 26, or one or more fuel injectors injecting fuel directly into the combustion chamber 30 or injecting fuel into the intake port 26. In any event, such fuel supply systems are well known in the art, and the particular type of fuel supply system chosen would depend on the requirements for the particular application for which the engine is to be used. Direct fuel injection into the combustion chamber 30 would have the advantage of avoiding problems such as knock, preignition, and detonation that are associated with the adiabatic compression of a fuel/air mixture. Thus, direct injection eliminates the need for fuels having a specified octane rating. This feature combined with the elimination of valve gear by the present design, which obviates the need to adjust valve timing for optimal operation with different fuels, gives the engines of the present invention true multi-fuel capability. All such fuel systems being well known, these fuel systems will not be discussed in detail here.

The drum 14 is rotatably supported within the outer housing 12. The drum 14 is substantially cylindrical in shape and dimensioned to fit into the interior of the outer housing 12. The drum 14 has a second peripheral wall 42, a second rear endcap 44, and a second front endcap 46. The second rear endcap 44 has an eccentric shaft opening 48 located concentrically with the rear endcap 44 itself. The drum 14 is coaxial with the outer housing 12 such that the longitudinal axis of the drum 14 is essentially coincident with the longitudinal axis of the outer housing 12. The second peripheral wall 42 has an outer surface 50.

A first plurality of cylinders 52 are supported by the peripheral wall 42 of the drum 14. The plurality of cylinders 52 form what is referred to herein as a bank of cylinders. The bank of cylinders 52 acts to take in and compress the fuel/air mixture, therefore the cylinders 52 are collectively referred to as the intake/compression cylinders. In the illustrated example there are two cylinders 52 forming the intake/compression bank of cylinders, however, any number of cylinders may constitute the intake/compression bank of cylinders. The first plurality of cylinders 52 are arranged in a radial configuration such that the longitudinal axis of each of the intake/compression cylinders 52 is coincident with a radius of the drum 14. The first plurality of cylinders 52 are evenly distributed about the longitudinal axis of the drum 14. Each of the first plurality of cylinders 52 intersects the outer surface 50 of the peripheral wall 42 of the drum 14 such that each cylinder 52 has an open top.

A second plurality of cylinders 54 are supported by the peripheral wall 42 of the drum 14 at a location axially spaced apart from the axial position of the bank of intake/compression cylinders 52. The second plurality of cylinders 54 are arranged in a radial configuration such that the longitudinal axis of each of the cylinders 54 is coincident with a radius of the drum 14. The cylinders 54 are evenly distributed about the longitudinal axis of the drum 14. Each of the cylinders 54 intersects the outer surface 50 of the peripheral wall 42 of the drum 14 so as to form an open top for each of the cylinders 54. The bank of cylinders 54 acts to derive power from and exhaust, or expel, the products that result from the combustion process. Therefore, the cylinders 54 are collectively referred to as the power/exhaust cylinders. In the illustrated example there are two cylinders 54 forming the power/exhaust bank of cylinders, however, any number of cylinders 54 may constitute the power/exhaust bank of cylinders.

A first plurality of pistons 56 are placed in the intake/compression cylinders 52, such that each of the pistons 56 is slidably housed within a respective one of the cylinders 52. The pistons 56 substantially fill the bore of their respective cylinders 52. Any gaps between the pistons 56 and the walls of cylinders 52 are sealed by conventional type piston rings 58 (illustrated in FIG. 1). The pistons 56 in cooperation with cylinders 52 act to take in and compress air or a fuel/air mixture and then supply the compressed air or fuel/air mixture to the combustion chamber 30. Therefore, the pistons 56 are referred to herein as the intake/compression pistons. The pistons 56 are equal in number to the cylinders 52, this number being two in the illustrated example.

A second plurality of pistons 60 is provided for each of the power/exhaust cylinders 54. Each of the pistons 60 is slidably housed within a respective one of the power/exhaust cylinders 54. The pistons 60 substantially fill the bore of their respective cylinders 54. Any gaps between the pistons 60 and the walls of cylinders 54 are sealed by conventional type piston rings 62 (illustrated in FIG. 1). The pistons 60 in cooperation with cylinders 54 act to derive power from and exhaust the products of the combustion process. Therefore, the pistons 60 are referred to herein as the power/exhaust pistons. The pistons 60 are equal in number to the cylinders 54, this number being two in the illustrated example.

An eccentric shaft 64 is fixedly attached to the rear endcap 20 of the outer housing 12. The eccentric shaft 64 extends through the eccentric shaft opening 48. The eccentric shaft 64 has a coaxial portion 66, a first eccentric portion or crank pin 68, a coaxial portion 70, a second eccentric portion or crank pin 72, and a coaxial portion 74. The first eccentric portion 68, the second eccentric portion 72, and the coaxial portions 66 and 70 lie entirely within the drum 14. The coaxial portion 66 extends between the first eccentric portion 68 and the front endcap 46 of the drum 14. The coaxial portion 70 extends between the first eccentric portion 68 and the second eccentric portion 72. The coaxial portion 74 extends between the second eccentric portion 72 and the rear endcap 20 of the outer housing 12 to which the eccentric shaft 64 is fixedly attached. Ball bearing sets 76 and 78 rotatably support the drum 14 about the eccentric shaft 64. The coaxial portions 66, 70, and 74 of the eccentric shaft 64 are coaxial with the outer housing 12 and the drum 14. The eccentric portions 68 and 72 are eccentric relative to the longitudinal axis of the outer housing 12. In the illustrated example, the first eccentric portion 68 and the second eccentric portion 72 are coaxial with one another.

A first plurality of wrist pins 80 are provided for each of the intake/compression pistons 56. Each of the wrist pins 80 are borne by a respective one of the pistons 56. Each of the wrist pins 80 is rotatably supported at both ends by bearing surfaces formed in internal bosses that are in turn formed on opposite sides of the interior of the piston skirt. Such a manner of supporting a wrist pin on a piston is well known in the art. The wrist pins 80 are equal in number to the pistons 56, in this example that number being two.

A second plurality of wrist pins 82 are provided for each of the power/exhaust pistons 60. Each of the wrist pins 82 are borne by a respective one of the pistons 60. Each of the wrist pins 82 is rotatably supported at both ends by bearing surfaces formed in internal bosses that are in turn formed on opposite sides of the interior of the piston skirt, in a manner that is well known in the art. The wrist pins 82 are equal in number to the pistons 60, in this example that number being two.

A first plurality of piston rods 84 are provided for each piston 56, one rod 84 being provided for each piston 56. Each of the piston rods 84 has a first end and a second end, the first end of each piston rods 84 being pivotally supported by a respective one of the wrist pins 80 and the second end of each of the piston rods 84 being pivotally supported by the first eccentric portion 68 of the eccentric shaft 64. The second end, also known as the big end, of the piston rods 84 are offset relative to the longitudinal axis of the middle portion of the piston rods 84; thus the big ends of both the piston rods 84 can be attached to the first eccentric portion 68 of the eccentric shaft 64 while maintaining the longitudinal axes of the cylinders 52 in essentially the same plane extending transversely to the longitudinal axis of the drum 14.

A second plurality of piston rods 86 are provided for each piston 60, one rod 86 being provided for each piston 60. Each of the piston rods 86 has a first end and a second end, the first end of each piston rods 86 being pivotally supported by a respective one of the wrist pins 82 and the second end of each of the piston rods 86 being pivotally supported by the second eccentric portion 72 of the eccentric shaft 64. As with the rods 84, the second end, also known as the big end, of the piston rods 86 are offset relative to the longitudinal axis of the middle portion of the piston rods 86; thus the big ends of both the piston rods 86 can be attached to the second eccentric portion 72 of the eccentric shaft 64 while maintaining the longitudinal axes of the cylinders 54 in essentially the same plane extending transversely to the longitudinal axis of the drum 14.

It should be noted that more than two cylinders can be used in either the intake/compression or the power/exhaust bank of cylinders while maintaining the longitudinal axes of the cylinders in either bank in essentially the same plane extending transversely to the longitudinal axis of the drum 14, by appropriately modifying each piston rod. Appropriate modifications can include offsetting the big end of each piston rod relative to the end that attaches to the wrist pin, such that all the big ends of the piston rods for a given bank of cylinders can pivot about the same eccentric portion of the eccentric shaft 64 while the ends of the piston rods that attach to the wrist pins remain at essentially the same level along the longitudinal axis of the drum 14. Of course, the big ends of all the piston rods will not be offset by the same amount.

The output shaft 16 is fixedly attached to the front endcap 46 of the drum 14 and extends through the output shaft opening 24 and to the outside of the outer housing 12. The output shaft 16 allows the engine 10 to drive other machinery.

Compression spring type ring seals 88, 90, and 92 seal off the banks of cylinders 52 and 54 from one another, and from the spaces around the endcaps 44 and 46 of the drum 14. The seal 88 is provided intermediate the rear endcap 44 of the drum 14 and the power/exhaust bank of cylinders 54. The seal 90 is provided intermediate the intake/compression cylinders 52 and the power/exhaust bank of cylinders 54. The seal 92 is provided intermediate the front endcap 46 of the drum 14 and the intake/compression bank of cylinders 52. These seals are necessary to ensure that the combustion chamber 30 is not circumvented by the compressed air or fuel/air mixture and that combustion products do not mix with fresh air or fresh fuel/air mixture in an uncontrolled manner. The seals 88, 90, and 92 are housed within their respective annular grooves 94, 96, and 98, and are self-biased to project out of the grooves 94, 96, and 98. The grooves 94, 96, and 98 are formed in the inner surface of the peripheral wall 18 of the outer housing 12.

Wiper seals 100, 102, 104, 106, 108, and 110 seal off gaps between the peripheral wall 18 of the outer housing 12 and the outer surface 50 of the drum 14, along the axial dimension of the portion of the drum 14 housing the bank of intake/compression cylinders 52. The seals 100, 102, 104, 106, 108, and 110 are in the form of metallic sealing strips or bars and are housed within their respective grooves 112, 114, 116, 118, 120, and 122. The seals 100, 102, 104, 106, 108, and 110 are biased by leaf springs, similar to those illustrated for the next embodiment, to project radially outward from their respective grooves and sealingly contact the outer surface 50 of the drum 14. At least the portion of each of the wiper seals 100, 102, 104, 106, 108, and 110 that contacts the outer surface 50 of the drum 14, extends from the ring seal 90 to the ring seal 92 and sealingly contacts both ring seals 90 and 92. The wiper seal grooves 112, 114, 116, 118, 120, and 122 are formed in the inner surface of the peripheral wall 18 of the outer housing 12. The wiper seals 100 and 102 are positioned intermediate the inlet 34 of the combustion chamber 30 and the intake port 26. The wiper seals 100 and 102 are spaced apart such that the open top of the cylinder 52 can fit in its entirety intermediate the wiper seals 100 and 102.

The wiper seals 104 and 106 are positioned approximately at a location where the piston 56 ends its intake stroke and begins its compression stroke as the open top of the cylinder 52 sweeps past the seals 104 and 106. The wiper seals 104 and 106 are spaced apart such that the open top of the cylinder 52 can fit in its entirety intermediate the wiper seals 104 and 106.

The wiper seals 108 and 110 are positioned such that the open top of the cylinder 52 sweeps past the seals 108 and 110 in that order before the open top of the cylinder 52 comes into unencumbered fluid communication with the inlet 34 of the combustion chamber 30. The wiper seals 108 and 110 are spaced apart such that the open top of the cylinder 52 can fit in its entirety intermediate the wiper seals 108 and 110.

The wiper seals 100, 102, 104, 106, 108, and 110 prevent uncontrolled fluid communication between the inlet 34 of the combustion chamber 30 and the intake port 26, thus preventing explosive ignition of the fuel/air mixture at the intake port 26. The wiper seals 100, 102, 104, 106, 108, and 110 also prevent loss of compression in the cylinders 52 during the compression phase of their cycle.

Wiper seals 124, 126, 128, and 130 seal off gaps between the peripheral wall 18 of the outer housing 12 and the outer surface 50 of the drum 14, along the axial dimension of the portion of the drum 14 housing the bank of power/exhaust cylinders 54. The seals 124, 126, 128, and 130 are in the form of metallic sealing strips or bars and are housed within their respective grooves 132, 134, 136, and 138. The seals 124, 126, 128, and 130 are biased by leaf springs, similar to those illustrated for the next embodiment, to project radially outward from their respective grooves and sealingly contact the outer surface 50 of the drum 14. At least the portion of each of the wiper seals 124, 126, 128, and 130 that contacts the outer surface 50 of the drum 14, extends from the ring seal 90 to the ring seal 88 and sealingly contacts both ring seals 90 and 88. The wiper seal grooves 132, 134, 136, and 138 are formed in the inner surface of the peripheral wall 18 of the outer housing 12.

The wiper seals 128 and 130 are positioned intermediate the exhaust port 28 and outlet 36 of the combustion chamber 30. The wiper seals 128 and 130 are spaced apart such that the open top of the cylinder 54 can fit in its entirety intermediate the wiper seals 128 and 130. The wiper seals 124 and 126 are positioned at a location such that the open top of the cylinder 54 sweeps past the seals 124 and 126, in that order, just before the piston 60 begins its exhaust stroke. The wiper seals 124 and 126 are spaced apart such that the open top of the cylinder 54 can fit in its entirety intermediate the wiper seals 124 and 126. The wiper seals 124, 126, 128, and 130 prevent uncontrolled fluid communication between the outlet 36 of the combustion chamber 30 and the exhaust port 28, such that gaseous combustion products cannot pass from the combustion chamber 30 to the exhaust port 28 without any useful work being derived from those gaseous combustion products.

Figure 2:
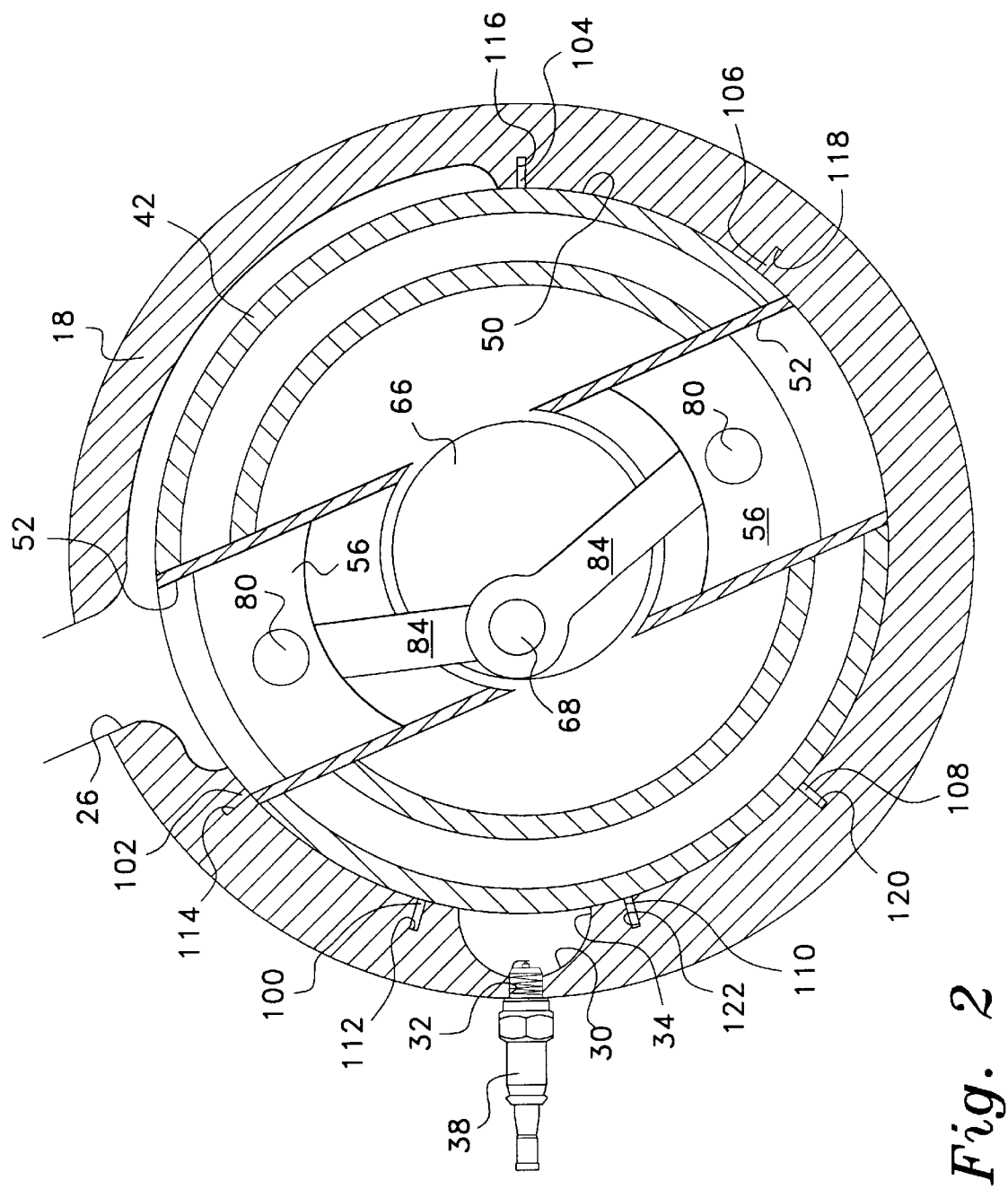
FIG. 2 is a diagrammatic cross sectional view, taken along a plane transverse to the longitudinal axis of the engine, showing the intake/compression cylinders of the engine of the present invention having fixed crank pins, with one cylinder at the beginning of the intake phase of its cycle.
Figure 3:
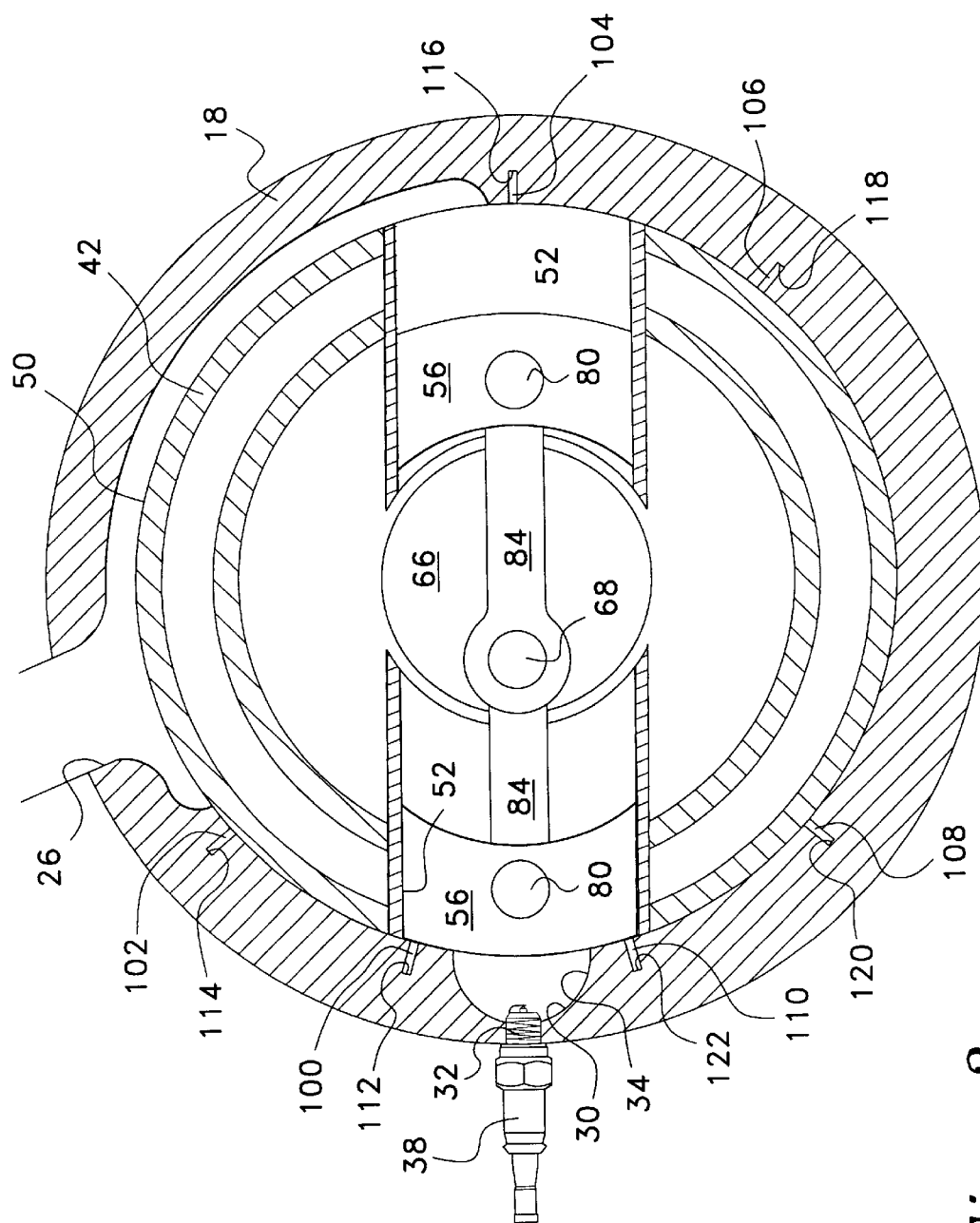
FIG. 3 is a diagrammatic cross sectional view, taken along a plane transverse to the longitudinal axis of the engine, showing the intake/compression cylinders of the engine of the present invention having fixed crank pins, with one cylinder at the end of the compression phase of its cycle.

Referring to FIGS. 2 and 3, consider the rotation of the drum 14 in the clockwise direction. The eccentric location of the eccentric portion 68 of the shaft 64 in combination with the fixed length of the piston rods 84, cause the intake/compression pistons 56 to reciprocate within their respective cylinders 52 as the drum 14 rotates. To understand how the rotation of the drum 14 results in the reciprocating movement of the pistons 56 in the cylinders 52, consider a piston 56 and its respective cylinder 52 initially at top-dead-center or TDC. TDC is by definition the condition wherein the piston 56 is as close to the open top of the cylinder 52 as the piston 56 will ever get during its operating cycle, i.e. at TDC the piston 56 will be at the very top of its stroke within the cylinder 52. The respective piston rod 84 being fixed in length, the piston 56 is at TDC when the open top of the cylinder 52 is at a location, along the interior surface of the peripheral wall 18 of the outer housing 12, that is closest to the eccentric portion 68 of the eccentric shaft 64. TDC as used herein also applies to the position of the cylinder 52 when the piston 56 is at the top of its stroke. Also, TDC may refer to a location along the interior surface of the peripheral wall 18 of the outer housing 12, at which the piston 56 reaches the top of its stroke. In the illustrated example, TDC occurs when the open top of a cylinder 52 is approximately at the inlet 34 of the combustion chamber 30.

As the drum 14 continues to rotate in the clockwise direction, the open top of the cylinder 52 moves farther away from the eccentric portion 68 of the eccentric shaft 64. The length of the piston rod 84 being fixed, the piston 56 is pulled away from the open top of the cylinder 52 and toward the axis of rotation of the drum 14, as the drum 14 continues to rotate in the clockwise direction. Thus, clockwise rotation of the drum 14, away from TDC, results in the movement of piston 56 further inward toward the axis of rotation of the drum 14. This inward movement of the piston 56 continues until the piston 56 reaches the bottom of its stroke. In other words, the piston 56 reaches the position at which the piston 56 is as close to the longitudinal axis or the axis of rotation of the drum 14 as the piston 56 will ever get during its operating cycle. By definition, this position is known as Bottom-dead-center or BDC.

The piston 56 is at BDC when the open top of the cylinder 52 reaches a position along the internal surface of the peripheral wall 18 of the outer housing 12, that is farthest away from the eccentric portion 68 of the eccentric shaft 64. Again, the length of the piston rod 84 being fixed, when the cylinder 52 reaches the position just described, the piston 56 will be as far radially inward within its respective cylinder 52 as the piston will ever be during the piston's entire operating cycle. In the illustrated example, BDC occurs when the open top of a cylinder 52 is approximately in registry with the wiper seal 104.

Thus, radially inward movement of the piston 56 relative to the open top of the cylinder 52, is caused by the fact that the open top of the cylinder 52 moves farther away from the eccentric portion 68 of the eccentric shaft 64 as the cylinder 52 moves from its TDC position to its BDC position. As the drum 14 continues to rotate in a clockwise direction and the cylinder 52 moves from BDC back to TDC, the open top of the cylinder 52 will again move closer to the eccentric portion 68 of the eccentric shaft 64, and given the fixed length of the piston rod 84, the piston 56 will rise within its respective cylinder 52 until the piston 56 is once again at its TDC position and the entire cycle can be repeated again.

As each cylinder 52 sweeps past the intake port 26, the piston 56 is just past TDC and, therefore, the piston 56 is near the top of the cylinder 52. Also the open top of the cylinder 52 is in communication with the intake port 26. As the clockwise rotation of the drum 14 continues, the piston 56 continues to move inward within its respective cylinder 52, thus increasing the volume between the top of the cylinder and the top of the piston and consequently creating a suction within the cylinder 52. Air or a fuel/air mixture will move through the intake port 26 and into the cylinder 52 to fill the increasing volume. The fuel/air mixture may be supplied by a carburetor such as carburetor 40, or only air will be taken in by the cylinder 52 if fuel is being directly injected into the combustion chamber 30. This process continues until the piston 56 reaches BDC. This portion of the operating cycle is generally known as the intake stroke or intake phase.

At approximately bottom-dead-center, the open top of the cylinder 52 becomes roughly centered on the wiper seal 104. At this time the seal created by the wiper seal 104 is destroyed because fluid communication around the wiper seal 104 can occur through the volume of the cylinder 52. If the wiper seal 106 was not provided in the position illustrated in FIGS. 2 and 3, a detrimental loss of pressure would result on the high pressure side of the wiper seal 104. This loss of sealing is an even greater concern when larger numbers of cylinders are being used in a given bank of cylinders. By spacing the wiper seals 104 and 106 as shown, an effective seal between the cylinders 52, as they go through the compression phase of their cycle, and the intake port 26 can be maintained as other intake/compression cylinders 52 sweep past the wiper seals 104 and 106.

Once the cylinder 52 sweeps past the wiper seal 104, the cylinder 52 becomes cut off from the intake port 26. This event coincides with the beginning of the movement of the piston 56 from BDC to TDC. Thus as the drum 14 continues its clockwise rotation, the air or fuel/air mixture in the cylinder 52 gets compressed and the pressure thereof increases. Maximum pressure within the cylinder 52 is reached just as the cylinder 52 is about to sweep past the wiper seal 110.

It is important that the air or fuel/air mixture being compressed not be prematurely exposed to the combustion products in the combustion chamber 30. If a fuel/air mixture is being compressed, exposure to the combustion products in the combustion chamber 30 can cause the fuel/air mixture to explode prematurely resulting in no useful work being derived from the fuel consumed. If only air is being compressed, exposure of the cylinder 52 to the inlet 34 of the combustion chamber 30 before sufficient pressure is built up within the cylinder 52, will cause combustion products to flow back into the intake/compression cylinders resulting in a loss of pressure at the outlet 36 of the combustion chamber 30. Thus, a loss in the power supplied to the power/exhaust pistons will result and the efficiency of the engine will be reduced.

Wiper seals 108 and 110 help keep the intake/compression cylinders 52 from premature exposure to the inlet 34 of the combustion chamber 30. The wiper seals 108 and 110 are spaced relative to one another in the same manner as wiper seals 104 and 106, such that at least one of the wiper seals 108 and 110 maintains an effective seal between the cylinders 52, that are going through the compression phase of their cycle, and the inlet 34 of the combustion chamber 30 as other intake/compression cylinders 52 sweep past the wiper seals 108 and 110.

As the cylinder 52 sweeps past the wiper seal 110, the cylinder 52 is at about TDC and discharges its contents into the combustion chamber 30. As each cylinder 52 moves past TDC, the cylinder 52 encounters wiper seals 100 and 102. It is essential that the inlet 34 of the combustion chamber 30 be isolated from the intake port 26 to prevent an explosive hazard in the case of a fuel/air mixture being supplied to the intake port 26. It is also essential that the inlet 34 of the combustion chamber 30 be isolated from the intake port 26 in order to prevent loss of pressure at the outlet 36 of the combustion chamber 30, and thus prevent a loss of power, in both the fuel/air mixture case and in the case of air only being supplied to the intake port 26.

Here again, wiper seals 100 and 102 are used to seal the inlet 34 of the combustion chamber 30 from the intake port 26. The wiper seals 100 and 102 are spaced relative to one another in the same manner as wiper seals 104 and 106, such that at least one of the wiper seals 100 and 102 maintains an effective seal between the inlet 34 of the combustion chamber 30 and the intake port 26 as an intake/compression cylinder 52 sweeps past the wiper seals 100 and 102. Once a cylinder 52 sweeps past the wiper seal 102, the open top of the cylinder 52 is again in communication with the intake port 26 and the intake/compression cycle can begin anew. With the two cylinder arrangement illustrated in FIGS. 1–5 and 28, as one cylinder 52 is progressing through the intake phase, the other cylinder 52 progresses through the compression phase of its cycle.

Using well known timing circuitry, the spark plug 38 can be caused to generate a spark each time a piston 56 is at about TDC. At this time a fresh charge of fuel/air is in the combustion chamber 30, and the spark will initiate the combustion process. The combustion of the fuel and air in the combustion chamber 30 provides a source of hot, high pressure gases at the outlet 36 of the combustion chamber 30.

Where air only is supplied to the combustion chamber 30 by the intake compression cylinders 52, a fuel injection system for supplying fuel directly into the combustion chamber 30 will also need to be provided. The fuel injection system would inject a bolus of fuel into the combustion chamber 30 when each intake/compression piston 56 is at about TDC, just prior to the generation of the spark by the spark plug 38. In the direct fuel injection case, alternatives to the spark plug 38 such as a glow plug or a plug sparking at a continuous high frequency may also be used. Carburetors, fuel injection systems, and ignition timing systems are well known in the art and will not be discussed in detail here.

Figure 4:
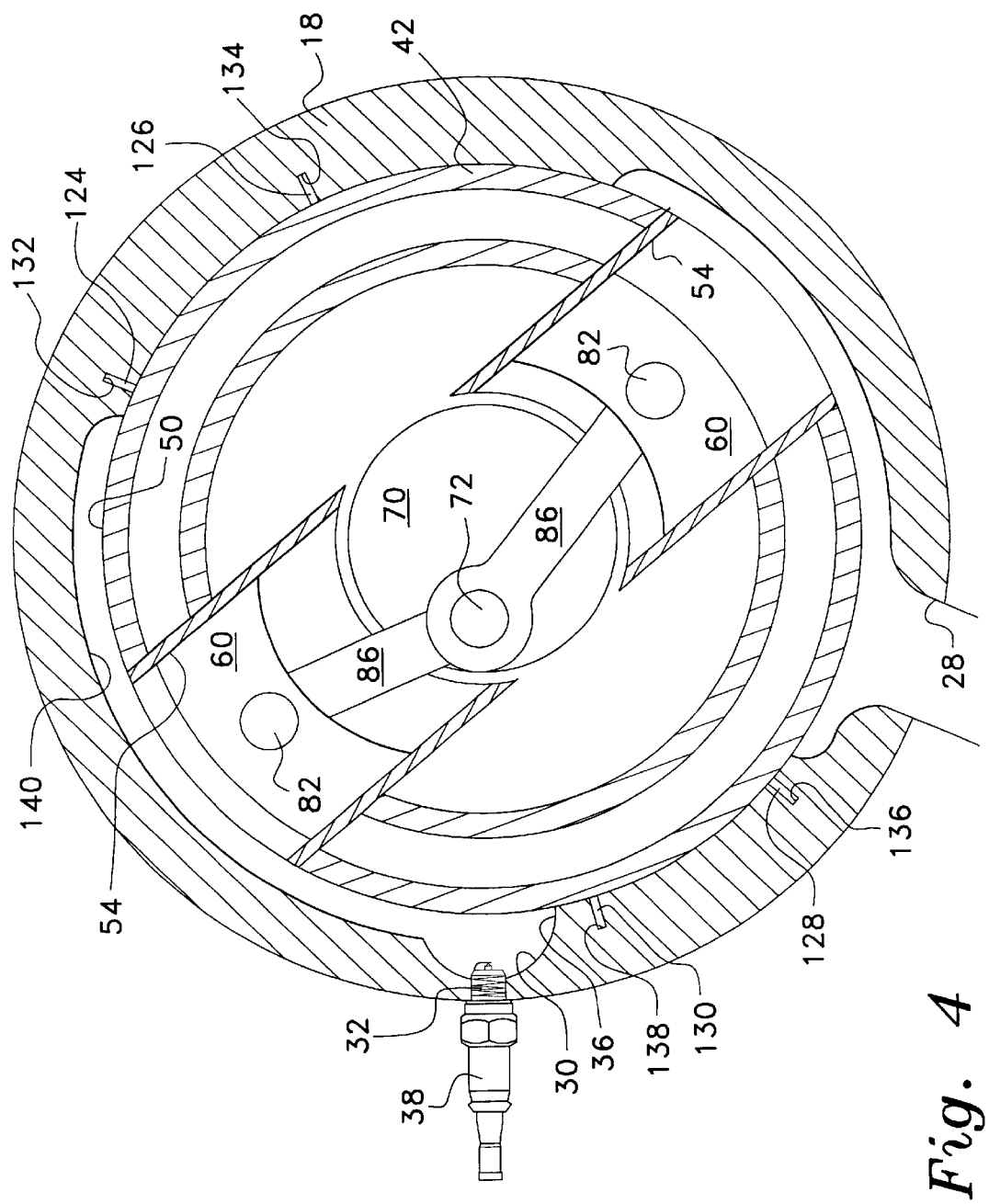
FIG. 4 is a diagrammatic cross sectional view, taken along a plane transverse to the longitudinal axis of the engine, showing the power/exhaust cylinders of the engine of the present invention having fixed crank pins, with one cylinder at the beginning of the power phase of its cycle.
Figure 5:
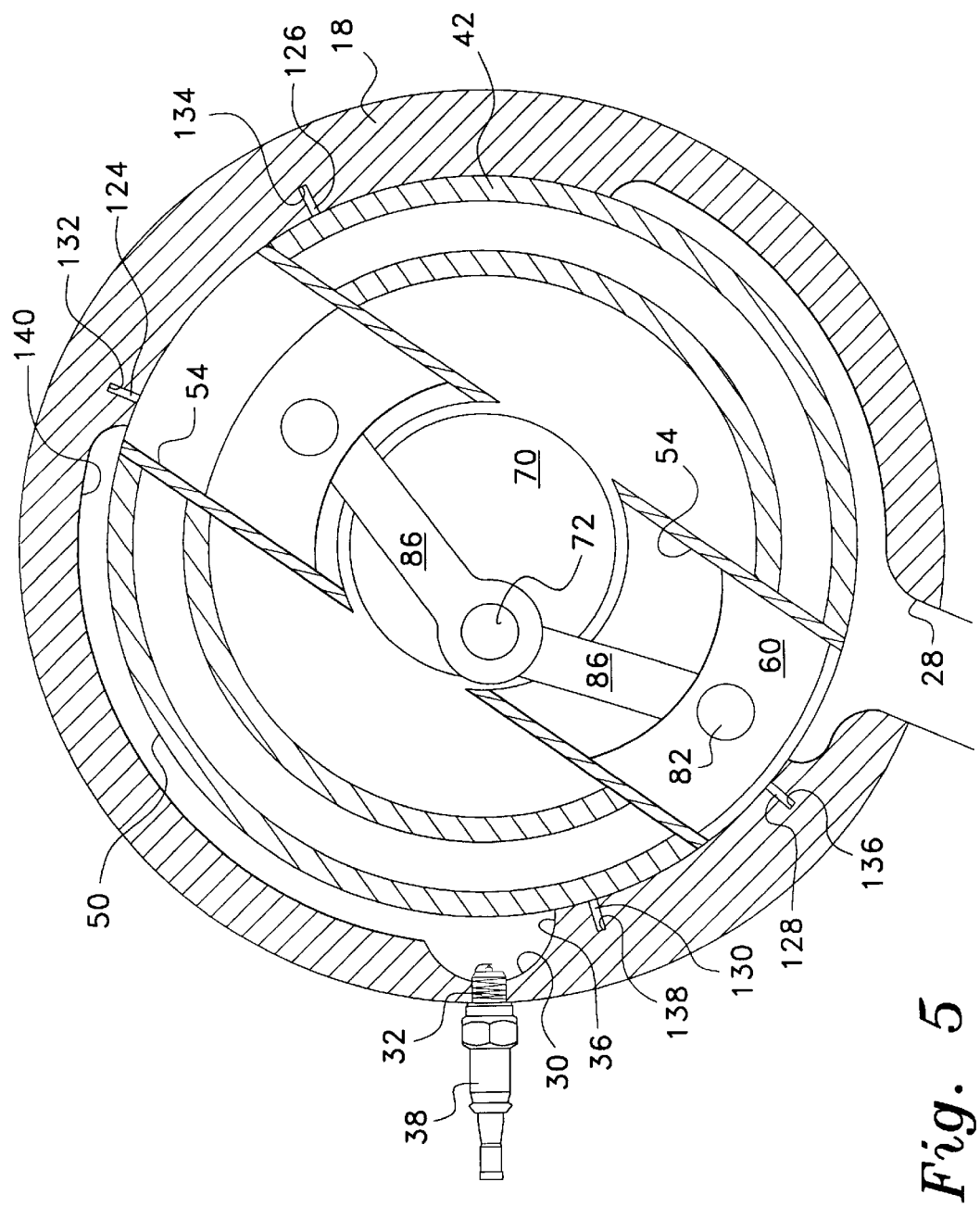
FIG. 5 is a diagrammatic cross sectional view, taken along a plane transverse to the longitudinal axis of the engine, showing the power/exhaust cylinders of the engine of the present invention having fixed crank pins, with one cylinder at the end of the exhaust phase of its cycle.
Figure 6:
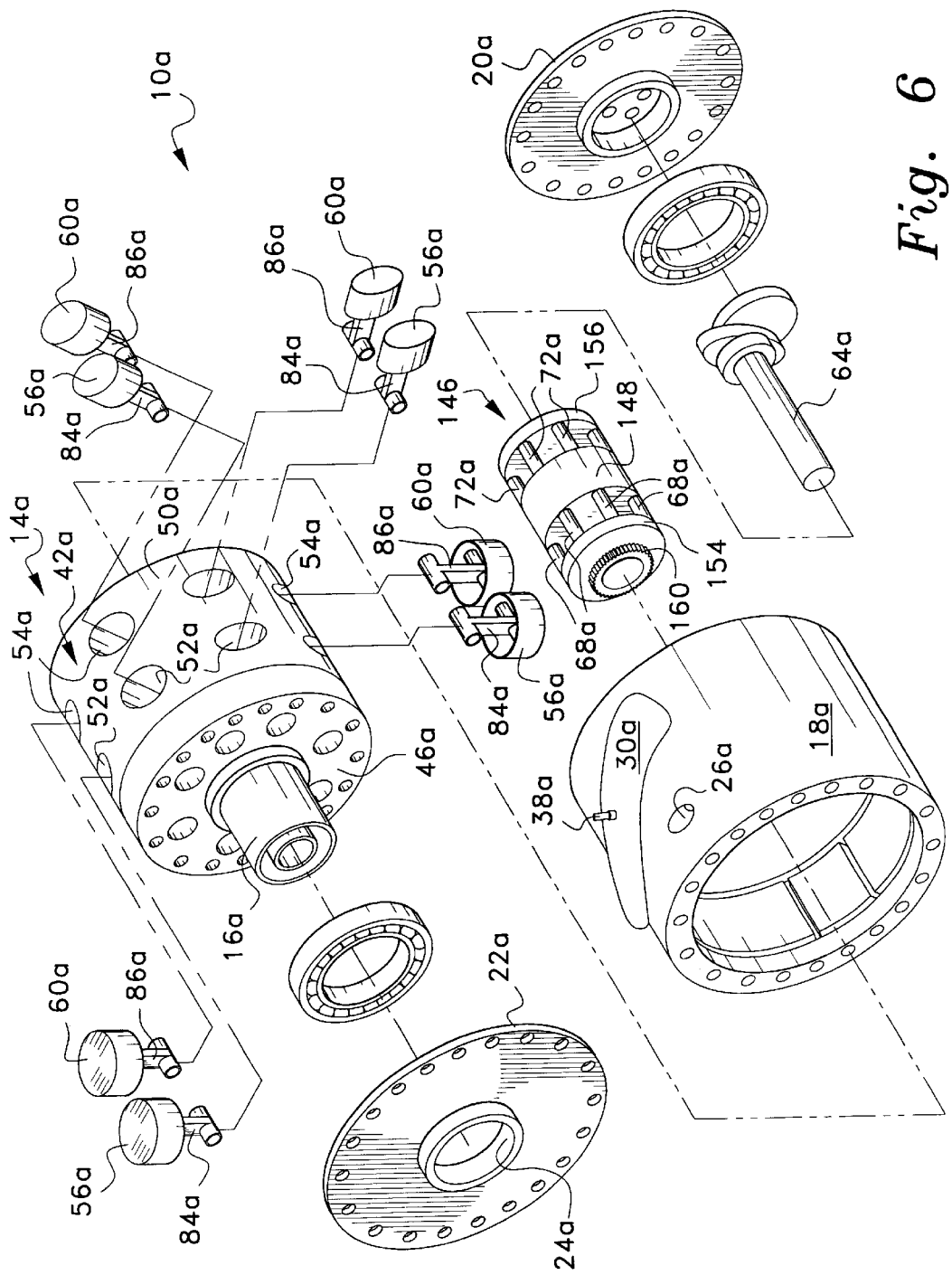
FIG. 6 is an exploded view of the engine of the present invention having crank pins supported by a rotatable sleeve, wherein the rotation of the sleeve is synchronized with the rotation of the drum by a double roller timing chain.

Referring to FIGS. 4 and 5, the power/exhaust pistons and cylinders 60 and 54 are geometrically identical to the intake/compression pistons and cylinders 56 and 52, in the illustrated example. Further, the first eccentric portion 68 and the second eccentric portion 72 are coaxial with one another. In addition, each intake/compression cylinder 52 is superimposed over a respective power/exhaust cylinder 54, such that the longitudinal axes of each intake/compression cylinder 52 and its respective power/exhaust cylinder 54 are parallel to one another while being axially spaced apart from one another. Thus, as the drum 14 rotates the power/exhaust pistons 60 reciprocate within their respective cylinders exactly as the intake/compression pistons 56 do. Also, the power/exhaust pistons 60 reach TDC and BDC at the same time and at the same angle of rotation of the drum 14 as their respective intake/compression pistons 56.

At about TDC or shortly thereafter, combustion takes place in the combustion chamber 30 generating a hot, high pressure gas within the combustion chamber 30. Also at this time, a power/exhaust cylinder 54 is in fluid communication with outlet 36 of combustion chamber 30, and the respective piston 60 housed in that particular cylinder is near the top of its stroke. The high pressure combustion products, passing through the outlet 36, impinge upon the piston 60 and exert a force upon the piston 60 which tends to push the piston 60 toward the axis of rotation of the drum 14. As the drum 14 rotates in the clockwise direction and the piston 60 moves toward BDC, the piston 60 will remain in fluid communication with the outlet 36 of the combustion chamber 30 for the greater part of its power cycle. This fluid communication is maintained via an extended cavity 140 formed in the peripheral wall 18 of the outer housing 12 and extending along the greater portion of the inner surface of the peripheral wall 18 which is swept by the cylinders 54 during their power phases.

At this point two important features of the design of the present invention deserve particular attention. First, each piston rod 86 can pivot both at its attachment to its respective wrist pin 82 and at its attachment to the eccentric shaft portion 72. This feature means that for the most part the only loads imparted to the piston rods 86 are those loads that are directed along an axis extending from the center of a wrist pin 82 to the center of the eccentric shaft portion 72. Second, this axis which extends from the center of a wrist pin 82 to the center of the eccentric shaft portion 72, and which has a length equal to the center-to-center distance between the wrist pin 82 and the eccentric shaft portion 72, trails or is on the lagging side of the radius of the drum 14 which is coincident with the longitudinal axis of the respective cylinder 54, for at least a portion of the power phase of the operating cycle of each of the pistons 60.

When a line extending center-to-center between the wrist pin 82 and the eccentric shaft portion 72 is on the lagging side of the longitudinal axis of the respective cylinder 54, the force exerted on the respective piston 60 by the combustion products causes reaction forces in the respective piston rod 86, directed in a direction parallel to the line extending center-to-center between the wrist pin 82 and the eccentric shaft portion 72, that tend to cause a force to be exerted, via the piston 60, on the wall of the cylinder 54. The force exerted on the wall of the cylinder 54 is in the direction of rotation of the drum 14 and acts to push the drum 14 in the direction in which the drum is rotating. Thus, the pressure of the combustion products on the piston 60 is translated to the rotational motion of the drum 14.

Near top-dead-center, both the intake/compression piston 56 and the power/exhaust piston 60 are exposed to combustion products, however, the exposure of the piston 56 is very brief. Shortly thereafter, the cylinder 52 sweeps past the wiper seal 100 and is no longer exposed to the combustion products. Further, during exposure the piston 56 is at or near TDC, therefore, very little combustion products are carried away by the cylinder 52. In addition, the burning rate of the fuel/air mixture in the combustion chamber 30 is finite, therefore, it may well be the case that very little combustion has taken place by the time the cylinder 52 is sealed off from the inlet 34 of the combustion chamber 30 by the wiper seal 100. Moreover, a slight delay in the generation of the spark from the spark plug 38 will allow the cylinder 52 to be sealed off from the inlet 34 of the combustion chamber 30 by the wiper seal 100 before combustion is initiated. In any event, most of the combustion products will remain available to fill the power/exhaust cylinder 54 at high pressure to thereby efficiently deliver power to the output shaft 16 of the engine 10.

As the drum 14 continues its rotation and the piston 60 moves toward BDC, more high pressure combustion products continue to fill the increasing volume of the cylinder 54 and to exert pressure on the piston 60. By the time the cylinder 54 reaches wiper seal 124, combustion is essentially complete. When the cylinder 54 has moved past the wiper seal 124, the cylinder 54 is filled with combustion products. Shortly thereafter the cylinder 54 sweeps over the wiper seal 126. As the cylinder 54 sweeps over the wiper seal 126, the seal maintained by the wiper seal 126 is broken and the internal volume of the cylinder 54 essentially becomes exposed to the exhaust port 28. However, because of the seal 124, the cavity 140 and the combustion chamber outlet 36 remain sealed off from the exhaust port 28. This arrangement of the wiper seals 124 and 126 is particularly important when larger numbers of cylinders 54 are provided in the power/exhaust bank of cylinders, because as one cylinder 54 is beginning its exhaust stroke other cylinders 54 may still be going through their power strokes and the high pressure at the combustion chamber outlet 36 and in the cavity 140 must be maintained in order to efficiently derive power from the consumed fuel.

At this point in the cycle, the cylinder 54 and piston 60 are approximately at BDC. As the cylinder 54 rotates clockwise toward TDC, the piston 60 moves up within the cylinder 54, expelling the combustion products contained in the cylinder 54 through the exhaust port 28. As the cylinder 54 moves past the exhaust port 28, wiper seals 128 and 130 are encountered in that order. With the wiper seals 128 and 130 arranged as illustrated, one of the wiper seals 128 and 130 will continue to seal the combustion chamber outlet 36 from the exhaust port 28 even as the seal maintained by the other wiper seal is broken by the movement of the cylinder 54 over this other wiper seal. The combustion chamber outlet 36 must always be sealed off from the exhaust port 28 so that the combustion products cannot flow from the combustion chamber outlet 36 to the exhaust port 28 without first imparting their energy to the pistons 60 during the power phase of the pistons' cycle. Once past the wiper seal 130, the cylinder 54 and the piston 60 are once again at TDC ready to resume the power/exhaust cycle, thus providing for continuous operation of the engine 10. As the combustion process powers the rotation of the drum 14, the output shaft 16, being fixedly attached to the drum 14, is also set in rotational motion and can be used to power other machinery.

The peripheral wall 18 and the peripheral wall 42 are provided with cavities 142 and 144, respectively, to allow circulation of a coolant fluid through the engine 10. Coolant fluid can be supplied to the peripheral wall 42 of the drum 14 through the output shaft 16 in the same manner as shown for the second embodiment of the invention discussed herein below.

Referring to FIGS. 6–23, a second embodiment of the present invention can be seen. The second embodiment of the present invention is the internal combustion engine 10a. The internal combustion or heat engine 10a includes an outer housing 12a, a rotating drum 14a, and a power output shaft 16a.

The outer housing 12a has a first peripheral wall 18a, a first rear endcap 20a, and a first front endcap 22a. The first front endcap 22a has an output shaft opening 24a. The first peripheral wall 18a, the first rear endcap 20a, and the first front endcap 22a cooperatively define a cylindrical enclosure. The outer housing 12a has a first longitudinal axis which is the same as the longitudinal axis of a cylinder defined by the first peripheral wall 18a. The outer housing 12a has an intake port 26a and an exhaust port 28a.

A combustion chamber 30a is fixed to the peripheral wall 18a of the outer housing 12a. The combustion chamber 30a has a hollow interior and an ignition source receiving hole 32a. The combustion chamber 30a also has an inlet 34a and an outlet 36a. The inlet 34a is in communication with the hollow interior of the combustion chamber 30a and allows compressed air or air/fuel mixture to enter the combustion chamber 30a. The outlet 36a is also in communication with the hollow interior of the combustion chamber 30a and allows hot, high pressure, gaseous combustion products to exit the combustion chamber 30a.

An ignition source 38a is engaged to the ignition source receiving hole 32a. In the illustrated examples, the ignition source 38a is shown as a spark plug; however, any other well known ignition source, such as a glow plug, may also be used.

The engine 10a must also include means for supplying fuel to the engine. This means may be any well known means for supplying fuel to an engine. Examples of such well known means include a carburetor such as a carburetor 40 which would be provided at the intake port 26a, or one or more fuel injectors injecting fuel directly into the combustion chamber 30a or injecting fuel into the intake port 26a. In any event, such fuel supply systems are well known in the art, and the particular type of fuel supply system chosen would depend on the requirements for the particular application for which the engine is to be used. Direct fuel injection into the combustion chamber 30a would have the advantage of avoiding problems such as knock, preignition, and detonation that are associated with the adiabatic compression of a fuel/air mixture.

The drum 14a is rotatably supported within the outer housing 12a. The drum 14a is substantially cylindrical in shape and dimensioned to fit into the interior of the outer housing 12a. The drum 14a has a second peripheral wall 42a, a second rear endcap 44a, and a second front endcap 46a. The second rear endcap 44a has an eccentric shaft opening 48a located concentrically with the rear endcap 44a itself. The drum 14a is coaxial with the outer housing 12a such that the longitudinal axis of the drum 14a is essentially coincident with the longitudinal axis of the outer housing 12a. The second peripheral wall 42a has an outer surface 50a.

A first plurality of cylinders 52a are supported by the peripheral wall 42a of the drum 14a. The plurality of cylinders 52a form what is referred to herein as a bank of cylinders. The bank of cylinders 52a acts to take in and compress the fuel/air mixture; therefore the cylinders 52a are collectively referred to as the intake/compression cylinders. In the illustrated example there are six cylinders 52a forming the intake/compression bank of cylinders; however, any number of cylinders may constitute the intake/compression bank of cylinders. The first plurality of cylinders 52a are arranged in a radial configuration such that the longitudinal axis of each of the intake/compression cylinders 52a is coincident with a radius of the drum 14a. The first plurality of cylinders 52a are evenly distributed about the longitudinal axis of the drum 14a. Each of the first plurality of cylinders 52a intersects the outer surface 50a of the peripheral wall 42a of the drum 14a such that each cylinder 52a has an open top.

A second plurality of cylinders 54a are supported by the peripheral wall 42a of the drum 14a at a location axially spaced apart from the axial position of the bank of intake/compression cylinders 52a. The second plurality of cylinders 54a are arranged in a radial configuration such that the longitudinal axis of each of the cylinders 54a is coincident with a radius of the drum 14a. The cylinders 54a are evenly distributed about the longitudinal axis of the drum 14a. Each of the cylinders 54a intersects the outer surface 50a of the peripheral wall 42a of the drum 14a so as to form an open top for each of the cylinders 54a. The bank of cylinders 54a acts to derive power from and exhaust, or expel, the products that result from the combustion process. Therefore, the cylinders 54a are collectively referred to as the power/exhaust cylinders. In the illustrated example there are six cylinders 54a forming the power/exhaust bank of cylinders, however, any number of cylinders 54a may constitute the power/exhaust bank of cylinders. Also, more than one bank of intake/compression and/or power/exhaust cylinders may be provided in the engines of the present invention.

A first plurality of pistons 56a are placed in the intake/compression cylinders 52a, such that each of the pistons 56a is slidably housed within a respective one of the cylinders 52a. The pistons 56a substantially fill the bore of their respective cylinders 52a. Any gaps between the pistons 56a and the walls of cylinders 52a are sealed by conventional type piston rings 58a. The pistons 56a in cooperation with cylinders 52a act to take in and compress air or a fuel/air mixture and then supply the compressed air or fuel/air mixture to the combustion chamber 30a. Therefore, the pistons 56a are referred to herein as the intake/compression pistons. The pistons 56a are equal in number to the cylinders 52a, this number being six in the illustrated example.

A second plurality of pistons 60a is provided for each of the power/exhaust cylinders 54a. Each of the pistons 60a is slidably housed within a respective one of the power/exhaust cylinders 54a. The pistons 60a substantially fill the bore of their respective cylinders 54a. Any gaps between the pistons 60a and the walls of cylinders 54a are sealed by conventional type piston rings 62a. The pistons 60a in cooperation with cylinders 54a act to derive power from and exhaust the products of the combustion process. Therefore, the pistons 60a are referred to herein as the power/exhaust pistons. The pistons 60a are equal in number to the cylinders 54a, this number being six in the illustrated example.

An eccentric shaft 64a is fixedly attached to the first rear endcap 20a at a location such that the eccentric shaft 64a extends through the eccentric shaft opening 48a. The eccentric shaft has an eccentric portion positioned within the drum 14a, which is eccentric relative to the longitudinal axis of the outer housing 12a. The eccentric portion of the shaft 64a extends parallel to, but spaced apart from the axis of rotation of the drum 14a. The length of the eccentric portion of the shaft 64a spans at least the axial distance between the intake/compression cylinders 52a and the power/exhaust cylinders 54a, the axial distance corresponding to the outside diameter of the power/exhaust cylinders 54a, and the axial distance corresponding to the outside diameter of the intake/compression cylinders 52a.

A rotatable sleeve 146 is rotatably supported by the eccentric portion of the eccentric shaft 64a. The rotatable sleeve 146 has a large diameter portion 148 intermediate two small diameter portions 150 and 152. At the end of each small diameter portion 150 and 152, distal from the large diameter portion 148, there are flanges 154 and 156, respectively. A portion 158 of the rotatable sleeve 146 extends beyond the flange 154. A sprocket 160 is fixedly attached to the end of the rotatable sleeve 146 located distally from the first rear endcap 20a. The sprocket 160 is concentric with the eccentric portion of the eccentric shaft 64a.

A first plurality of crank pins 68a are supported by the rotatable sleeve 146 intermediate the flange 154 and the large diameter portion 148. The crank pins 68a are evenly distributed along a circular arc about the eccentric portion of the eccentric shaft 64a.

A second plurality of crank pins 72a are supported by the rotatable sleeve 146 at a location axially spaced apart from the first plurality of crank pins 68a. More specifically, the crank pins 72a are supported intermediate the flange 156 and the large diameter portion 148. The crank pins 72a are evenly distributed along a circular arc about the eccentric portion of the eccentric shaft 64a.

A sprocket 162 is fixedly attached to the front endcap 46a. The sprocket 162 is concentric with the longitudinal axis of the drum 14a and is located on the interior of the drum 14a. A double roller timing chain 164 engages both the sprocket 162 and the sprocket 160. The timing chain 164 is in the form of an endless loop and has two parallel sets of rollers. The rollers fit between the teeth of the sprockets. One set of rollers engages sprocket 160 while the other set of rollers engages the sprocket 162. The sprockets 160 and 162 have a one-to-one ratio such that, when the drum 14a is rotated, the drum 14a and the sleeve 146 rotate together at the same rotational speed and in a synchronized manner.

Ball bearing sets 76a and 78a rotatably support the drum 14a within the outer housing 12a.

A first plurality of wrist pins 80a are provided for each of the intake/compression pistons 56a. Each of the wrist pins 80a are borne by a respective one of the pistons 56a. Each of the wrist pins 80a is rotatably supported at both ends by bearing surfaces formed in internal bosses that are in turn formed on opposite sides of the interior of the piston skirt. Such a manner of supporting a wrist pin on a piston is well known in the art. The wrist pins 80a are equal in number to the pistons 56a, in this example that number being six.

A second plurality of wrist pins 82a are provided for each of the power/exhaust pistons 60a. Each of the wrist pins 82a are borne by a respective one of the pistons 60a. Each of the wrist pins 82a is rotatably supported at both ends by bearing surfaces formed in internal bosses that are in turn formed on opposite sides of the interior of the piston skirt. This manner of supporting a wrist pin on a piston is well known in the art. The wrist pins 82a are equal in number to the pistons 60a, in this example that number being six.

A first plurality of piston rods 84a are provided for each piston 56a, one rod 84a being provided for each piston 56a. Each of the piston rods 84a has a first end and a second end, the first end of each piston rods 84a being pivotally supported by a respective one of the wrist pins 80a and the second end of each of the piston rods 84a being pivotally supported by a crank pin 68a.

A second plurality of piston rods 86a are provided for each piston 60a, one rod 86a being provided for each piston 60a. Each of the piston rods 86a has a first end and a second end, the first end of each piston rods 86a being pivotally supported by a respective one of the wrist pins 82a and the second end of each of the piston rods 86a being pivotally supported by a respective crank pin 72a.

The output shaft 16a is fixedly attached to the front endcap 46a of the drum 14a and extends through the output shaft opening 24a and to the outside of the outer housing 12a. The output shaft 16a allows the engine 10a drive other machinery.

Compression spring type ring seals 88a, 90a, and 92a seal off the banks of cylinders 52a and 54a from one another, and from the spaces around the endcaps 44a and 46a of the drum 14a. The seal 88a is provided intermediate the rear endcap 44a of the drum 14a and the power/exhaust bank of cylinders 54a. The seal 90a is provided intermediate the intake/compression cylinders 52a and the power/exhaust bank of cylinders 54a. The seal 92a is provided intermediate the front endcap 46a of the drum 14a and the intake/compression bank of cylinders 52a. These seals are necessary to ensure that the combustion chamber 30a is not circumvented by the compressed air or fuel/air mixture and that combustion products do not mix with fresh air or fresh fuel/air mixture in an uncontrolled manner. The seals 88a, 90a, and 92a are housed within their respective annular grooves 94a, 96a, and 98a, and are self-biased to project out of the grooves 94a, 96a, and 98a. The grooves 94a, 96a, and 98a are formed in the inner surface of the peripheral wall 18a of the outer housing 12a.

Figure 14:
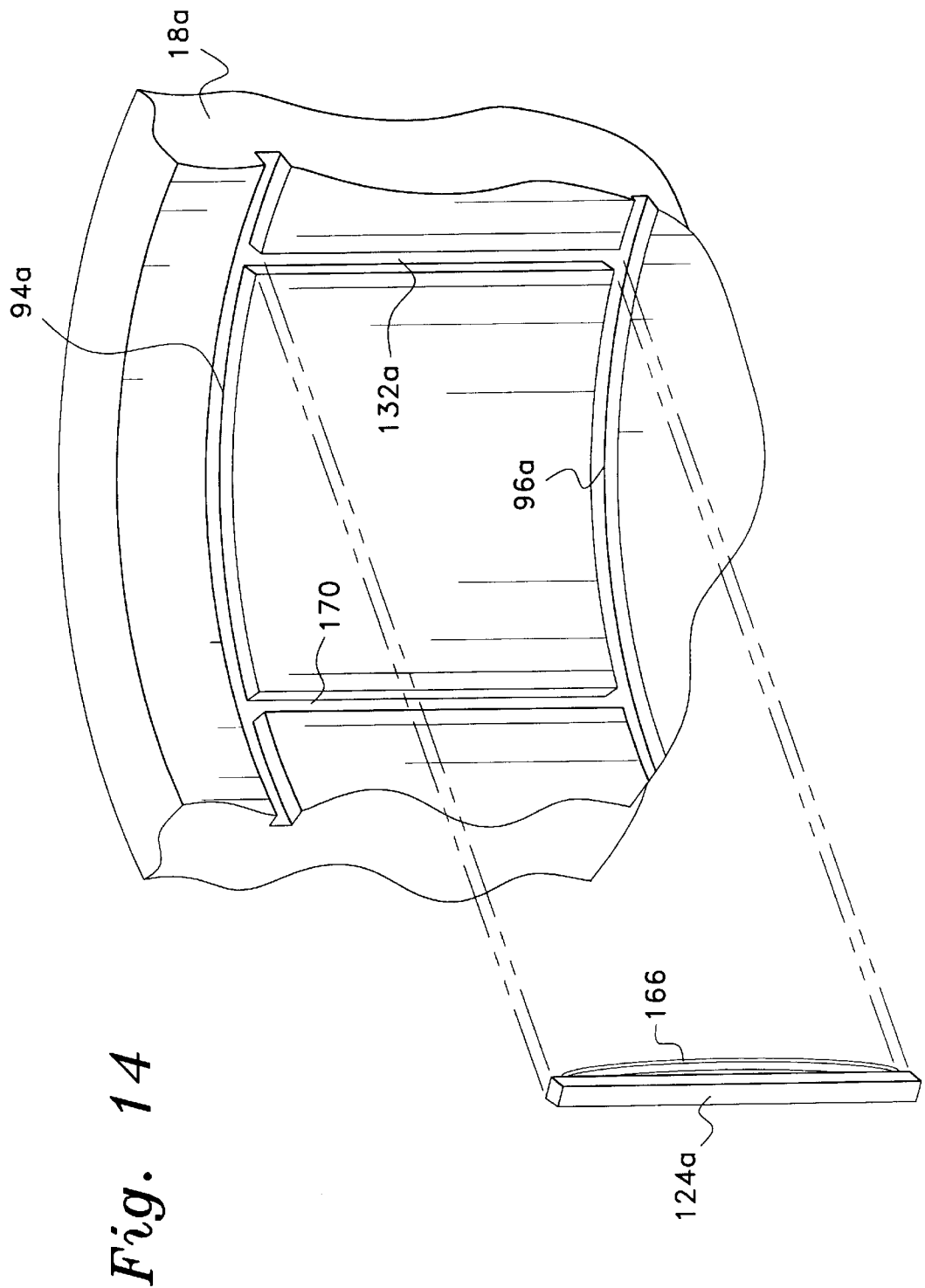
FIG. 14 is a fragmentary view showing detail of the wiper seals that project from grooves in the outer housing and seal the gap between the outer housing and the rotating drum.

Wiper seals 100a, 102a, 104a, 106a, 108a, and 110a seal off gaps between the peripheral wall 18a of the outer housing 12a and the outer surface 50a of the drum 14a, along the axial dimension of the portion of the drum 14a housing the bank of intake/compression cylinders 52a. The seals 100a, 102a, 104a, 106a, 108a, and 110a are in the form of metallic sealing strips or bars and are housed within their respective grooves 112a, 114a, 116a, 118a, 120a, and 122a. The seals 100a, 102a, 104a, 106a, 108a, and 110a are biased by leaf springs 166, one of which is illustrated in FIG. 14, to project radially outward from their respective grooves and sealingly contact the outer surface 50a of the drum 14a. At least the portion of each of the wiper seals 100a, 102a, 104a, 106a, 108a, and 110a that contacts the outer surface 50a of the drum 14a, extends from the ring seal 90a to the ring seal 92a and sealingly contacts both ring seals 90a and 92a. The wiper seal grooves 112a, 114a, 116a, 118a, 120a, and 122a are formed in the inner surface of the peripheral wall 18a of the outer housing 12a.

The wiper seals 100a and 102a are positioned intermediate the inlet 34a of the combustion chamber 30a and the intake port 26a. The wiper seals 100a and 102a are spaced apart such that the open top of the cylinder 52a can fit in its entirety intermediate the wiper seals 100a and 102a.

The wiper seals 104a and 106a are positioned approximately at a location where the piston 56a ends its intake stroke and begins its compression stroke as the open top of the cylinder 52a sweeps past the seals 104a and 106a. The wiper seals 104a and 106a are spaced apart such that the open top of the cylinder 52a can fit in its entirety intermediate the wiper seals 104a and 106a.

The wiper seals 108a and 110a are positioned such that the open top of the cylinder 52a sweeps past the seals 108a and 110a in that order before the open top of the cylinder 52a comes into unencumbered fluid communication with the inlet 34a of the combustion chamber 30a. The wiper seals 108a and 110a are spaced apart such that the open top of the cylinder 52a can fit in its entirety intermediate the wiper seals 108a and 110a.

The wiper seals 100a, 102a, 104a, 106a, 108a, and 110a prevent uncontrolled fluid communication between the inlet 34a of the combustion chamber 30a and the intake port 26a, thus preventing explosive ignition of the fuel/air mixture at the intake port 26a. The wiper seals 100a, 102a, 104a, 106a, 108a, and 110a also prevent loss of compression in the cylinders 52a during the compression phase of their cycle.

Wiper seals 124a, 168, 126a, 128a, and 130a seal off gaps between the peripheral wall 18a of the outer housing 12a and the outer surface 50a of the drum 14a, along the axial dimension of the portion of the drum 14a housing the bank of power/exhaust cylinders 54a. The seals 124a, 168, 126a, 128a, and 130a are in the form of metallic sealing strips or bars and are housed within their respective grooves 132a, 170, 134a, 136a, and 138a. The seals 124a, 168, 126a, 128a, and 130a are biased by leaf springs 166, one of which is shown in FIG. 14, to project radially outward from their respective grooves and sealingly contact the outer surface 50a of the drum 14a. At least the portion of each of the wiper seals 124a, 168, 126a, 128a, and 130a that contacts the outer surface 50a of the drum 14a, extends from the ring seal 90a to the ring seal 88a and sealingly contacts both ring seals 90a and 88a. The wiper seal grooves 132a, 170, 134a, 136a, and 138a are formed in the inner surface of the peripheral wall 18a of the outer housing 12a.

The wiper seals 128a and 130a are positioned intermediate the exhaust port 28a and outlet 36a of the combustion chamber 30a. The wiper seals 128a and 130a are spaced apart such that the open top of each cylinder 54a can fit in its entirety intermediate the wiper seals 128a and 130a.

The wiper seals 124a, 168, and 126a are positioned at a location such that the open top of the cylinder 54a sweeps past the seals 124a, 168, and 126a, in that order, just before the piston 60a begins its exhaust stroke. The distance between the wiper seals 124a and 126a must be greater than the inside diameter of each of the cylinders 54a. In the illustrated example, the wiper seals 124a and 168 are spaced apart such that the open top of the cylinder 54a can fit in its entirety intermediate the wiper seals 124a and 168; and the wiper seals 126a and 168 are spaced apart such that the open top of the cylinder 54a can fit in its entirety intermediate the wiper seals 126a and 168.

The wiper seals 124a, 168, 126a, 128a, and 130a prevent uncontrolled fluid communication between the outlet 36a of the combustion chamber 30a and the exhaust port 28a, such that gaseous combustion products cannot pass from the combustion chamber 30a to the exhaust port 28a without any useful work being derived from those gaseous combustion products.

Figure 20:
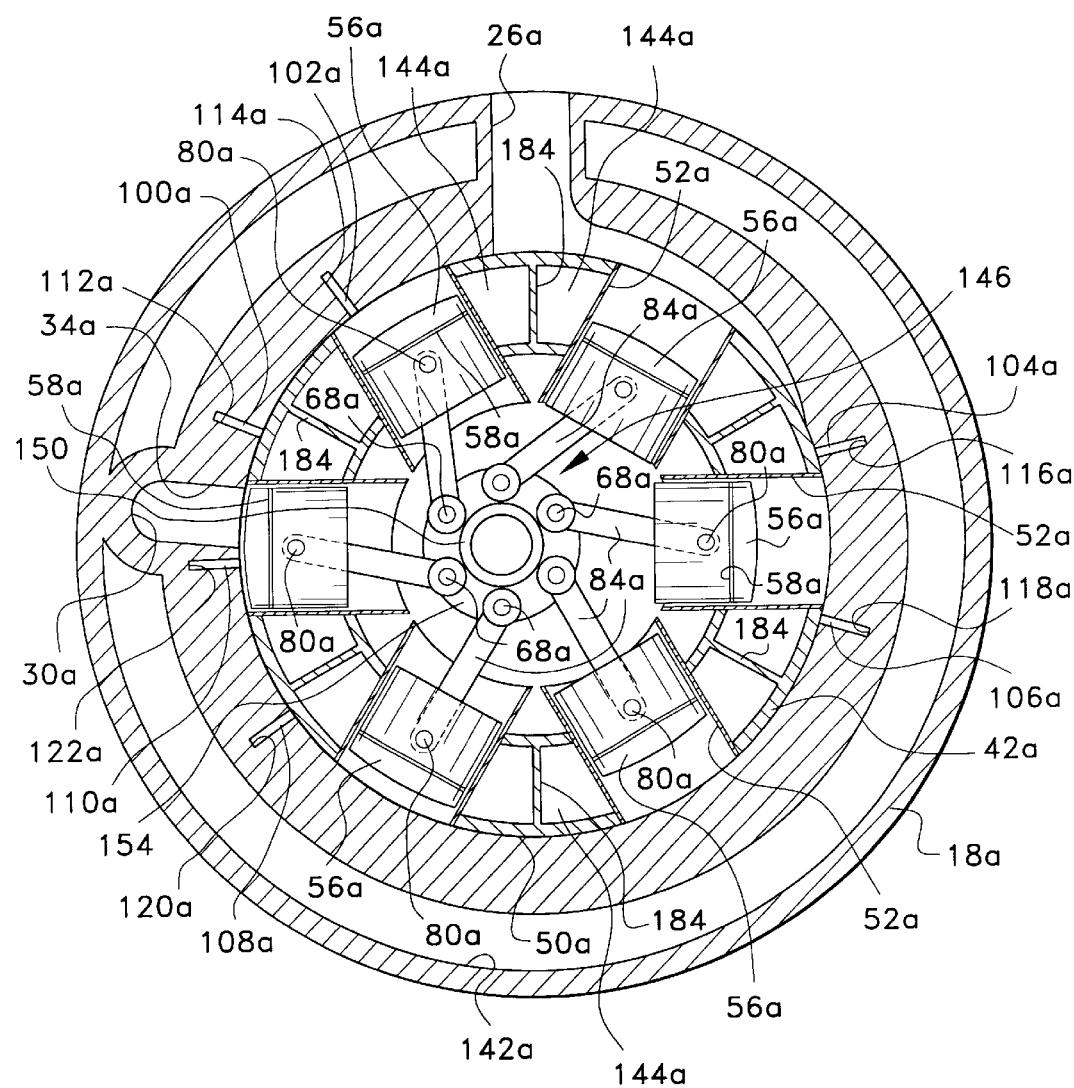
FIG. 20 is a diagrammatic cross sectional view, taken along a plane transverse to the longitudinal axis of the engine, showing the intake/compression cylinders of the engine of the present invention having a double roller timing chain, with one cylinder in registry with the inlet to the combustion chamber.
Figure 21:
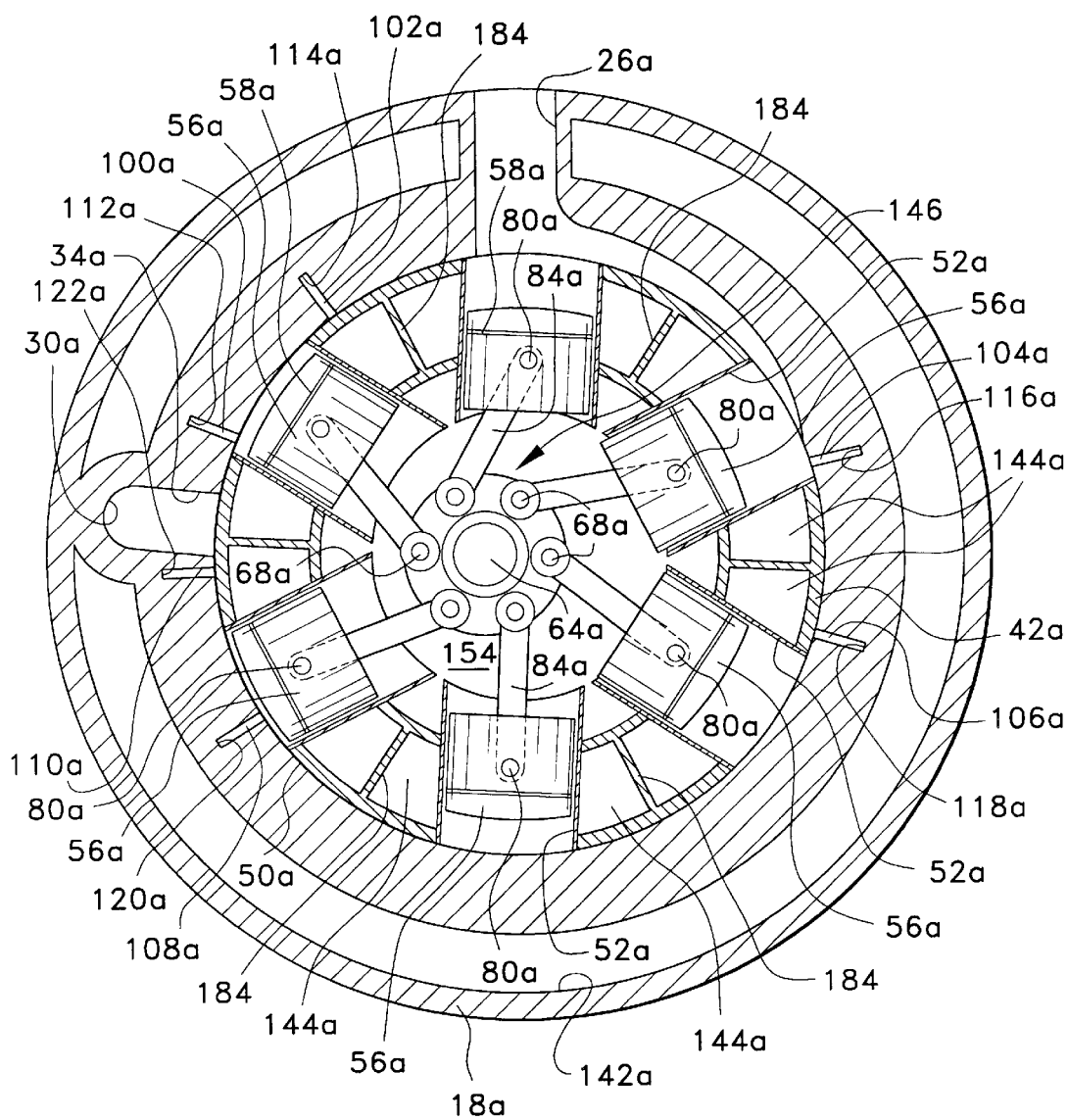
FIG. 21 is a diagrammatic cross sectional view, taken along a plane transverse to the longitudinal axis of the engine, showing the intake/compression cylinders of the engine of the present invention having a double roller timing chain, with one cylinder in registry with the intake port.

Referring to FIGS. 20 and 21, consider the rotation of the drum 14a in the clockwise direction. The eccentric location of the shaft 64a in combination with the fixed length of the piston rods 84a, cause the intake/compression pistons 56a to reciprocate within their respective cylinders 52a as the drum 14a rotates. To understand how the rotation of the drum 14a results in the reciprocating movement of the pistons 56a in the cylinders 52a, consider a piston 56a and its respective cylinder 52a initially in registry with the combustion chamber inlet 34a. This position is analogous to the top-dead-center or TDC position discussed in relation to the first embodiment. The piston 56a is at or near the top of the cylinder 52a, i.e. the piston 56a will be at the very top of its stroke within the cylinder 52a. The respective piston rod 84a being fixed in length, the piston 56a is at the top of its stroke when the open top of the cylinder 52a is closest to the circular orbit to which the crank pins 68a are confined. Recall that the double roller timing chain causes the sleeve 146, on which the crank pins 68a are supported, to rotate about the eccentric portion of the shaft 64a at the same rate as the drum 14a. Therefore, the crank pins 68a orbit the eccentric portion of the shaft 64a in a carousel fashion, and the crank pins 68a are confined to a circular orbit about the eccentric portion of the shaft 64a.

As the drum 14a continues to rotate in the clockwise direction, the open top of the cylinder 52a moves farther away from the orbit of the crank pins 68a. The length of the piston rod 84a being fixed, the piston 56a is pulled away from the open top of the cylinder 52a and toward the axis of rotation of the drum 14a, as the drum 14a continues to rotate in the clockwise direction. Thus, clockwise rotation of the drum 14a, with the particular cylinder 52a under consideration initially in registry with the combustion chamber inlet 34a, results in the movement of piston 56a further inward toward the axis of rotation of the drum 14a. This inward movement of the piston 56a continues until the piston 56a reaches the bottom of its stroke.

The piston 56a is at the bottom of its stroke when the open top of the cylinder 52a reaches a position intermediate the wiper seals 104a and 106a. As the drum 14a continues to rotate in a clockwise direction and the cylinder 52a moves from intermediate the wiper seals 104a and 106a back into registry with the combustion chamber inlet 34a, the open top of the cylinder 52a will again move closer to the orbit of the crank pin 68a, and given the fixed length of the piston rod 84a, the piston 56a will rise within its respective cylinder 52a until the piston 56a is once again at the top of its stroke and the entire cycle can be repeated again.

As each cylinder 52a sweeps past the intake port 26a, the piston 56a is still near the top of its stroke. Also the open top of the cylinder 52a is in communication with the intake port 26a. As the clockwise rotation of the drum 14a continues, the piston 56a continues to move inward within its respective cylinder 52a, thus increasing the volume between the top of the cylinder and the top of the piston and consequently creating a suction within the cylinder 52a. Air or a fuel/air mixture will move through the intake port 26a and into the cylinder 52a to fill the increasing volume. The fuel/air mixture may be supplied by a carburetor such as carburetor 40, or only air will be taken in by the cylinder 52a if fuel is being directly injected into the combustion chamber 30a. This process continues until the piston 56a reaches the bottom of its stroke. This portion of the operating cycle is generally known as the intake stroke or intake phase.

Once the piston 56a reaches the bottom of its stroke, the open top of the cylinder 52a becomes positioned intermediate the wiper seals 104a and 106a. As with the first embodiment, the wiper seals 104a and 106a are spaced apart such that an effective seal between the cylinders 52a, as they are going through the compression phase of their cycle, and the intake port 26a can be maintained as other intake/compression cylinders 52a sweep past the wiper seals 104a and 106a.

Once the cylinder 52a sweeps past the wiper seal 104a, the cylinder 52a becomes cut off from the intake port 26a. This event coincides with the beginning of the movement of the piston 56a from the bottom of its stroke to the top of its stroke. Thus as the drum 14a continues its clockwise rotation, the air or fuel/air mixture in the cylinder 52a gets compressed and the pressure thereof increases. Maximum pressure within the cylinder 52a is reached just as the cylinder 52a is about to sweep past the wiper seal 110a.

As with the first embodiment, it is important that the air or fuel/air mixture being compressed is not prematurely exposed to the combustion products in the combustion chamber 30a. Wiper seals 108a and 110a help keep the intake/compression cylinders 52a from premature exposure to the inlet 34a of the combustion chamber 30a. The wiper seals 108a and 110a are spaced relative to one another in the same manner as wiper seals 104a and 106a, such that at least one of the wiper seals 108a and 110a maintains an effective seal between the cylinders 52a, that are going through the compression phase of their cycle, and the combustion chamber inlet 34a as other intake/compression cylinders 52a sweep past the wiper seals 108a and 110a.

As each cylinder 52a sweeps past the wiper seal 110a, the respective piston 56a is at about the top of its stroke and the contents of each cylinder 52a are discharged into the combustion chamber 30a. As each cylinder 52a moves past the point at which its respective piston 56a is at the top of its stroke, the cylinder 52a encounters wiper seals 100a and 102a. It is essential that the inlet 34a of the combustion chamber 30a be isolated from the intake port 26a to prevent an explosive hazard in the case of a fuel/air mixture being supplied to the intake port 26a. It is also essential that the inlet 34a of the combustion chamber 30a be isolated from the intake port 26a in order to prevent loss of pressure at the outlet 36a of the combustion chamber 30a, and thus prevent a loss of power, in both the fuel/air mixture case and in the case of air only being supplied to the intake port 26a.

Here again, wiper seals 100a and 102a are used to seal the combustion chamber inlet 34a from the intake port 26a. The wiper seals 100a and 102a are spaced relative to one another in the same manner as wiper seals 104a and 106a, such that at least one of the wiper seals 100a and 102a maintains an effective seal between the combustion chamber inlet 34a and the intake port 26a as an intake/compression cylinder 52a sweeps past the wiper seals 100a and 102a. Once a cylinder 52a sweeps past the wiper seal 102a, the open top of the cylinder 52a is again in communication with the intake port 26a and the intake/compression cycle can begin anew.

Using well known timing circuitry, the spark plug 38a can be caused to generate a spark each time a piston 56a is at about the top of its stroke, this range including cylinder positions from just before sweeping wiper seal 110a to just past wiper seal 100a. At this time a fresh charge of fuel/air is in or is entering the combustion chamber 30a, and the spark will initiate the combustion process. The combustion of the fuel and air in the combustion chamber 30a provides a source of hot, high pressure gases at the combustion chamber outlet 36a.

Where air only is supplied to the combustion chamber 30a by the intake compression cylinders 52a, a fuel injection system for supplying fuel directly into the combustion chamber 30a will also need to be provided. The fuel injection system would inject a bolus of fuel into the combustion chamber 30a when each intake/compression piston 56a is at about the top of its stroke, this range including cylinder positions from just before sweeping wiper seal 110*a* to just past wiper seal 100*a*, shortly prior to the generation of the spark by the spark plug 38*a*. In the direct fuel injection case, alternatives to the spark plug 38*a* such as a glow plug or a plug sparking at a continuous high frequency may also be used. Carburetors, fuel injection systems, and ignition timing systems are well known in the art and will not be discussed in detail here.

Figure 22:
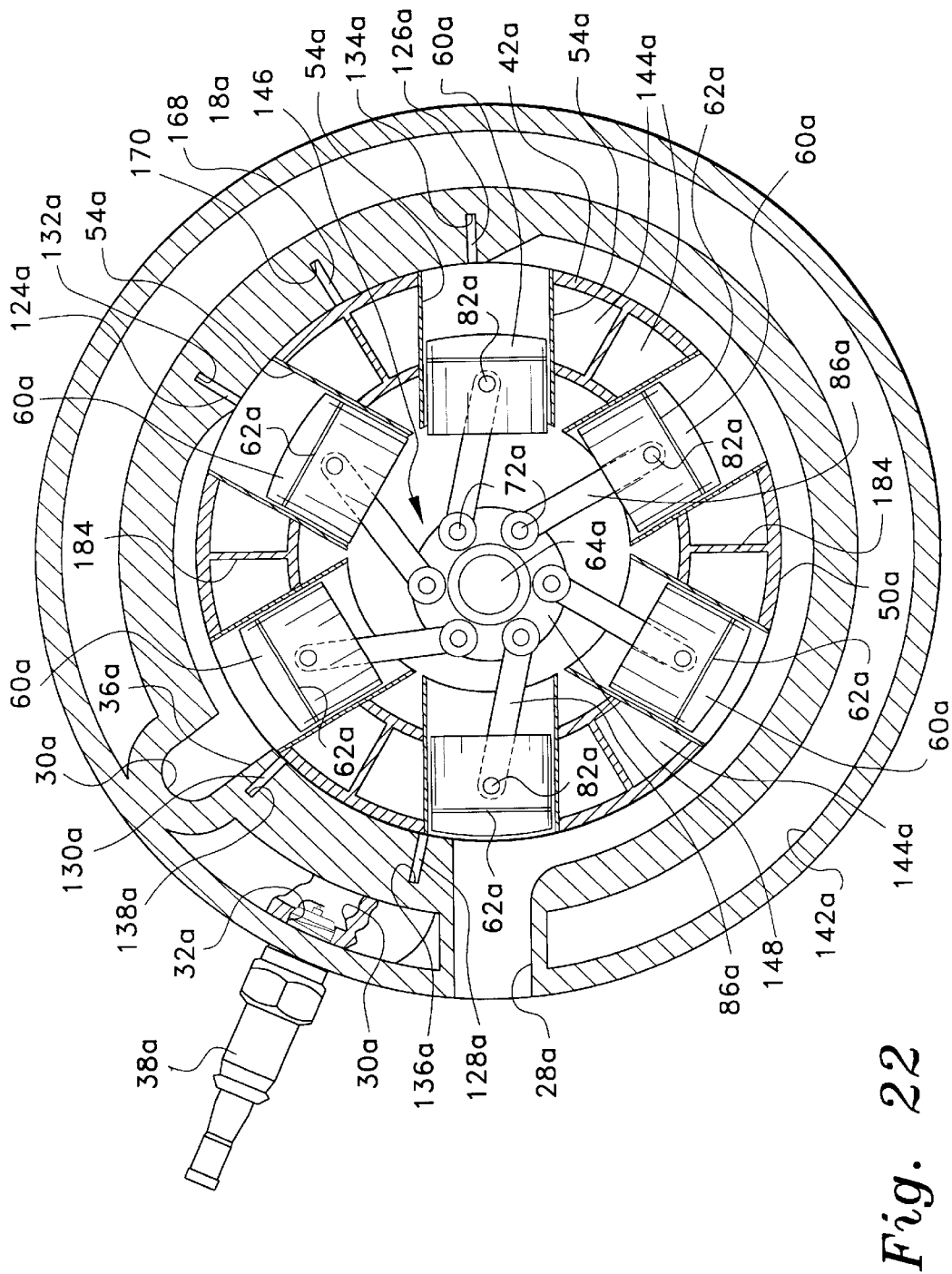
FIG. 22 is a diagrammatic cross sectional view, taken along a plane transverse to the longitudinal axis of the engine, showing the power/exhaust cylinders of the engine of the present invention having a double roller timing chain, with one cylinder in registry with the outlet of the combustion chamber.
Figure 23:
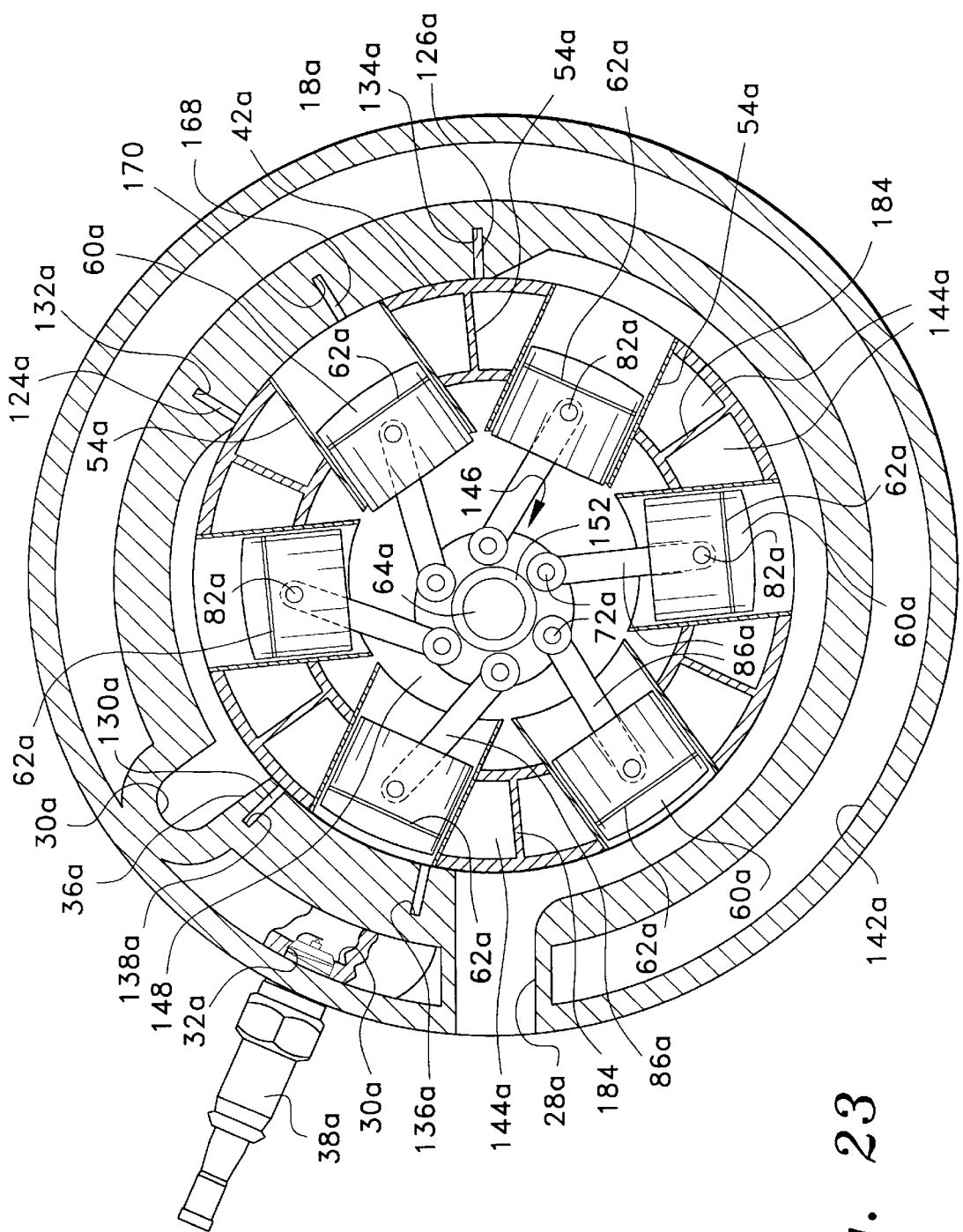
FIG. 23 is a diagrammatic cross sectional view, taken along a plane transverse to the longitudinal axis of the engine, showing the power/exhaust cylinders of the engine of the present invention having a double roller timing chain, after the drum has rotated thirty degrees relative to the position of the drum illustrated in FIG. 22.
Figure 24:
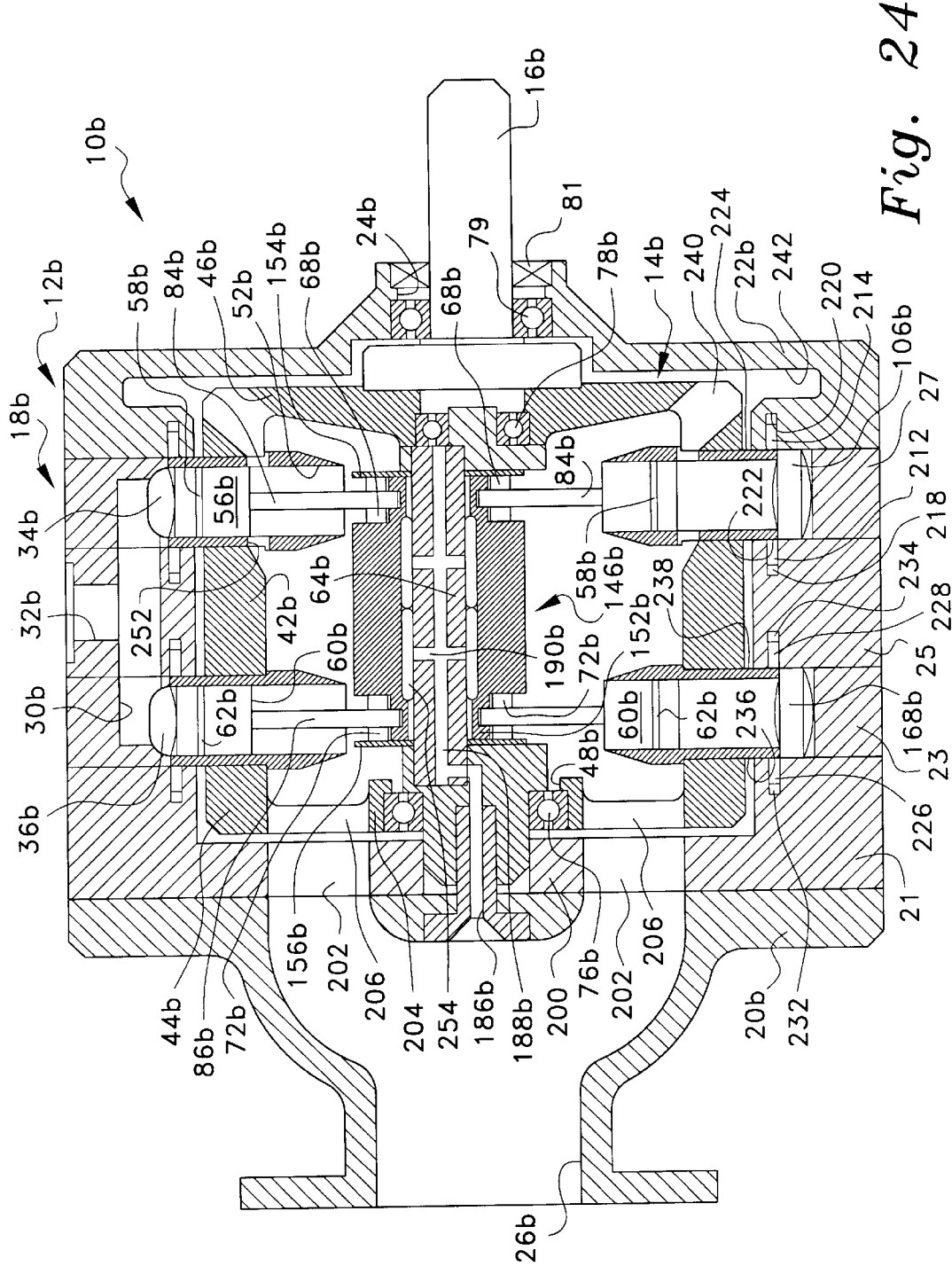
FIG. 24 is a diagrammatic cross sectional side view, taken along a plane parallel to the longitudinal axis of the engine, showing the internal arrangement of the components of the engine of the present invention having a centrifugal compressor feature.
Figure 25:
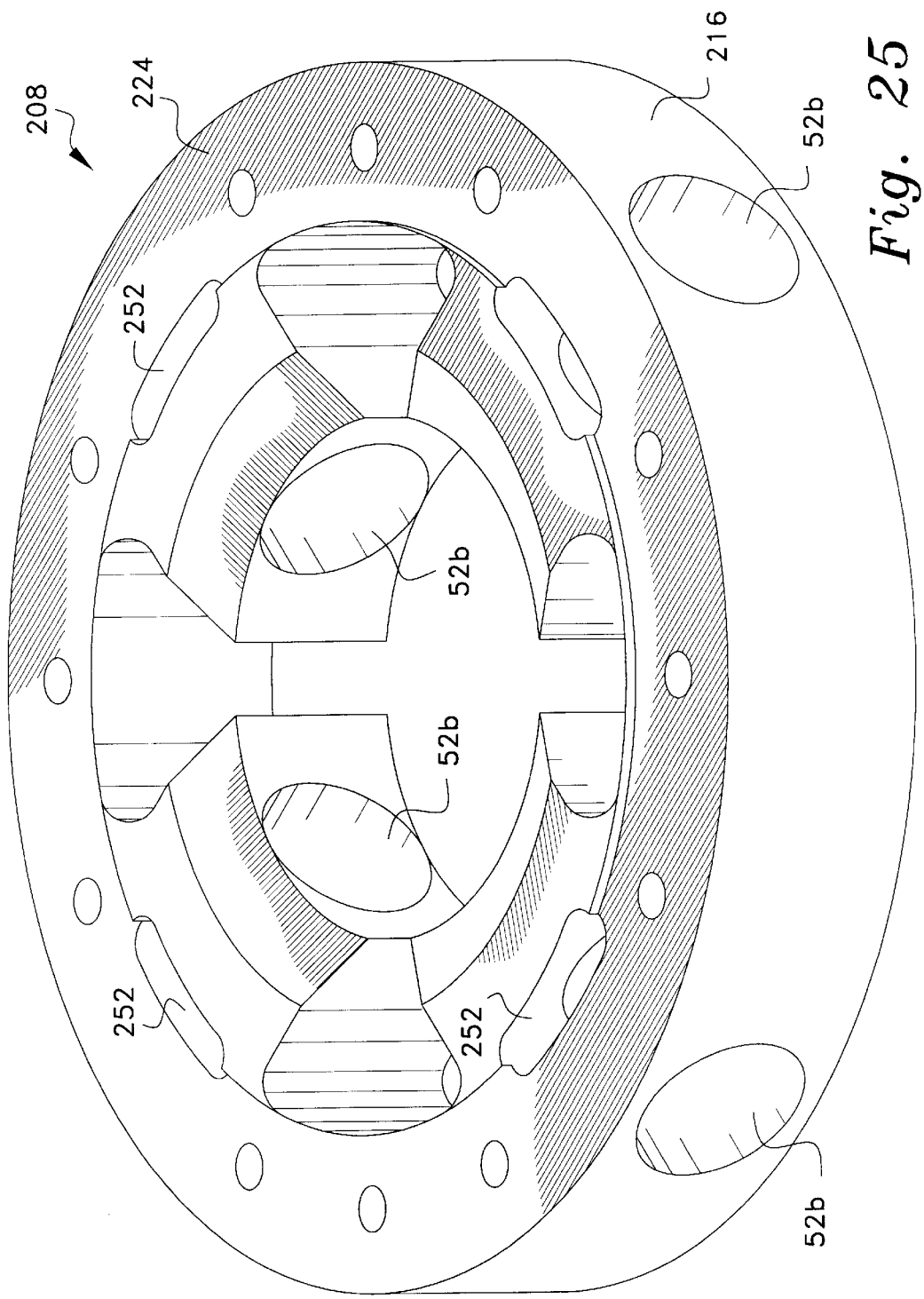
FIG. 25 is a perspective view of the section of the drum, of the engine having the centrifugal compressor feature, containing the intake/compression cylinders.
Figure 26:
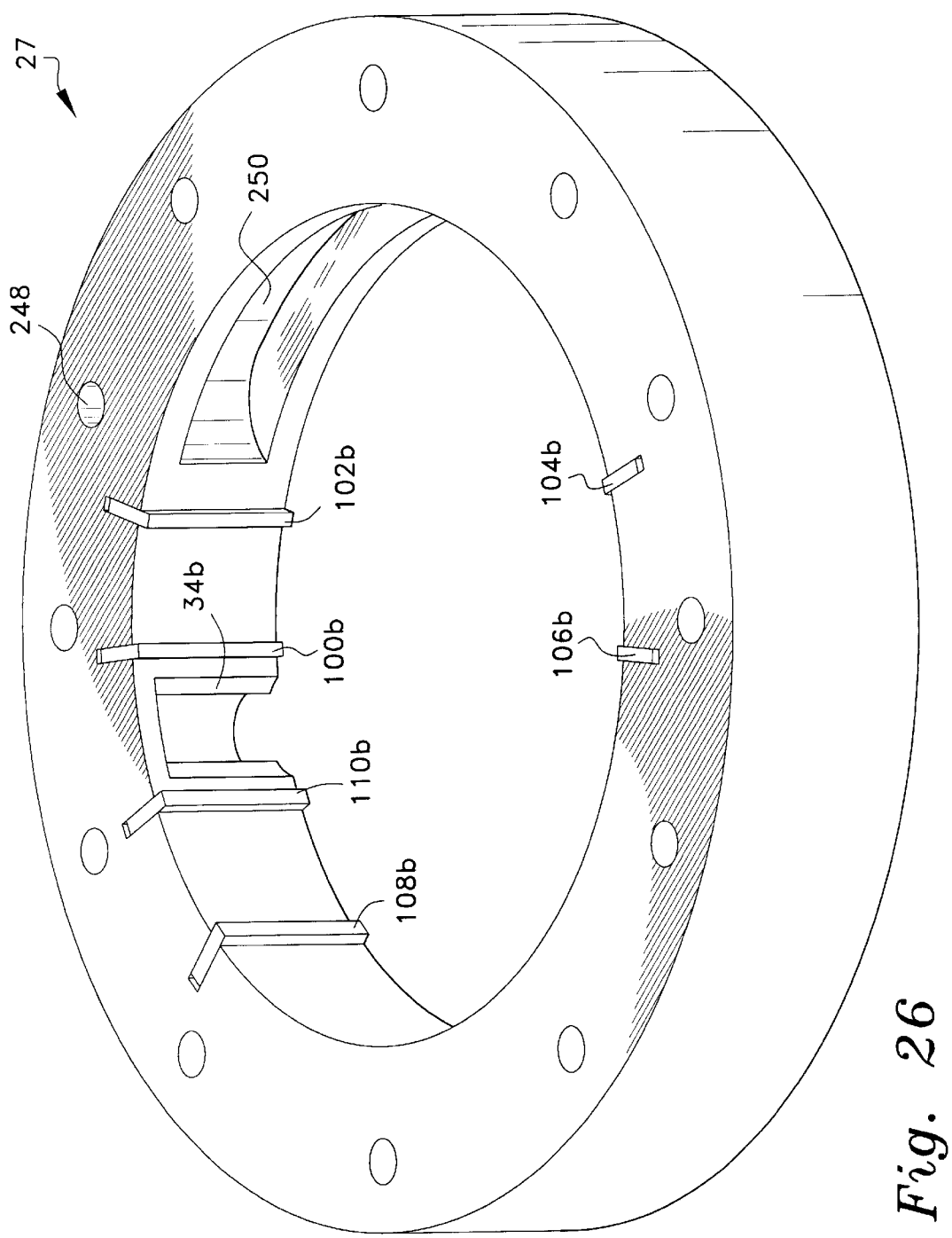
FIG. 26 is a perspective view of the section of the outer housing, of the engine having the centrifugal compressor feature, containing the inlet to the combustion chamber.
Figure 27:
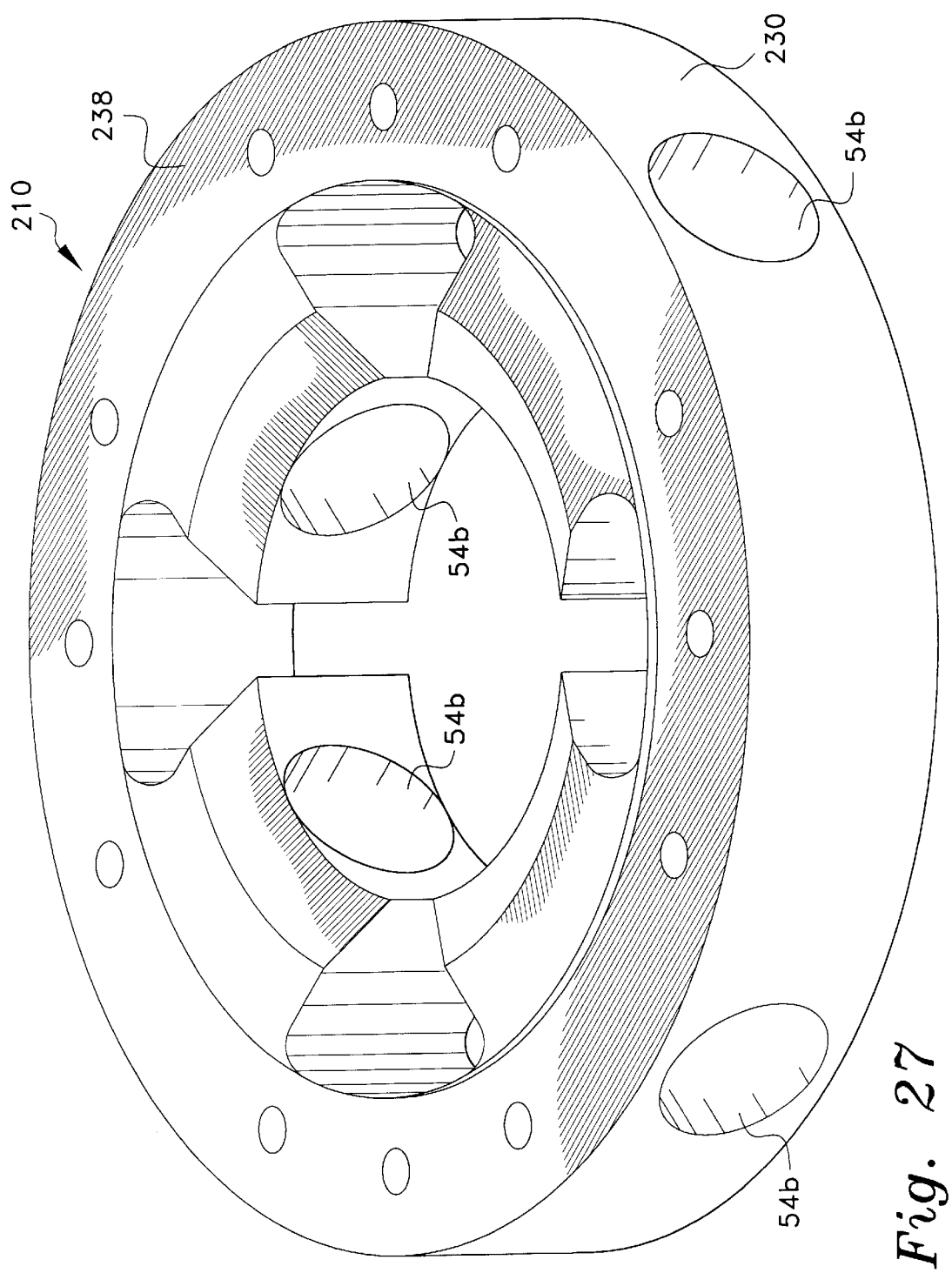
FIG. 27 is a perspective view of the section of the drum, of the engine having the centrifugal compressor feature, containing the power/exhaust cylinders.
Figure 28:
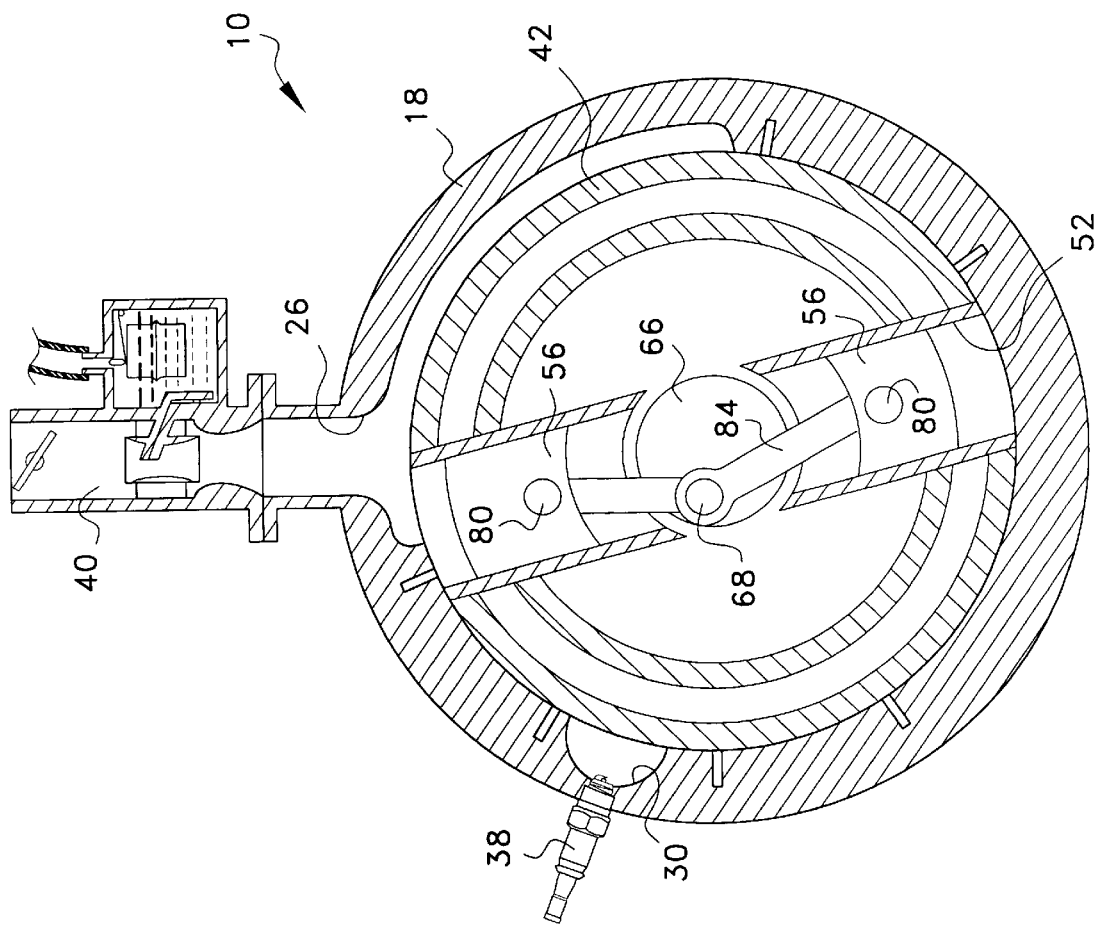
FIG. 28 is a diagrammatic cross sectional view, taken along a plane transverse to the longitudinal axis of the engine, showing the intake/compression cylinders of the engine having fixed crank pins, with a carburetor fixed to the intake port.
Figure 29:
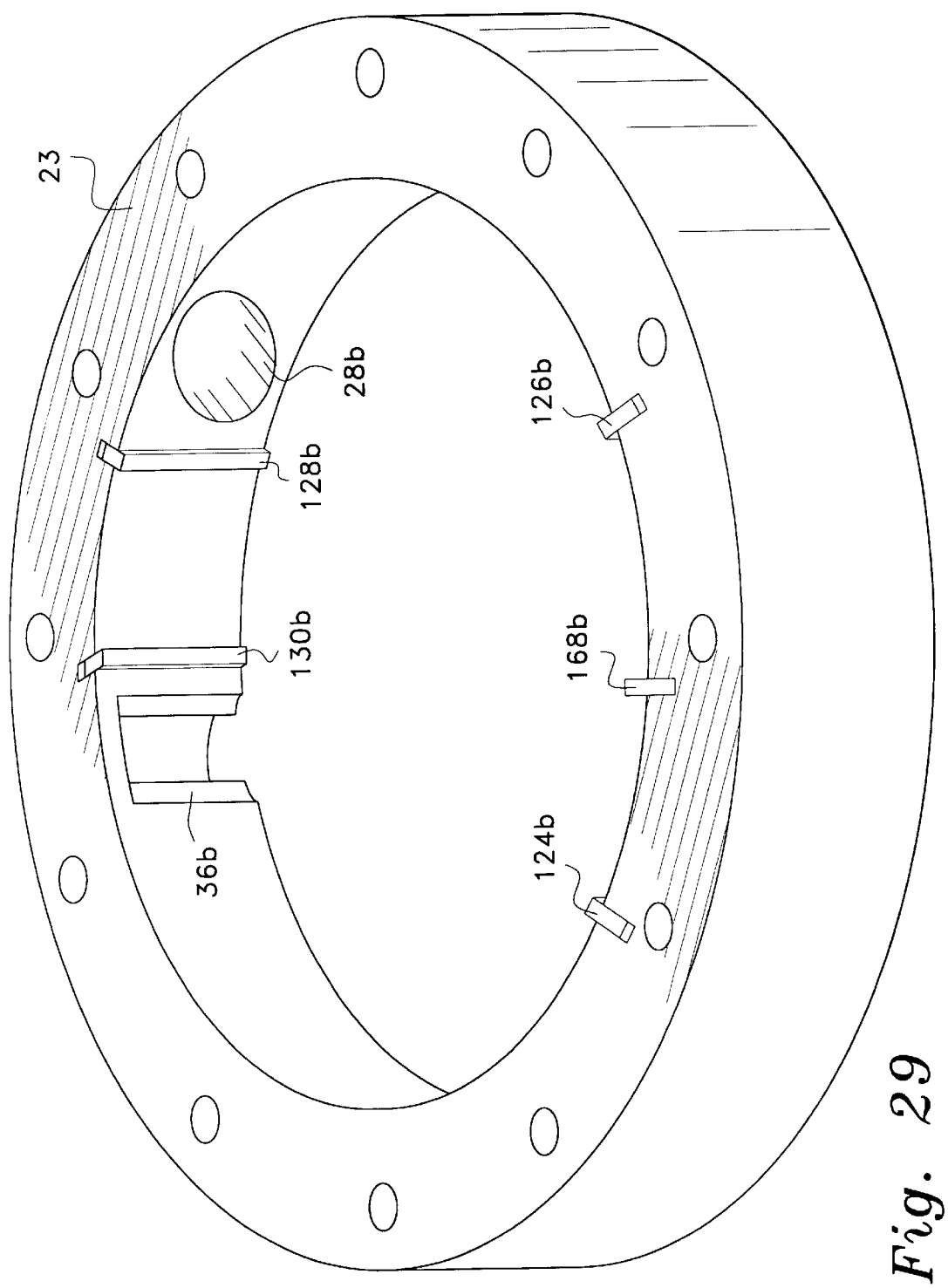
FIG. 29 is a perspective view of the section of the outer housing, of the engine having the centrifugal compressor feature, containing the outlet of the combustion chamber and the exhaust port.
Figure 30:
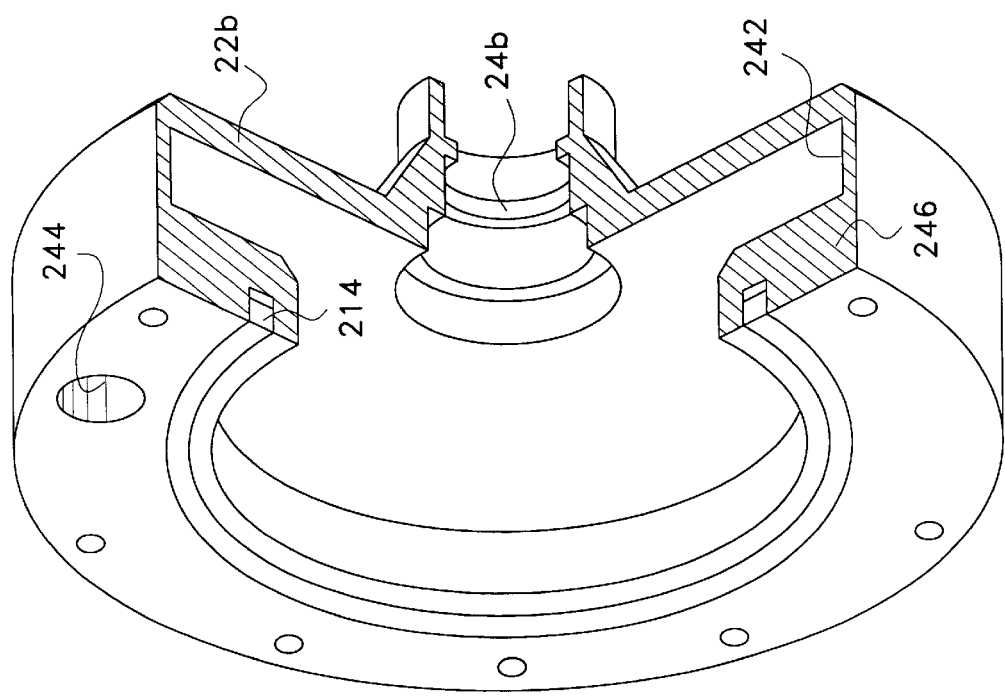
FIG. 30 is a cutaway perspective view of the endcap having the opening for the output shaft of the engine having the centrifugal compressor feature.

Referring to FIGS. 22 and 23, the power/exhaust pistons and cylinders 60*a* and 54*a* are geometrically identical to the intake/compression pistons and cylinders 56*a* and 52*a*, in the illustrated example. Further, each of the crank pins 68*a* is coaxial with a respective crank pin 72*a*. In addition, each intake/compression cylinder 52*a* is superimposed over a respective power/exhaust cylinder 54*a*, such that the longitudinal axes of each intake/compression cylinder 52*a* and its respective power/exhaust cylinder 54*a* are parallel to one another while being axially spaced apart from one another. Thus, as the drum 14*a* rotates, the power/exhaust pistons 60*a* reciprocate within their respective cylinders in exactly the same manner as the intake/compression pistons 56*a*. Also, the power/exhaust pistons 60*a* reach the top and bottom of their strokes at the same time and at the same angle of rotation of the drum 14*a* as their respective intake/compression pistons 56*a*.

At about the top of the stroke of each piston 60*a* or shortly thereafter, combustion takes place in the combustion chamber 30*a* generating a hot, high pressure gas within the combustion chamber 30*a*. Also at this time, a power/exhaust cylinder 54*a* is in fluid communication with the combustion chamber outlet 36*a*, and the respective piston 60*a* housed in that particular cylinder is near the top of its stroke. The high pressure combustion products, passing through the outlet 36*a*, impinge upon the piston 60*a* and exert a force upon the piston 60*a* which tends to push the piston 60*a* toward the axis of rotation of the drum 14*a*. As the drum 14*a* rotates in the clockwise direction and the piston 60*a* moves toward the bottom of its stroke, the piston 60*a* will remain in fluid communication with the combustion chamber outlet 36*a* until the piston 60*a* is at about the bottom of its stroke. Also at this time, the respective cylinder 54*a* has just swept past the wiper seal 124*a*.

An advantageous feature of the second embodiment of the engine of the present invention is that, each piston rod 86*a* can pivot both at its attachment to its respective wrist pin 82*a* and at its attachment to its respective crank pin 72*a*. This feature means that for the most part the only loads imparted to the piston rods 86*a* are those loads that are directed along an axis extending from the center of a wrist pin 82*a* to the center of the corresponding crank pin 72*a*. In other words, the loads imparted to the piston rods 86*a* are mostly compressive or tensile rather than shearing loads. Metals being stronger in tension or compression rather than in shear, this feature reduces the likelihood of piston rod breakage.

In the illustrated example, the axis extending from the center of a wrist pin 82*a* to the center of the crank pin 72*a* trails or is on the lagging side of the radius of the drum 14*a* which is coincident with the longitudinal axis of the respective cylinder 54*a*, when each piston 60*a* is at top-dead-center within its respective cylinder and during most of the power phase of the operating cycle of each of the pistons 60*a*. However, having the center-to-center axis between the wrist pin 82*a* and the crank pin 72*a* lag the longitudinal axis of the respective cylinder 54*a*, is not a requirement for the proper operation of the second embodiment 10*a* of the present invention. In fact, the center-to-center axis between the wrist pin 82*a* and the crank pin 72*a* may be coincident with or even lead the longitudinal axis of the respective cylinder 54*a*, at top-dead-center, without rendering the engine 10*a* inoperative.

Regardless of the position of the center-to-center axis between the wrist pin 82*a* and the crank pin 72*a* relative to the longitudinal axis of the respective cylinder 54*a*, the pressure of the combustion products within each cylinder 54*a* during the power phase will tend to push each piston 60*a* radially inward. The only way in which the pressure exerted by the combustion products during the power phase can be accommodated, is for the drum 14*a* to rotate and allow the pistons 60*a* to move toward their bottom-dead-center positions. Thus, the force exerted on the each piston 60*a* by the combustion products causes the rotation of the drum 14*a* which in turn causes rotation of the output shaft 16*a* and the production of useful work.

Near the top of their strokes, both the intake/compression piston 56*a* and the power/exhaust piston 60*a* are exposed to combustion products, however, the exposure of the piston 56*a* is very brief. Shortly thereafter, the cylinder 52*a* sweeps past the wiper seal 100*a* and is no longer exposed to the combustion products. Further, during exposure the piston 56*a* is at or near the top of its stroke, therefore, very little combustion products are carried away by the cylinder 52*a*. In addition, fluid communication between each cylinder 52*a* occurs when each piston 56*a* is near the top of its stroke and thus each cylinder 52*a* is at maximum pressure. Further, the power/exhaust cylinders 54*a* are exposed to the high pressure combustion products for a much longer period than the intake/compression cylinders 52*a*. Thus, high pressure can be maintained in the combustion chamber 30*a* and power derived from the power/exhaust cylinders 54*a*, without any adverse effect on the operation of the intake/compression cylinders 52*a*. Furthermore, the burning rate of the fresh fuel/air mixture supplied to the combustion chamber 30*a* at the end of each compression stroke is finite, therefore, it may well be the case that very little combustion of the fresh fuel/air mixture can take place by the time each cylinder 52*a* is sealed off from the combustion chamber inlet 34*a* by the wiper seal 100*a*. In any event, most of the combustion products will remain available to fill the power/exhaust cylinders 54*a* at high pressure to thereby efficiently deliver power to the output shaft 16*a* of the engine 10*a*.

As the drum 14*a* continues its rotation and each piston 60*a* moves toward the bottom of its stroke, more high pressure combustion products continue to fill the increasing volume of the cylinders 54*a* and to exert pressure on the pistons 60*a*. When each cylinder 54*a* has moved past the wiper seal 124*a*, the cylinder 54*a* is filled with combustion products. Shortly thereafter the cylinder 54*a* sweeps over the wiper seal 126*a*. As each cylinder 54*a* sweeps over the wiper seal 126*a*, the seal maintained by the wiper seal 126*a* is broken and the internal volume of the cylinder 54*a* essentially becomes exposed to the exhaust port 28*a*. However, because of the seal 124*a*, the cylinders 54*a* that are still in their power phase remain sealed off from the exhaust port 28*a*. Thus, the high pressure at the combustion chamber outlet 36*a* is maintained even as some cylinder 54*a* sweeps over the wiper seals 124*a*, 168, and 126*a*.

At this point in the cycle, each piston 60*a* is approximately at the bottom of its stroke. As each cylinder 54*a* continues to move in the clockwise direction along its circular path, its respective piston 60*a* moves up within the cylinder 54*a*, expelling the combustion products contained in the cylinder 54*a* through the exhaust port 28*a*. As each cylinder 54*a* moves past the exhaust port 28*a*, wiper seals 128*a* and 130*a* are encountered in that order. With the wiper seals 128*a* and 130*a* arranged as illustrated, as each cylinder 54*a* moves over the wiper seals 128*a* and 130*a*, one of the wiper seals 128*a* and 130*a* will continue to seal the combustion chamber outlet 36a from the exhaust port 28a even as the seal maintained by the other wiper seal is broken. The combustion chamber outlet 36a must always be sealed off from the exhaust port 28a so that the combustion products cannot flow from the combustion chamber outlet 36a to the exhaust port 28a without first imparting their energy to the pistons 60a during the power phase of the pistons' cycle. Once past the wiper seal 130a, each cylinder 54a and its respective piston 60a are once again ready to resume the power/exhaust cycle, thus providing for continuous operation of the engine 10a. As the combustion process powers the rotation of the drum 14a, the output shaft 16a, being fixedly attached to the drum 14a, is also set in rotational motion and can be used to power other machinery.

Figure 7:
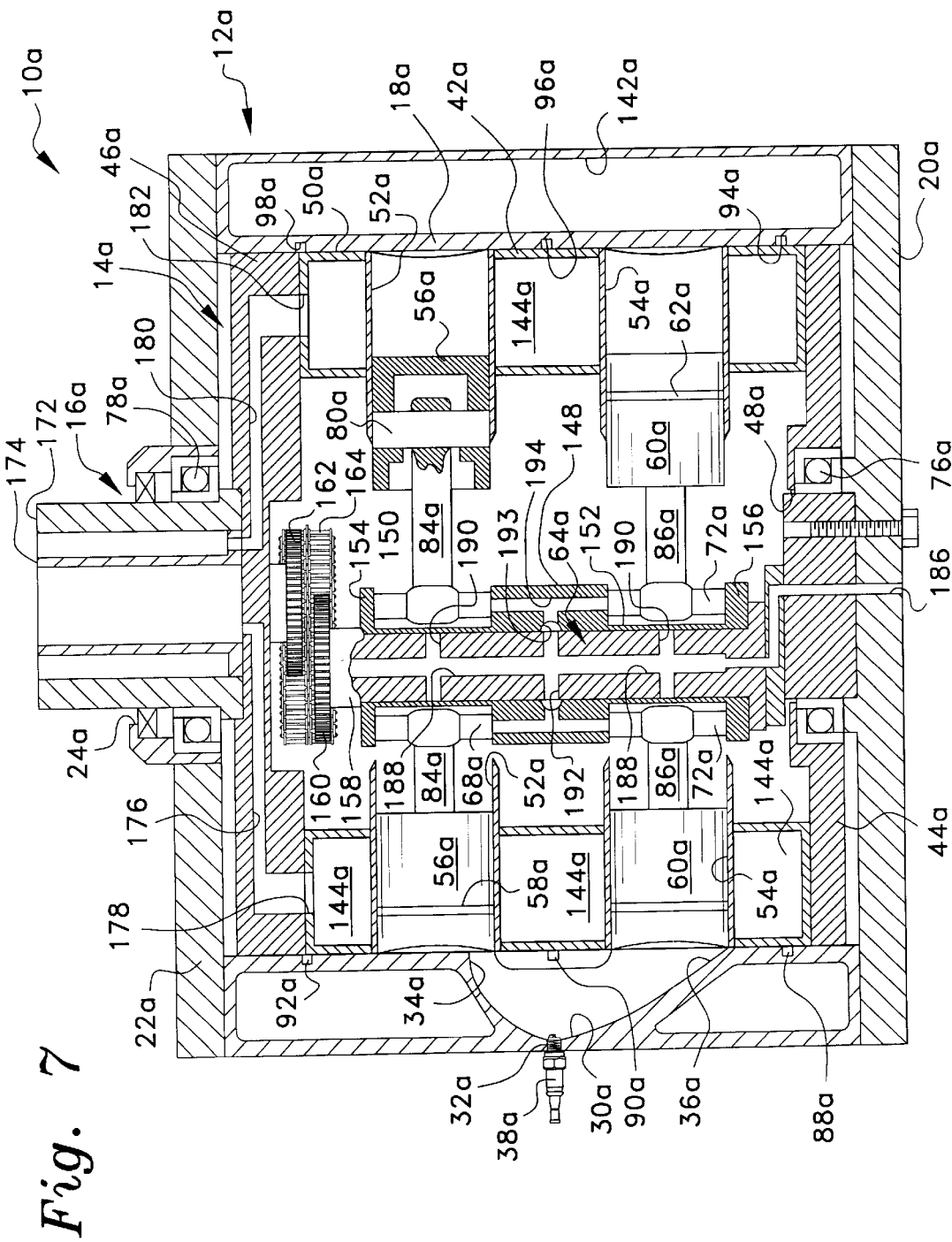
FIG. 7 is a diagrammatic cross sectional side view, taken along a plane parallel to the longitudinal axis of the engine, showing the internal arrangement of the components of the engine of the present invention having crank pins supported by a rotatable sleeve and a double roller timing chain controlling the rotation of the sleeve.
Figure 10:
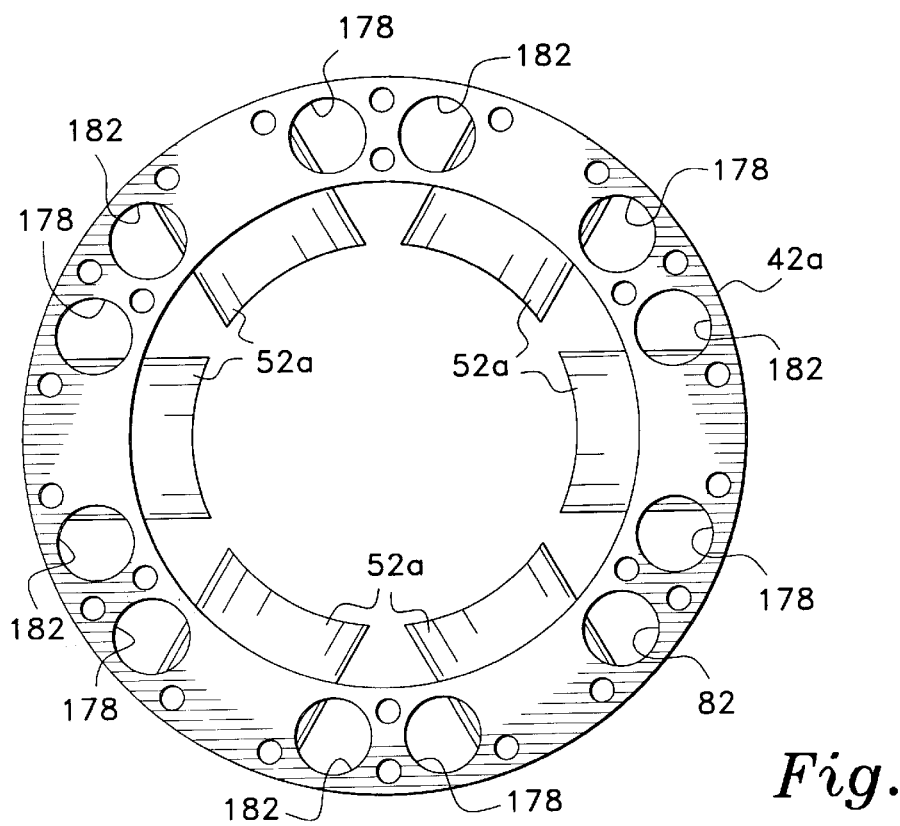
FIG. 10 is a head-on view, along the longitudinal axis, of the peripheral wall of the drum of the embodiment of the present invention having crank pins supported by a rotatable sleeve and a double roller timing chain controlling the rotation of the sleeve.
Figure 11:
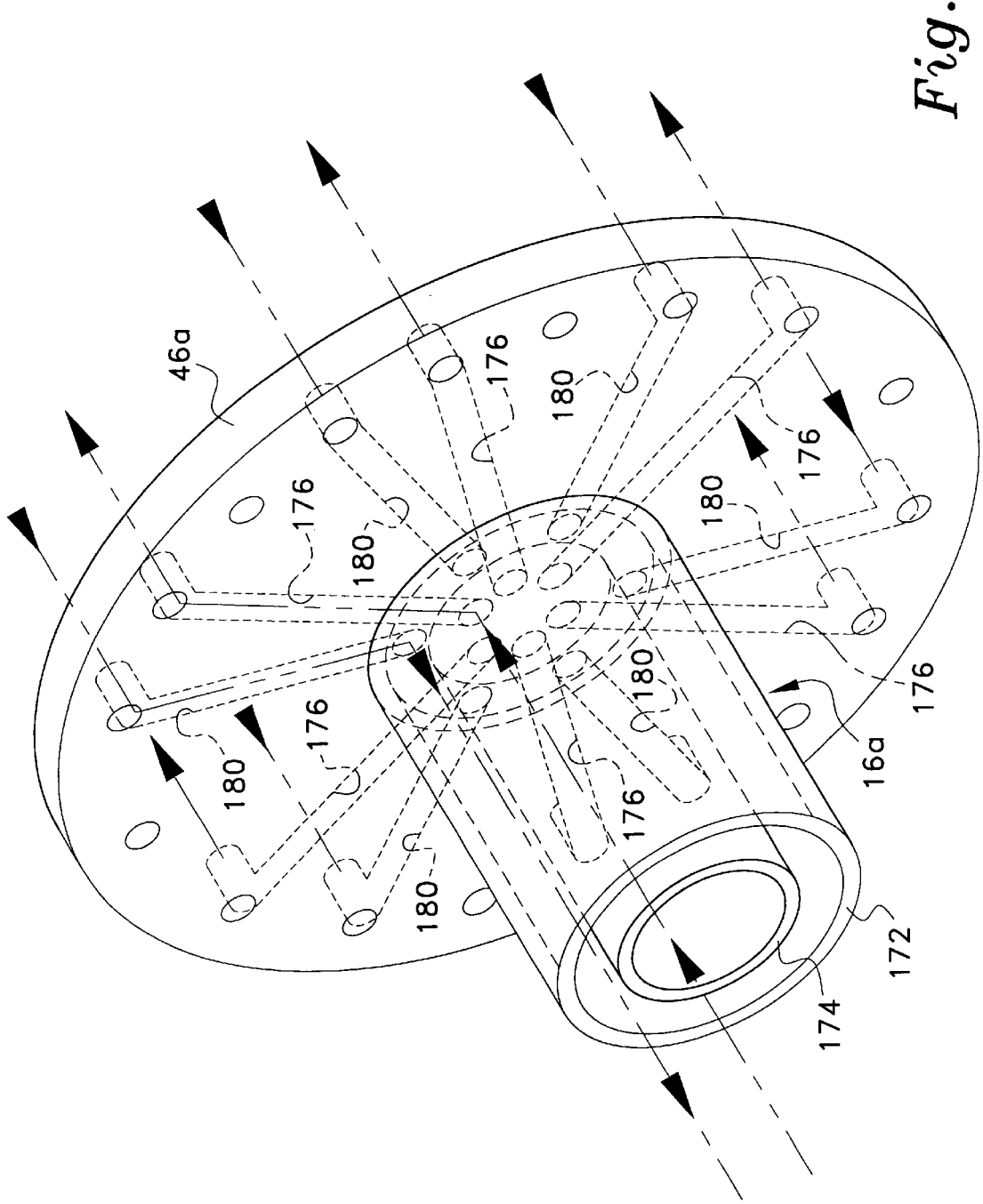
FIG. 11 is a diagrammatic perspective view of the endcap, having the output shaft fixed thereto, of the drum of the engine of the present invention, showing the coolant flow passages in phantom lines.
Figure 12:
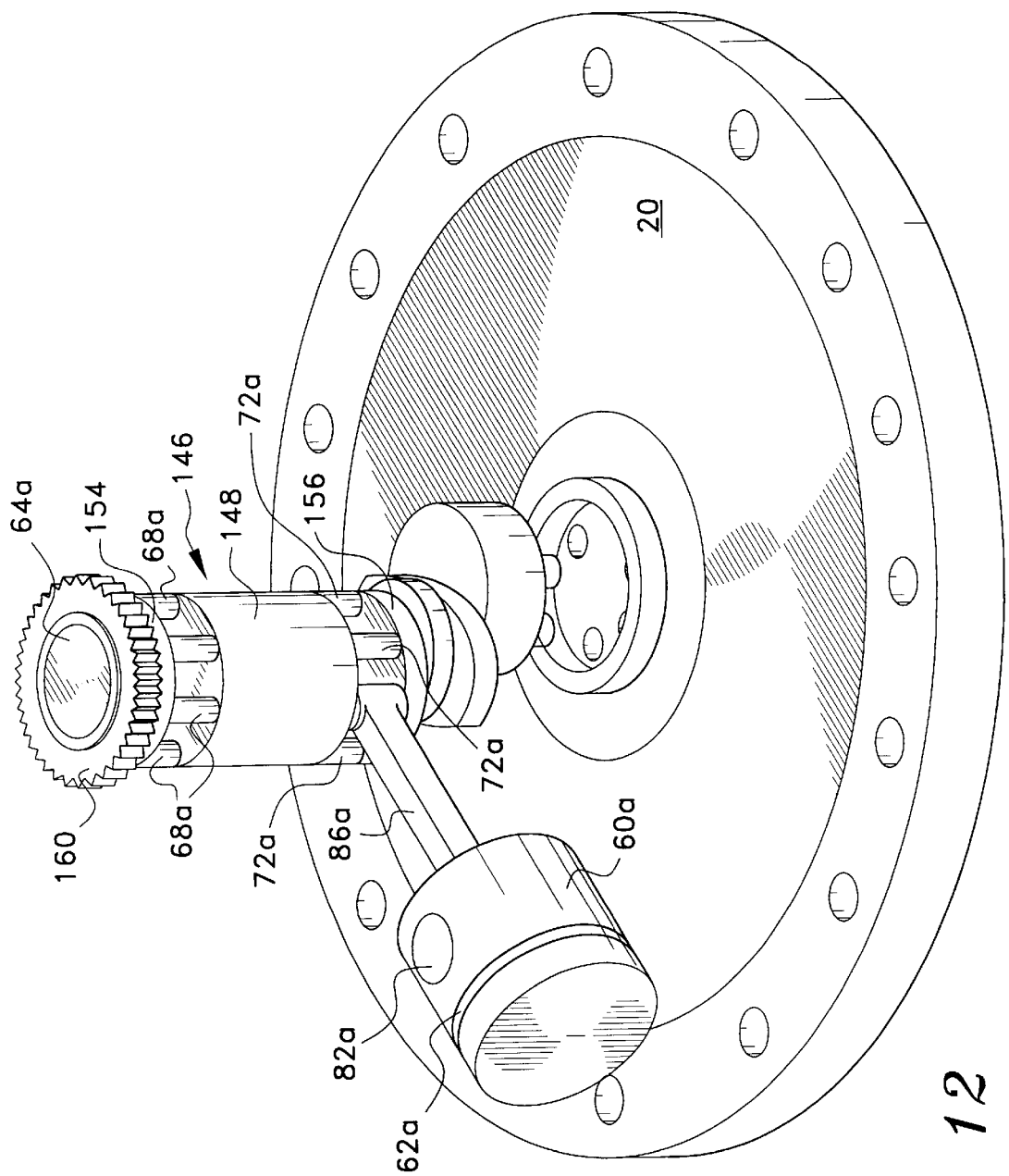
FIG. 12 is a diagrammatic, exploded, perspective view showing the spatial relationship between the eccentric shaft and the rear endcap of the outer housing of the engine having a double roller timing chain.
Figure 13:
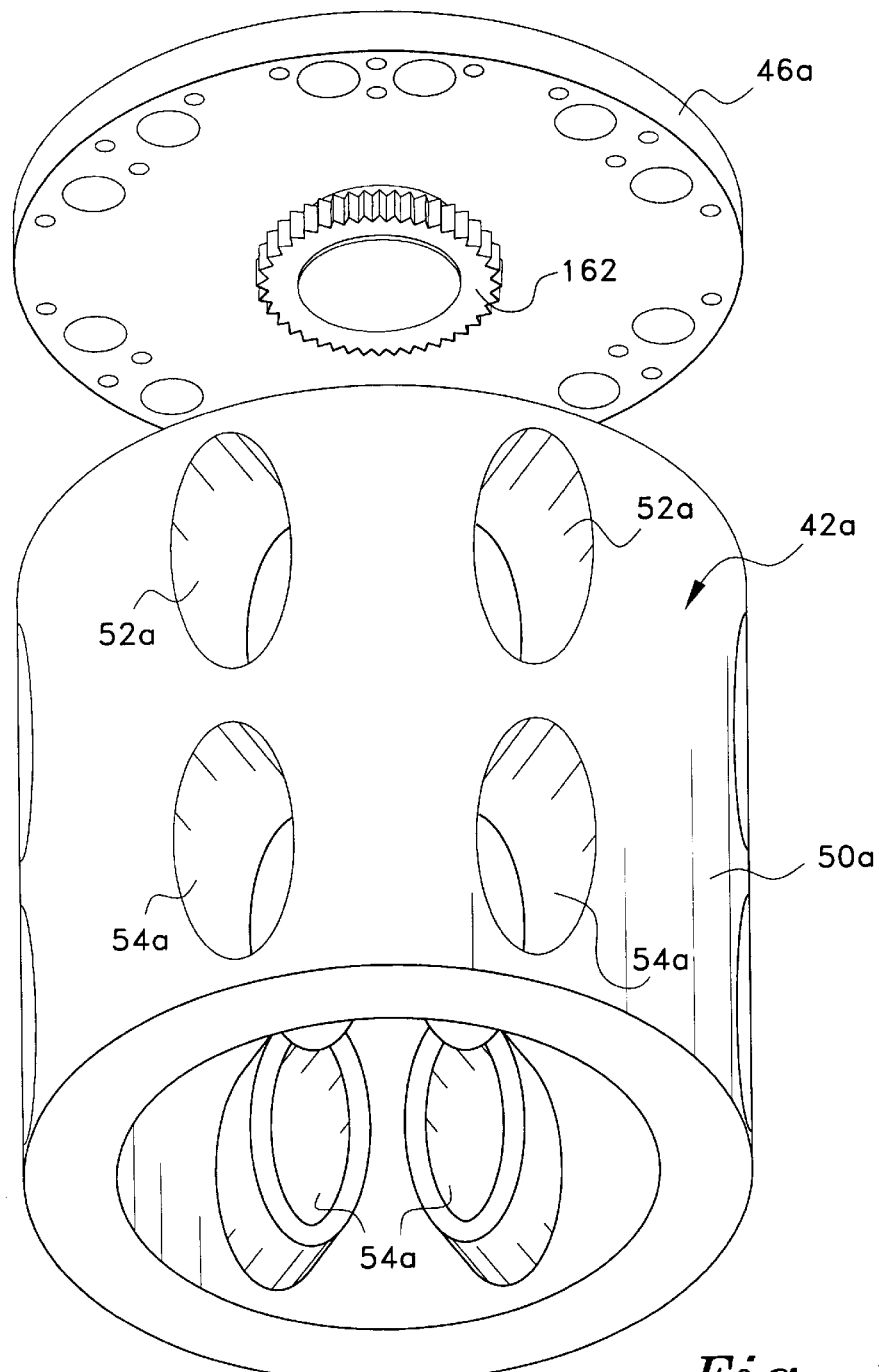
FIG. 13 is a diagrammatic, exploded, perspective view showing the spatial relationship between the cylindrical wall of the drum and the endcap having the output shaft fixed thereto, also showing the timing sprocket that is fixed to the drum of the engine having the double roller timing chain.

The peripheral wall 18a and the peripheral wall 42a are provided with cavities 142a and 144a, respectively, to allow circulation of a coolant fluid through the engine 10a. Each cavity 144a surrounds a superimposed pair of cylinders 52a and 54a. Coolant fluid is supplied to the peripheral wall 42a of the drum 14a through the output shaft 16a. Referring to FIGS. 7, 10, and 11, the output shaft 16a is made of two coaxial pipe sections 172 and 174. The pipe sections 172 and 174 are fixedly attached to the endcap 46a. A plurality of internal coolant passages 176 are provided in the endcap 46a. The inlets of the coolant passages 176 communicate with the bore of the inner pipe 174, while the outlet of each passage 176 communicates, through a respective opening 178, with a respective one of the cavities 144a. A plurality of internal coolant passages 180 are provided in the endcap 46a. The outlets of the coolant passages 180 communicate with the annular volume between the inner surface of the outer pipe 172 and the outer surface of the inner pipe 174. The inlet of each coolant passage 180 communicates, through a respective opening 182, with a respective one of the cavities 144a.

Figure 8:
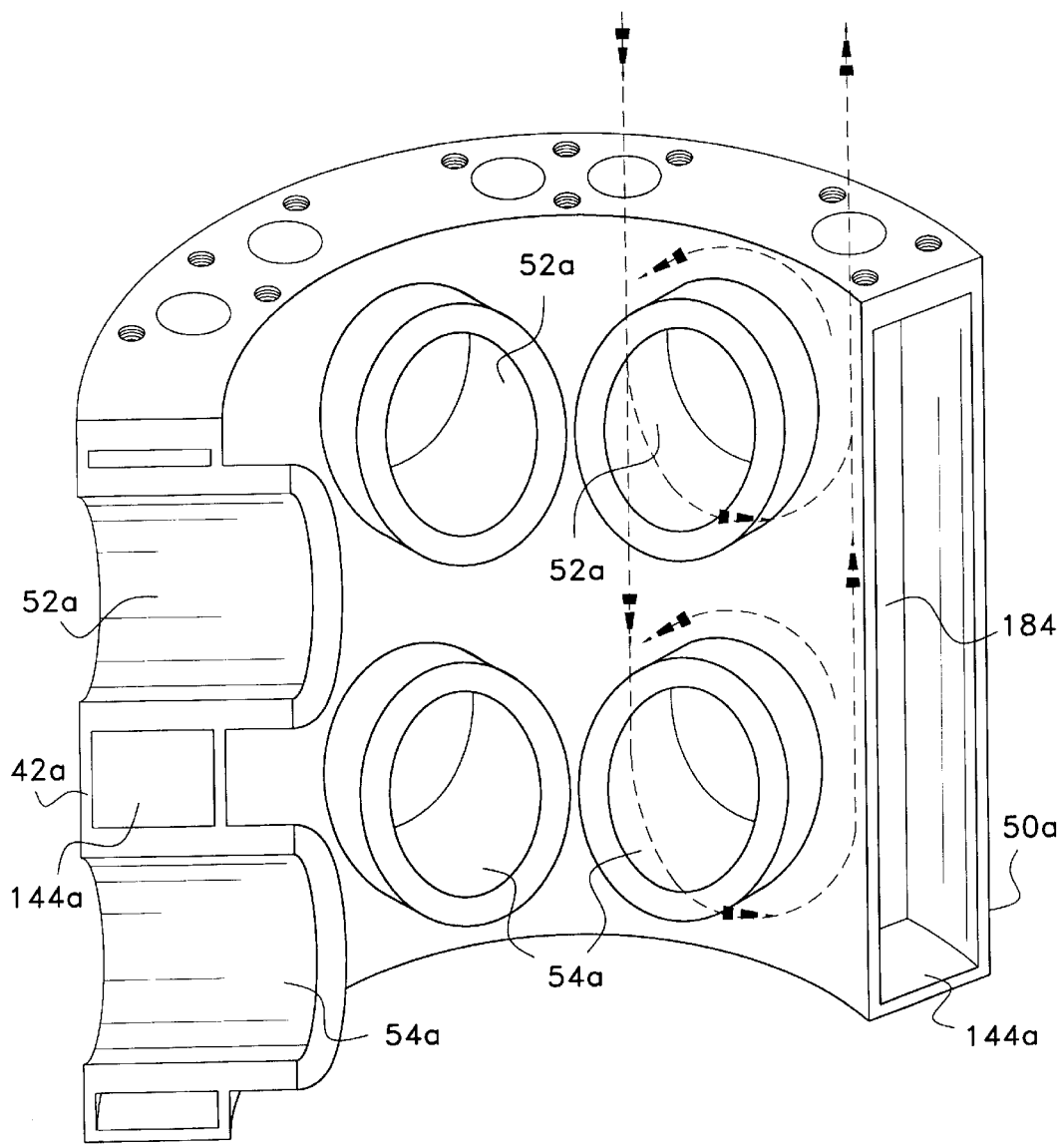
FIG. 8 is a diagrammatic fragmentary view showing the flow path of coolant fluid through the cylindrical peripheral wall of the rotating drum of the engine of the present invention.
Figure 9:
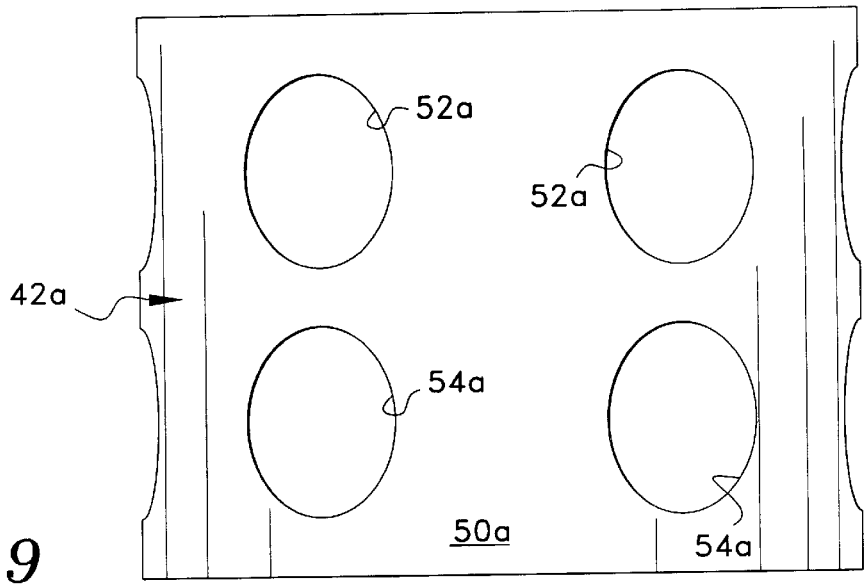
FIG. 9 is an elevational side view of the peripheral wall of the drum of the embodiment of the present invention having crank pins supported by a rotatable sleeve and a double roller timing chain controlling the rotation of the sleeve.

Coolant fluid is pumped by an auxiliary coolant pump (not shown) into the bore of the inner pipe 174. The coolant fluid then flows through the passages 176 and into the cavities 144a. As shown in FIG. 8, the coolant then flows around the outer surfaces of the cylindrical sleeves forming the cylinders 52a and 54a. After flowing through the cavities 144a, the coolant flows into the passages 180 and subsequently into the volume intermediate the inner and outer pipes 174 and 172. From the volume intermediate the inner and outer pipes 174 and 172, the coolant is circulated through a heat exchanger (not shown) and then back to the coolant pump. Pumps and heat exchangers are well known and therefore they have not been shown in the attached illustrations. Walls or baffles 184 separate the cavities 144a from one another (see FIGS. 8 and 20–23).

Coolant is circulated through the cavity 142a separately through an inlet and an outlet (not shown) of the cavity 142a. As with coolant circulated through the drum 14a, the coolant is circulated through the cavity 142a by a pump and the coolant is circulated back to the pump via a heat exchanger. The same pump and heat exchanger can be used for both coolant circuits.

Figure 15:
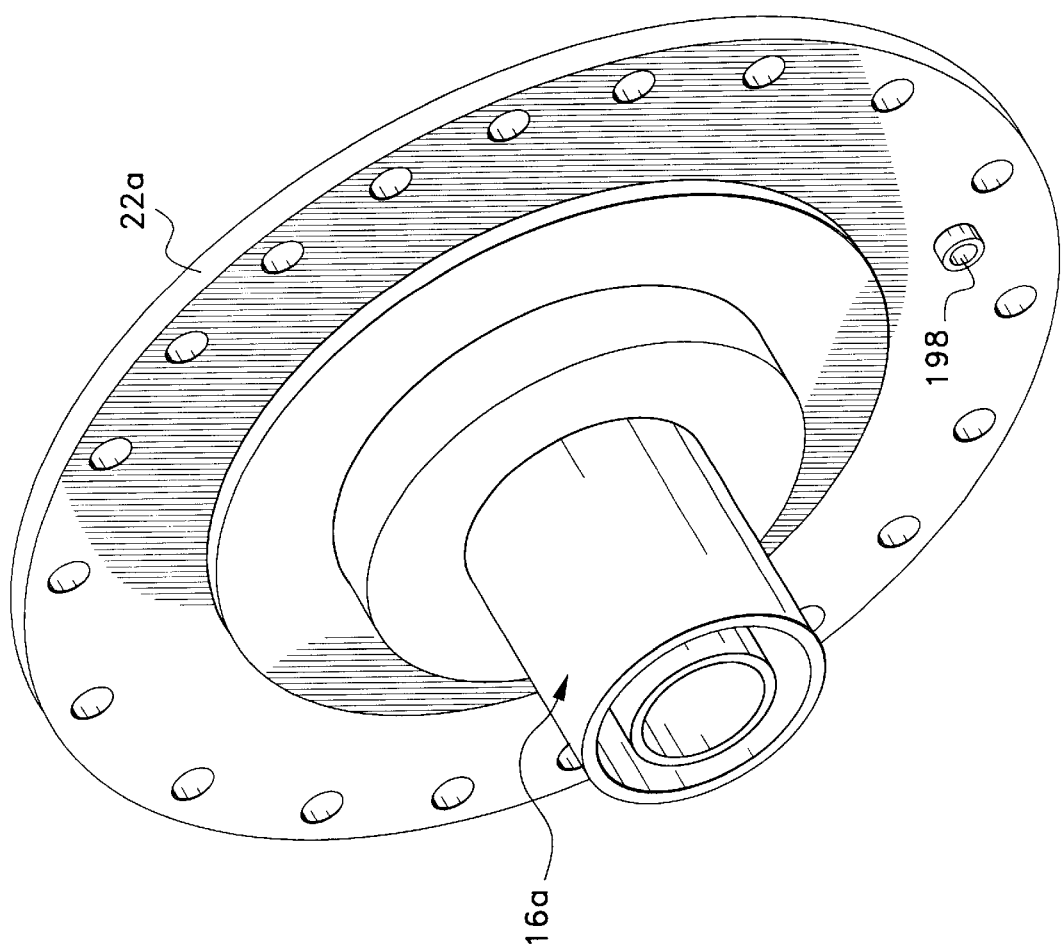
FIG. 15 is a perspective view showing the front endcap of the outer housing of the engine having a double roller timing chain.
Figure 16:
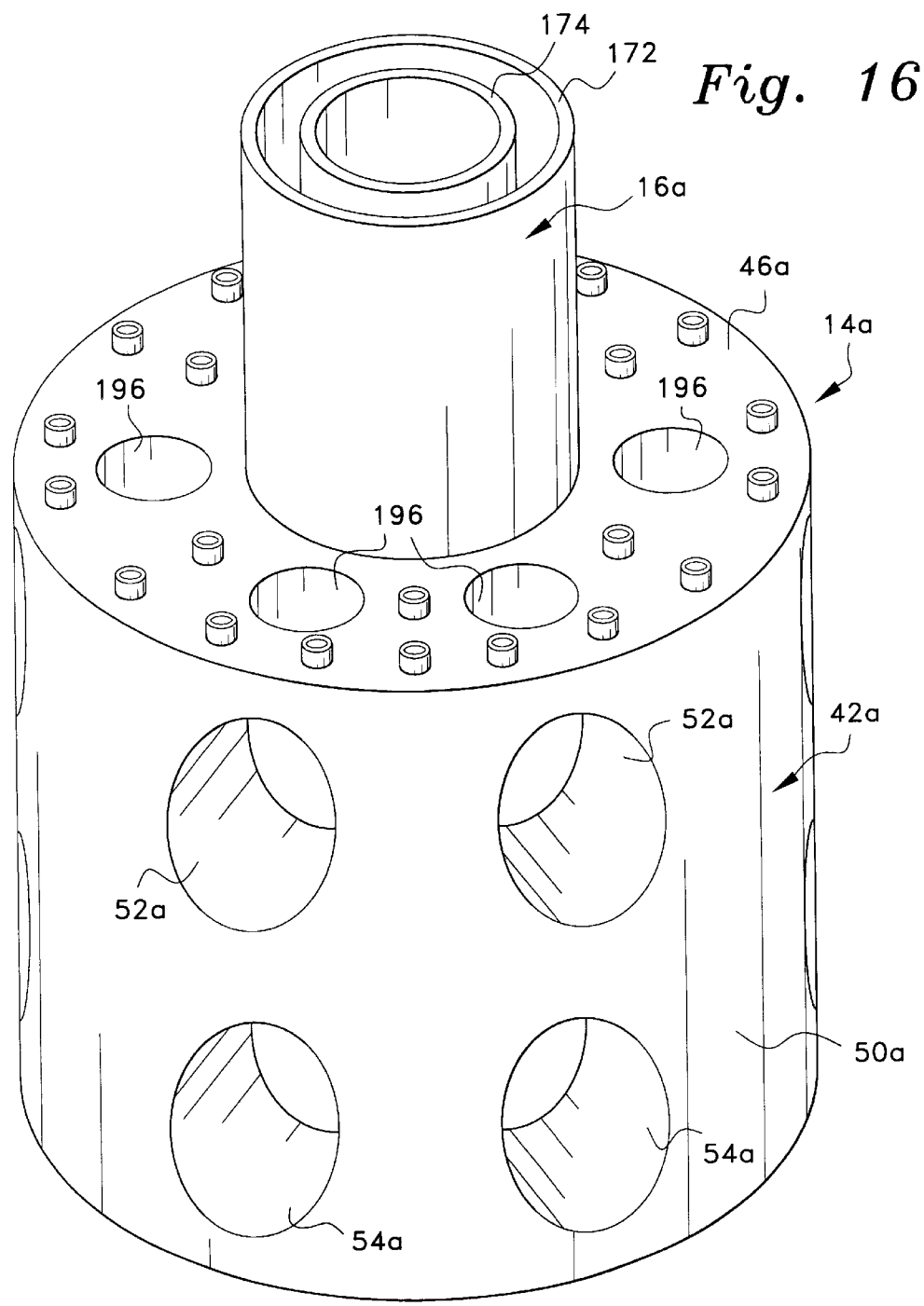
FIG. 16 is a perspective view of the fully assembled drum of the engine having a double roller timing chain.
Figure 17:
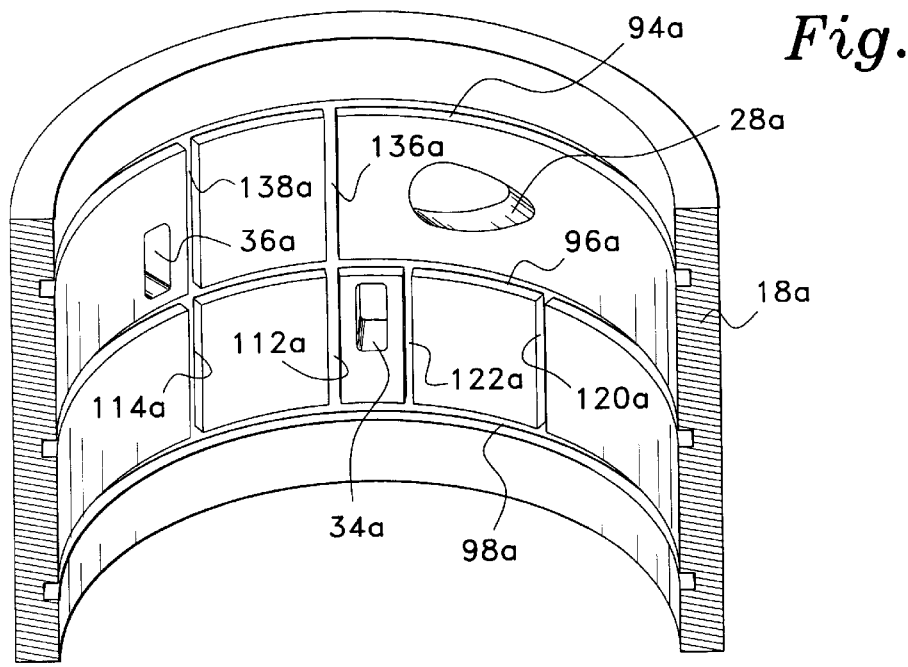
FIG. 17 is a fragmentary view of the outer casing of the engine having a double roller timing chain, showing the inlet and outlet of the combustion chamber and the exhaust port.
Figure 18:
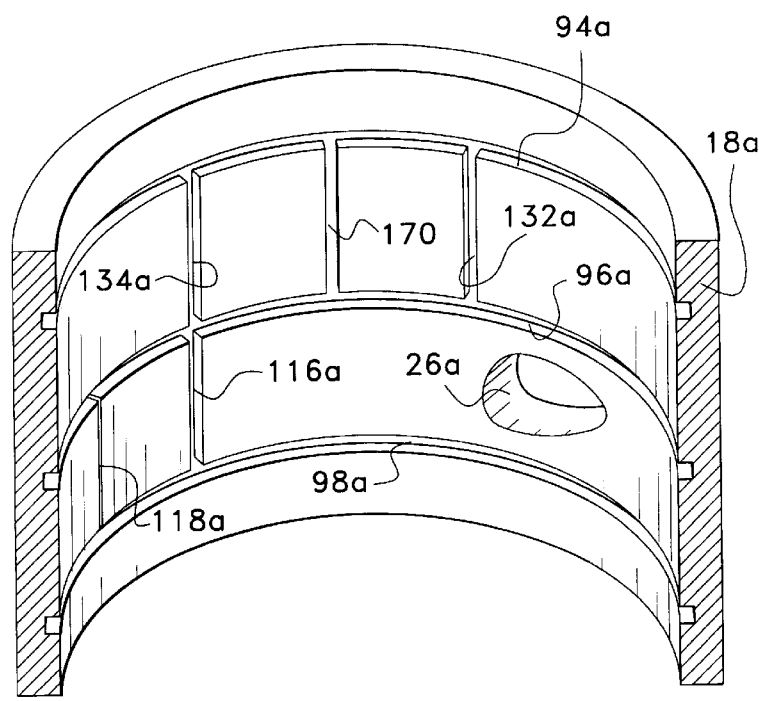
FIG. 18 is a fragmentary view of the outer casing of the engine having a double roller timing chain, showing the intake port.
Figure 19:
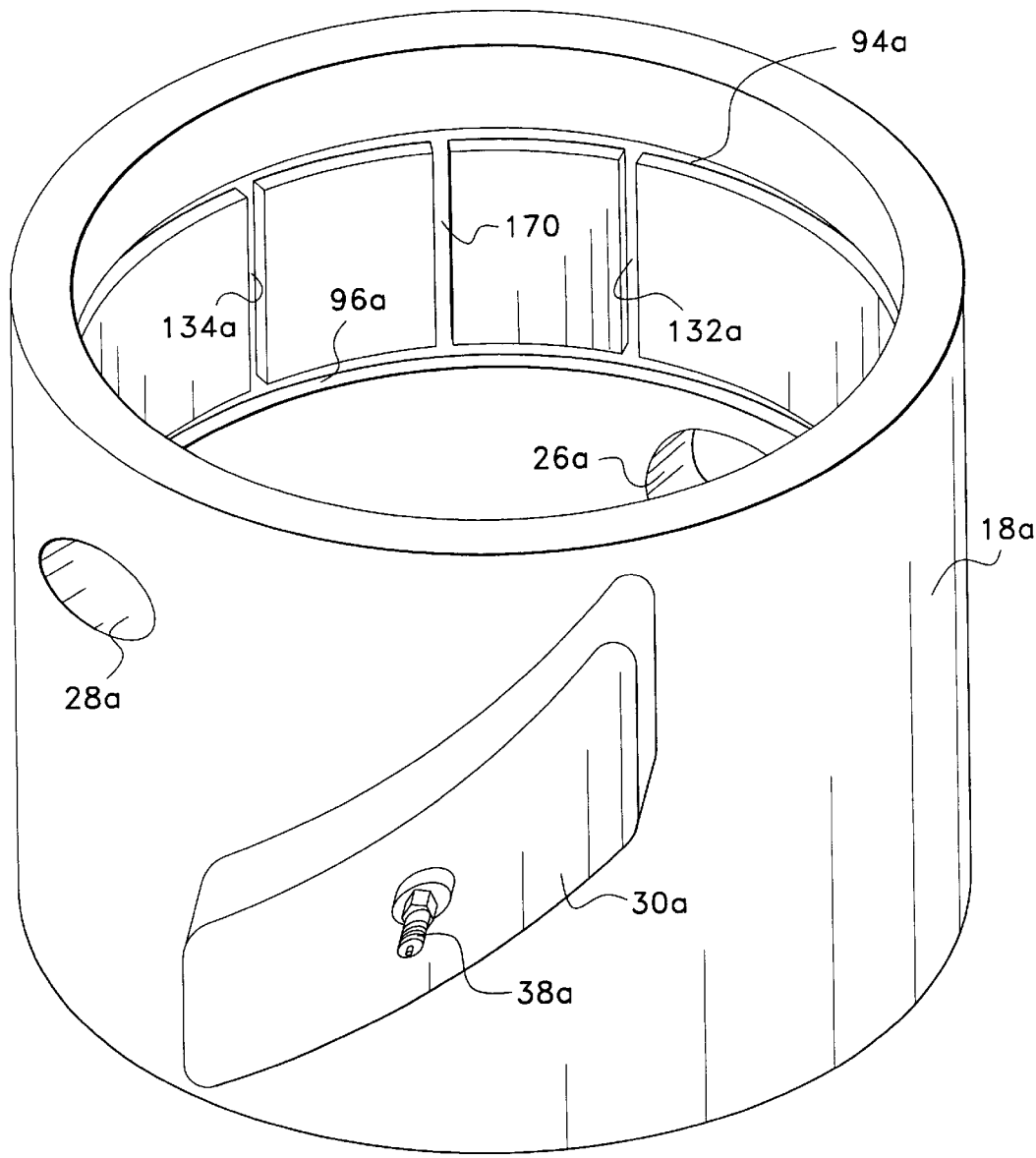
FIG. 19 is a perspective view of the outer housing of the engine having a double roller timing chain, showing the combustion chamber.

Referring to FIGS. 7, 15, and 16, the lubrication system of engine 10a can be described. Lubricant under pressure is supplied to the lubricant inlet 186 by a conventional oil pump (not shown). The lubricant fills the passages 188, 190, and 192 in the stationary shaft 64a. The lubricant passages 190 terminate in openings, on the outside surface of the shaft 64a, that supply lubricant to the bearing surfaces between the rotatable sleeve 146 and the shaft 64a. Lubricant passages 192 terminate in openings that allow lubricant to fill an annular cavity 193 formed in the rotatable sleeve 146. The annular cavity 193 in turn allows lubricant to fill the passages 194 formed inside the rotatable sleeve 146. The passages 194 allow lubricant to travel to and fill a central passage (not shown) extending the length of each crank pin 68a and 72a. Holes (not shown), formed between the outer surface of each crank pin 68a and 72a and each crank pin's central passage, allow lubrication of the bearing surfaces between each crank pin (68a and 72a) and the big end of its respective piston rod (84a and 86a). Also, the passage 188 carries lubricant to the sprockets 160 and 162 and the dual roller timing chain 164. Lubricant exuding through gaps between the rotatable sleeve 146 and the eccentric shaft 64a, between each crank pin (68a and 72a) and the big end of its respective piston rod (84a and 86a), and between the crank pins 68a and 72a and the rotatable sleeve 146, gets splashed about the interior of the drum 14a lubricating the piston wrist pins 80a and 82a and the walls of the cylinders 52a and 54a. The splashing of the lubricant is aided by the rotation of the rotatable sleeve 146. Lubricant flows from the interior of the drum 14a, through openings 196, and into the space between the endcap 22a and the endcap 46a. The lubricant then flows out of the engine 10a through the opening 198 which is formed in the endcap 22a. The lubricant then flows to a conventional type oil pan or sump (not shown) where it can be recirculated through the engine 10a, preferably via a filter, by the oil pump.

In the illustrated example, the end of the eccentric portion of the shaft 64a located within the drum 14a is not supported. This lack of support is countered by using a very thick shaft for the eccentric portion of the shaft 64a. Alternatively, a crankshaped piece can be provided that has one end fixedly attached to the end of the eccentric portion of the shaft 64a located within the drum 14a, and one end journaled in a bearing provided about the center of and fixed relative to the sprocket 162, to thereby give support to the end of the eccentric portion of the shaft 64a located within the drum 14a.

Referring to FIGS. 24–27 and 29–31, a third embodiment of the present invention can be seen. The third embodiment of the present invention is the internal combustion engine 10b. The internal combustion engine 10b is largely identical to the engine 10a, therefore, its operation will not be described in great detail except in those areas where differences exist between the engines 10b and 10a. For details of the operation of the engine 10b reference is made to the discussion of the operation of the engine 10a. For simplicity of illustration the engine 10b is shown as an air cooled engine, however, either air cooling or liquid cooling can be used for either of the engine designs illustrated by engines 10a and 10b. Also, if the engines of the present invention are made of ceramics, composite material, or other refractory material, then no special provision for engine cooling may be necessary.

The internal combustion or heat engine 10b includes an outer housing 12b, a rotating drum 14b, and a power output shaft 16b.

The barrel shaped outer housing 12b has a first peripheral wall 18b, a first rear endcap 20b, a first front endcap 22b, and a base section 21. The peripheral wall 18b is composed of three roughly annular sections 23, 25, and 27 which are stacked one on top of the other to form the peripheral wall 18b. The first front endcap 22b has an output shaft opening 24b. The first peripheral wall 18b, the first rear endcap 20b, the base section 21, and the first front endcap 22b cooperatively define an enclosure for the drum 14b. The outer housing 12b has a first longitudinal axis which is coincident with the longitudinal axis of the drum 14b and, with the axis of rotation of the drum 14b. The outer housing 12b has an intake manifold 26b and an exhaust port 28b.

The intake manifold 26b is formed in the endcap 20b and has a flanged opening to allow the attachment of a carburetor or the like. The engine 10b uses a lubricant that is mixed with the fuel in the manner of conventional two-stroke engines. A fuel/air/lubricant mixture enters the intake manifold 26b from the carburetor that would be attached at the intake manifold 26b.

A combustion chamber 30b is fixed to the peripheral wall 18b of the outer housing 12b. The combustion chamber 30b has a hollow interior and an ignition source receiving hole 32b. The combustion chamber 30b also has an inlet 34b and an outlet 36b. The inlet 34b is in communication with the hollow interior of the combustion chamber 30b and allows compressed air or air/fuel mixture to enter the combustion chamber 30b. The outlet 36b is also in communication with the hollow interior of the combustion chamber 30b and allows hot, high pressure, gaseous combustion products to exit the combustion chamber 30b.

An ignition source such as a spark plug would ordinarily be inserted in the ignition source receiving hole 32b in exactly the same manner as was described in relation to engine 10a. As with engine 10a, well known timing and control circuitry are employed to cause the spark plug to generate a spark at predetermined points in the engine cycle.

The section 21 has a fixed central hub 200 that is surrounded by openings 202. The openings 202 allow the fuel/air/lubricant mixture to enter the outer housing 12b.

The drum 14b is rotatably supported within the outer housing 12b. The drum 14b is substantially cylindrical in shape and dimensioned to fit into the interior of the outer housing 12b. The drum 14b has a second peripheral wall 42b, a second rear endcap 44b, and a second front endcap 46b. The second rear endcap 44b has a central hub 204 supported at the center of the endcap 44b by spokes 206. The fuel/air/lubricant mixture enters the interior of the drum 14b through the openings between the spokes 206. An eccentric shaft opening 48b is provided at the center of the hub 204.

A first plurality of cylinders 52b are formed in a drum section 208. The drum section 208 is supported intermediate the peripheral wall 42b and the endcap 46b. The plurality of cylinders 52b form the intake/compression bank of cylinders. In the illustrated example there are four cylinders 52b forming the intake/compression bank of cylinders, however, any number of cylinders may constitute the intake/compression bank of cylinders.

The first plurality of cylinders 52b are arranged in a radial configuration such that the longitudinal axis of each of the intake/compression cylinders 52b is coincident with a radius of the drum 14b. The first plurality of cylinders 52b are evenly distributed about the longitudinal axis of the drum 14b. Each of the first plurality of cylinders 52b has an open top.

A second plurality of cylinders 54b are formed in a drum section 210. The drum section 210 is supported intermediate the peripheral wall 42b of the drum 14b and the endcap 44b at a location axially spaced apart from the axial position of the bank of intake/compression cylinders 52b. The second plurality of cylinders 54b are arranged in a radial configuration such that the longitudinal axis of each of the cylinders 54b is coincident with a radius of the drum 14b. The cylinders 54b are evenly distributed about the longitudinal axis of the drum 14b. Each of the cylinders 54b has an open top. The bank of cylinders 54b acts to derive power from and exhaust, or expel, the products that result from the combustion process. Therefore, the cylinders 54b are collectively referred to as the power/exhaust cylinders. In the illustrated example there are four cylinders 54b forming the power/exhaust bank of cylinders, however, any number of cylinders 54b may constitute the power/exhaust bank of cylinders.

A first plurality of pistons 56b are provided in the intake/compression cylinders 52b, such that each of the pistons 56b is slidably housed within a respective one of the cylinders 52b. The pistons 56b substantially fill the bore of their respective cylinders 52b. Any gaps between the pistons 56b and the walls of cylinders 52b are sealed by conventional type piston rings 58b. The pistons 56b in cooperation with cylinders 52b act to take in and compress air or a fuel/air mixture and then supply the compressed air or fuel/air mixture to the combustion chamber 30b. Therefore, the pistons 56b are referred to herein as the intake/compression pistons. The pistons 56b are equal in number to the cylinders 52b, this number being four in the illustrated example.

A second plurality of pistons 60b is provided for each of the power/exhaust cylinders 54b. Each of the pistons 60b is slidably housed within a respective one of the power/exhaust cylinders 54b. The pistons 60b substantially fill the bore of their respective cylinders 54b. Any gaps between the pistons 60b and the walls of cylinders 54b are sealed by conventional type piston rings 62b. The pistons 60b in cooperation with cylinders 54b act to derive power from and exhaust the products of the combustion process. Therefore, the pistons 60b are referred to herein as the power/exhaust pistons. The pistons 60b are equal in number to the cylinders 54b, this number being four in the illustrated example.

An eccentric shaft 64b is fixedly attached to the central hub 200 and the eccentric shaft 64b extends through the eccentric shaft opening 48b. The eccentric shaft 64b has an eccentric portion positioned within the drum 14b, which is eccentric relative to the longitudinal axis of the outer housing 12b. The eccentric portion of the shaft 64b extends parallel to, but spaced apart from the axis of rotation of the drum 14b. The length of the eccentric portion of the shaft 64b spans at least the axial distance between the intake/compression cylinders 52b and the power/exhaust cylinders 54b, the axial distance corresponding to the outside diameter of the power/exhaust cylinders 54b, and the axial distance corresponding to the outside diameter of the intake/compression cylinders 52b.

A rotatable sleeve 146b is rotatably supported by the eccentric portion of the eccentric shaft 64b. The rotatable sleeve 146b has a large diameter portion 148b intermediate two small diameter portions 150b and 152b. At the end of each small diameter portion 150b and 152b, distal from the large diameter portion 148b, there are flanges 154b and 156b, respectively.

A first plurality of crank pins 68b are supported by the rotatable sleeve 146b intermediate the flange 154b and the large diameter portion 148b. The crank pins 68b are evenly distributed along a circular arc about the eccentric portion of the eccentric shaft 64b.

A second plurality of crank pins 72b are supported by the rotatable sleeve 146b at a location axially spaced apart from the first plurality of crank pins 68b. More specifically, the crank pins 72b are supported intermediate the flange 156b and the large diameter portion 148b. The crank pins 72b are evenly distributed along a circular arc about the eccentric portion of the eccentric shaft 64b.

Ball bearing sets 76b and 78b rotatably support the drum 14b about the concentric end portions of the eccentric shaft 64b. The ball bearing set 79 rotatably supports the output shaft 16b at the output shaft opening 24b. Also, a seal 81 is provided at the output shaft opening 24b to prevent the fuel/air/lubricant mixture from escaping through the output shaft opening 24b.

Each piston 56b is provided with a piston rod 84b. Also, each piston 56b is provided with a wrist pin in the same manner as the pistons 56a. Each piston rod 84b has a first end and a second end, the first end of each piston rod 84b being pivotally supported by the wrist pin of a respective one of the pistons 56b and the second end of each of the piston rods 84b being pivotally supported by a crank pin 68b.

Each piston 60b is provided with a piston rod 86b. Also, each piston 60b is provided with a wrist pin in the same manner as the pistons 60a. Each piston rod 86b has a first end and a second end, the first end of each piston rod 86b being pivotally supported by the wrist pin of a respective one of the pistons 60b and the second end of each of the piston rods 86b being pivotally supported by a crank pin 72b.

As with the engine 10a, the proper operation of the engine 10b requires that the rotatable sleeve 146b rotate with the drum 14b at the same number of revolutions per minute. The pistons 56b and 60b and the piston rods 84b and 86b link the rotatable sleeve 146b to the drum 14b such that when the drum 14b is rotated, the sleeve 146b and the drum 14b rotate together at the same rotational speed and in a synchronized manner. If a more positive arrangement for ensuring that the sleeve 146b and the drum 14b rotate together is desired, the double roller timing chain and the timing sprockets of the engine 10a may also be applied to the engine 10b.

Figure 31:
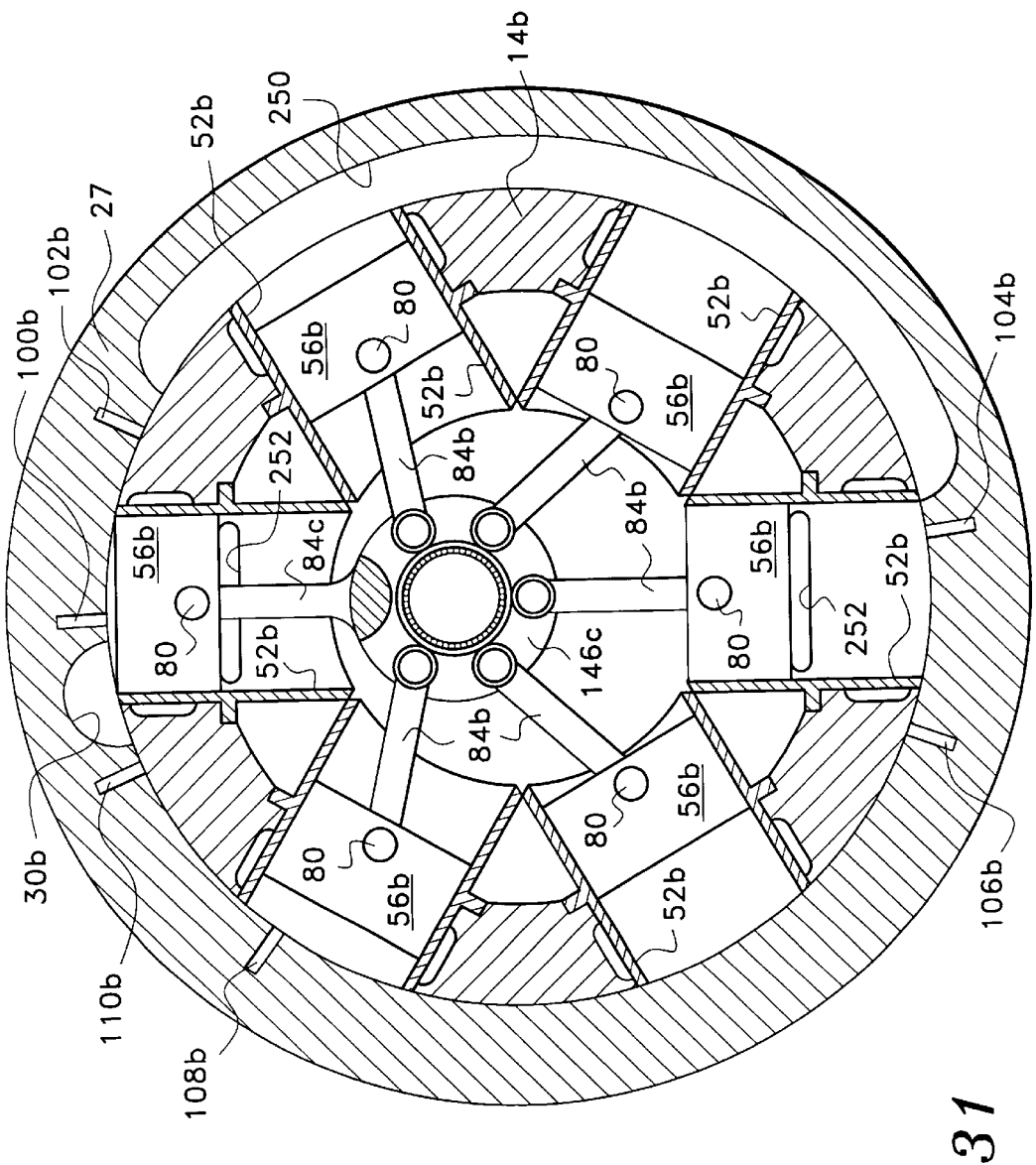
FIG. 31 is a cross sectional view of the intake/compression cylinders of the engine having the centrifugal compressor feature, showing the master and slave piston rod arrangement that can be used to synchronize the rotation of the sleeve carrying the crank pins with the rotation of the drum carrying the cylinders of the engine.

Alternatively, an arrangement using one piston rod as a master rod with the other piston rods in the same bank of cylinders slaved to that master rod, can be used to ensure that the sleeve 146b and the drum 14b rotate together. The arrangement using a master rod is illustrated in FIG. 31. FIG. 31 shows a cross section of the intake/compression bank of cylinders. In the embodiment of FIG. 31, one of the piston rods 84c is rigidly fixed to the rotatable sleeve 146c which is otherwise identical with the rotatable sleeve 146b. The other "slave" piston rods 84b are pivotally attached to the rotatable sleeve 146c as before. The end of the piston rod 84c distal from the sleeve 146c is pivotally attached to a respective one of the pistons 56b. As should be readily apparent, because the respective piston 56b is angularly confined to its respective cylinder 52b, rotation of the drum 14b will cause the sleeve 146c to rotate with the drum 14b at the same number of revolutions per minute. Preferably, the piston rod of the power/exhaust cylinder, upon which the respective cylinder 52b of the master rod 84c is superimposed, is also rigidly fixed to the sleeve 146c to form a master rod for added structural strength.

The output shaft 16b is fixedly attached to the front endcap 46b of the drum 14b and extends through the output shaft opening 24b and to the outside of the outer housing 12b. The output shaft 16b allows the engine 10b to power other machinery.

A pair of ring-shaped seals 212 and 214 are provided on either side of the drum section 208 near the surface 216. The surface 216 is coincident with the open tops of the cylinders 52b. The ring-shaped seals 212 and 214 are spring biased to axially project from grooves 218 and 220, respectively. The ring-shaped seals 212 and 214 sealingly contact the transverse surfaces 222 and 224, respectively, of the drum section 208. A second pair of ring-shaped seals 226 and 228 are provided on either side of the drum section 210 near the surface 230. The surface 230 is coincident with the open tops of the cylinders 54b. The ring-shaped seals 226 and 228 are spring biased to axially project from grooves 232 and 234, respectively. The ring-shaped seals 226 and 228 sealingly contact the transverse surfaces 236 and 238, respectively, of the drum section 210. These ring-shaped seals prevent fluid communication between the open tops of all the cylinders and the interior of the housing 12b. Recalling that the interior of the drum 14b and the interior of the housing 12b are filled with the fuel/air/lubricant mixture, the ring-shaped seals 226 and 228 prevent the ignition of the mixture filling the interior of the housing 12b. The ring-shaped seals 212 and 214 prevent loss of compression of the intake/compression cylinders 52b during the compression phase of their cycle.

The engine 10b has wiper seals 10b, 102b, 104b, 106b, 108b, and 110b which are arranged about the axis of rotation of the drum in exactly the same way as the wiper seals 100a, 102a, 104a, 106a, 108a, and 110a of the engine 10a. Further, the wiper seals 10b, 102b, 104b, 106b, 108b, and 110b have the same structure and function in exactly the same way as the wiper seals 100a, 102a, 104a, 106a, 108a, and 110a. Similarly, the wiper seals 124b, 168b, 126b, 128b, and 130b are arranged in the same way, have the same structure, and function in exactly the same way as the wiper seals 124a, 168, 126a, 128a, and 130a. The only difference between the wiper seals of the engine 10b and those of engine 10a may be in their dimensions. The wiper seals 10b, 102b, 104b, 106b, 108b, and 110b extend for at least the axial dimension of the surface 216 of the drum section 208 (i.e. the axial dimension between surfaces 222 and 224). The wiper seals 124b, 168b, 126b, 128b, and 130b extend for at least the axial dimension of the surface 230 (i.e. the axial dimension between surfaces 236 and 238).

The engine 10b operates in exactly the same way as the engine 10a, except for the mode of fuel/air intake into the intake/compression cylinders 52b. Consider the steady state operation of the engine 10b during which the drum 14b is rotating at a high rate. The fuel/air/lubricant mixture enters the engine 10b through the intake manifold 26b. The spokes 206 are shaped like fan blades and, as the drum 14b spins, the spokes 206 help to draw fuel/air/lubricant mixture into the engine. Further, the endcap 46b is provided with blades or vanes 240 which cause the endcap 46b to act as a centrifugal compressor as the drum 14b spins. The vanes 240 compress fuel/air/lubricant mixture into the annular cavity 242 which is formed in the endcap 22b of the outer housing 12b. Thus, the interior of the drum 14b and the interior of the housing 12b are filled with a fuel/air/lubricant mixture, with the fuel/air/lubricant mixture being at higher pressure in the cavity 242.

An opening 244 is formed in the wall 246 of the cavity 242. The cavity wall 246 abuts the housing section 27 and the opening 244 is in registry with the intake port 248 formed in the housing section 27. The intake port 248 is in fluid communication with an arcuate cavity 250. The cavity 250 extends for substantially the entire portion, which is swept by the cylinders 52b during the intake phase of their cycle, of the inner circumference of the housing section 27. Thus, the cavity 250 is at all times filled with high pressure fuel/air/lubricant mixture. As each cylinder 52b begins its intake stroke, the open top of the cylinder comes into fluid communication with the cavity 250 and the high pressure fuel/air/lubricant mixture begins to fill each cylinder 52b as the cylinder proceeds through its intake stroke. As each piston 56b nears the bottom of its stroke, the piston slides past transfer ports 252, thus, opening these transfer ports up and allowing even more fuel/air/lubricant mixture to enter the cylinder 52b. At the beginning of the compression stroke, each piston 56b again slides past transfer ports 252, this time shutting them off. The compression stroke can now proceed as was discussed previously in reference to engine 10a. The rest of the operation of the engine 10b is identical to that described for engine 10a and will not be repeated here.

Lubricant being mixed with the fuel, most of the parts of the engine 10b are adequately lubricated by the lubricant in the fuel/air/lubricant mixture filling the interior of the drum 14b and the interior of the housing 12b. However, special provision has been made to provide for adequate Lubrication of the bearings 254 between the rotatable sleeve 146b and the shaft 64b. A small portion of the fuel/air/lubricant mixture entering the engine 10b passes into the lubricant inlet 186b. The mixture fills the passages 188b and 190b in the stationary shaft 64b. The lubricant passages 190b terminate in openings, on the outside surface of the shaft 64b, that supply lubricant to the bearings 254 between the rotatable sleeve 146b and the shaft 64b.

When large numbers of cylinders are used in each of the intake/compression and the power/exhaust banks of cylinders, it may be desirable to provide for continuous combustion of fuel in a combustion chamber of the type used in jet or gas turbine engines. These types of combustion chambers have injectors that continuously inject fuel into the combustion chamber and a flame holder that allows continuous combustion of air and fuel as the air and fuel are supplied to the combustion chamber. Such combustion chambers also have passages that are fluid dynamically tailored to prevent flow of combustion products back through the inlet to the combustion chamber.

It is also possible for an engine made in accordance with the present invention to have multiple banks of intake/compression and/or power/exhaust cylinders. Furthermore, the cylinders in the intake/compression bank of cylinders and the cylinders in the power/exhaust bank of cylinders need not be of the same size, and the cylinders in the intake/compression bank of cylinders and the cylinders in the power/exhaust bank of cylinders do not necessarily have to be superposed over one another. Lastly, either of the intake/compression bank of cylinders or the power/exhaust bank of cylinders can be used by themselves to form a pump or compressor.

It is to be understood that the present invention is not limited to the embodiments described above, but encompasses any and all embodiments within the scope of the following claims.

I claim:

1. An internal combustion engine comprising:
   an outer housing having a first peripheral wall, a first rear endcap, and a first front endcap, said first front endcap having an output shaft opening,
   said first peripheral wall, said first rear endcap, and said first front endcap cooperatively defining a cylindrical enclosure, said outer housing having a first longitudinal axis, said outer housing having an intake port and an exhaust port;
   a combustion chamber fixed to said outer housing, said combustion chamber having a hollow interior and an ignition source receiving hole, said combustion chamber further having an inlet and an outlet, said inlet of said combustion chamber and said outlet of said combustion chamber being in communication with said hollow interior of said combustion chamber;
   an ignition source engaged to said ignition source receiving hole;
   means for supplying fuel to said internal combustion engine;
   a drum rotatably supported within said outer housing, said drum being substantially cylindrical in shape, said drum having a second peripheral wall, a second rear endcap, and a second front endcap, said second rear endcap having an eccentric shaft opening, said drum having a second longitudinal axis and being coaxial with said outer housing, said second peripheral wall having an outer surface;
   a first plurality of cylinders supported by said second peripheral wall, each of said first plurality of cylinders having a longitudinal axis, said first plurality of cylinders being arranged in a radial configuration such that said longitudinal axis of each of said first plurality of cylinders is coincident with a radius of said drum, said first plurality of cylinders being evenly distributed about said second longitudinal axis, each of said first plurality of cylinders intersecting said outer surface of said second peripheral wall so as to form an open top for each of said first plurality of cylinders, each of said first plurality of cylinders having a bore;
   a second plurality of cylinders supported by said second peripheral wall at a location axially spaced from said first plurality of cylinders, each of said second plurality of cylinders having a longitudinal axis, said second plurality of cylinders being arranged in a radial configuration such that said longitudinal axis of each of said second plurality of cylinders is coincident with a radius of said drum, said second plurality of cylinders being evenly distributed about said second longitudinal axis, each of said second plurality of cylinders intersecting said outer surface of said second peripheral wall so as to form an open top for each of said second plurality of cylinders, each of said second plurality of cylinders having a bore;
   a first plurality of pistons, each of said first plurality of pistons being slidably housed within a respective one of said first plurality of cylinders;
   a second plurality of pistons, each of said second plurality of pistons being slidably housed within a respective one of said second plurality of cylinders;
   an eccentric shaft fixedly attached to said first rear endcap and extending through said eccentric shaft opening, said eccentric shaft having a first eccentric portion, a second eccentric portion, and a coaxial portion, said first eccentric portion, said second eccentric portion, and said coaxial portion lying within said drum, said coaxial portion extending between said first eccentric portion and said second eccentric portion, said coaxial portion of said eccentric shaft being coaxial with said outer housing, while said first eccentric portion and said second eccentric portion are eccentric relative to said longitudinal axis of said outer housing;
   a first plurality of wrist pins, each of said first plurality of wrist pins being borne by a respective one of said first plurality of pistons;
   a second plurality of wrist pins, each of said second plurality of wrist pins being borne by a respective one of said second plurality of pistons;
   a first plurality of piston rods, each of said first plurality of piston rods having a first end and a second end, said first end of each of said first plurality of piston rods being pivotally supported by a respective one of said first plurality of wrist pins, said second end of each of said first plurality of piston rods being pivotally supported by said first eccentric portion of said eccentric shaft;

a second plurality of piston rods, each of said second plurality of piston rods having a first end and a second end, said first end of each of said second plurality of piston rods being pivotally supported by a respective one of said second plurality of wrist pins, said second end of each of said second plurality of piston rods being pivotally supported by said second eccentric portion of said eccentric shaft;

an output shaft fixedly attached to said second front endcap and extending through said output shaft opening.

2. The internal combustion engine, according to claim 1, whereby as said drum rotates said first plurality of pistons are caused to reciprocate within said first plurality of cylinders thereby supplying at least air under compression to said combustion chamber wherein the air under compression and fuel supplied by said means for supplying fuel are ignited to supply a high pressure fluid to said second plurality of cylinders, as said drum rotates each of said second plurality of pistons alternatingly moving through a power stroke and an exhaust stroke, the high pressure fluid forcing each of said second plurality of pistons toward said second longitudinal axis during at least a portion of the power stroke, to thereby power continued rotation of said drum and thus provide mechanical power at said output shaft.

3. An internal combustion engine comprising:

an outer housing having a first peripheral wall, a first rear endcap, and a first front endcap, said first front endcap having an output shaft opening, said first peripheral wall, said first rear endcap, and said first front endcap cooperatively defining a cylindrical enclosure, said outer housing having a first longitudinal axis, said outer housing having an intake port and an exhaust port;

a combustion chamber fixed to said outer housing, said combustion chamber having a hollow interior and an ignition source receiving hole, said combustion chamber further having an inlet and an outlet, said inlet of said combustion chamber and said outlet of said combustion chamber being in communication with said hollow interior of said combustion chamber;

an ignition source engaged to said ignition source receiving hole;

means for supplying fuel to said internal combustion engine;

a drum rotatably supported within said outer housing, said drum being substantially cylindrical in shape, said drum having a second peripheral wall, a second rear endcap, and a second front endcap, said second rear endcap having an eccentric shaft opening, said drum having a second longitudinal axis and being coaxial with said outer housing, said second peripheral wall having an outer surface;

a first plurality of cylinders supported by said second peripheral wall, each of said first plurality of cylinders having a longitudinal axis, said first plurality of cylinders being arranged in a radial configuration such that said longitudinal axis of each of said first plurality of cylinders is coincident with a radius of said drum, said first plurality of cylinders being evenly distributed about said second longitudinal axis, each of said first plurality of cylinders intersecting said outer surface of said second peripheral wall so as to form an open top for each of said first plurality of cylinders, each of said first plurality of cylinders having a bore;

a second plurality of cylinders supported by said second peripheral wall at a location axially spaced from said first plurality of cylinders, each of said second plurality of cylinders having a longitudinal axis, said second plurality of cylinders being arranged in a radial configuration such that said longitudinal axis of each of said second plurality of cylinders is coincident with a radius of said drum, said second plurality of cylinders being evenly distributed about said second longitudinal axis, each of said second plurality of cylinders intersecting said outer surface of said second peripheral wall so as to form an open top for each of said second plurality of cylinders, each of said second plurality of cylinders having a bore;

a first plurality of pistons, each of said first plurality of pistons being slidably housed within a respective one of said first plurality of cylinders;

a second plurality of pistons, each of said second plurality of pistons being slidably housed within a respective one of said second plurality of cylinders;

an eccentric shaft fixedly attached to said first rear endcap at a location such that said eccentric shaft extends through said eccentric shaft opening, said eccentric shaft having an eccentric portion positioned within said drum, said eccentric portion being eccentric relative to said longitudinal axis of said outer housing;

a rotatable sleeve rotatably supported by said eccentric portion of said eccentric shaft;

a first plurality of crank pins supported by said rotatable sleeve, said first plurality of crank pins being evenly distributed along a circular arc about said eccentric portion of said eccentric shaft;

a second plurality of crank pins supported by said rotatable sleeve at a location axially spaced apart from said first plurality of crank pins, said second plurality of crank pins being evenly distributed along a circular arc about said eccentric portion of said eccentric shaft;

a first plurality of wrist pins, each of said first plurality of wrist pins being borne by a respective one of said first plurality of pistons;

a second plurality of wrist pins, each of said second plurality of wrist pins being borne by a respective one of said second plurality of pistons;

a first plurality of piston rods, each of said first plurality of piston rods having a first end and a second end, said first end of each of said first plurality of piston rods being pivotally supported by a respective one of said first plurality of wrist pins, said second end of each of said first plurality of piston rods being pivotally supported by a respective one of said first plurality of crank pins;

a second plurality of piston rods, each of said second plurality of piston rods having a first end and a second end, said first end of each of said second plurality of piston rods being pivotally supported by a respective one of said second plurality of wrist pins, said second end of each of said second plurality of piston rods being pivotally supported by a respective one of said second plurality of crank pins;

an output shaft fixedly attached to said second front endcap and extending through said output shaft opening, whereby as said drum rotates said first plurality of pistons are caused to reciprocate within said first plurality of cylinders thereby supplying at least air under compression to said combustion chamber wherein the air under compression and fuel supplied by said means for supplying fuel are ignited to supply a high pressure fluid to said second plurality of cylinders, as said drum rotates each of said second plurality of pistons alternatingly moving through a power stroke and an exhaust stroke, the high pressure fluid forcing each of said second plurality of pistons toward said second longitudinal axis during at least a portion of the power stroke, to thereby power continued rotation of said drum and thus provide mechanical power at said output shaft.

4. The internal combustion engine according to claim 3, wherein said drum has an interior, the internal combustion engine further comprising:

a first sprocket fixedly attached to said second front endcap, concentric with said second longitudinal axis, on said interior of said drum;

a second sprocket fixedly attached to an end of said rotatable sleeve distal from said first rear endcap, said second sprocket being concentric with said eccentric portion of said eccentric shaft; and a double roller timing chain engaging both said first and said second sprocket, said first and said second sprocket having a one-to-one ratio such that when said drum is rotating at a first rotational speed, said rotatable sleeve rotates at a second rotational speed equal to said first rotational speed.

* * * * *